(12) United States Patent
Ersavas et al.

(10) Patent No.: US 11,768,472 B2
(45) Date of Patent: *Sep. 26, 2023

(54) METHODS AND SYSTEMS FOR IRRIGATION AND CLIMATE CONTROL

(71) Applicant: Rain Bird Corporation, Azusa, CA (US)

(72) Inventors: Pelin Ersavas, Montrose, CA (US); Bulut Ersavas, Montrose, CA (US); Semih Pekol, Istanbul (TR); Thomas Devol, Chico, CA (US)

(73) Assignee: Rain Bird Corporation, Azusa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/493,329

(22) Filed: Oct. 4, 2021

(65) Prior Publication Data
US 2022/0026865 A1    Jan. 27, 2022

Related U.S. Application Data

(63) Continuation of application No. 15/616,736, filed on Jun. 7, 2017, now Pat. No. 11,163,274, which is a
(Continued)

(51) Int. Cl.
*G05B 15/02* (2006.01)
*G05B 19/042* (2006.01)
*A01G 25/16* (2006.01)

(52) U.S. Cl.
CPC ............. *G05B 15/02* (2013.01); *A01G 25/16* (2013.01); *G05B 19/0426* (2013.01);
(Continued)

(58) Field of Classification Search
CPC ............... G05B 15/02; G05B 19/0426; G05B 2219/23109; G05B 2219/25167;
(Continued)

(56) References Cited

U.S. PATENT DOCUMENTS 1,001,593 A    8/1911 Harry
5,479,339 A    12/1995 Miller
(Continued)

FOREIGN PATENT DOCUMENTS

CN    101021729 A    8/2007
EP    1798907    6/2007
(Continued)

OTHER PUBLICATIONS

U.S. Appl. No. 13/844,248, filed Mar. 15, 2013, Ersavas.
(Continued)

*Primary Examiner* — Tejal Gami
(74) *Attorney, Agent, or Firm* — Fitch, Even, Tabin & Flannery LLP

(57) ABSTRACT

Methods and systems are provided for monitoring and controlling irrigation and climate conditions in landscapes (such as, e.g., municipal parks, gardens, and sports fields) and agricultural environments (such as, e.g., open agricultural fields, greenhouses, and other sites growing crops).

20 Claims, 52 Drawing Sheets

Related U.S. Application Data continuation of application No. 13/844,304, filed on Mar. 15, 2013, now Pat. No. 9,703,275, which is a continuation-in-part of application No. 13/532,557, filed on Jun. 25, 2012, now Pat. No. 9,829,869.

(60) Provisional application No. 61/500,392, filed on Jun. 23, 2011.

(52) U.S. Cl.
CPC ............ *G05B 2219/23109* (2013.01); *G05B 2219/25167* (2013.01); *G05B 2219/25168* (2013.01); *G05B 2219/2625* (2013.01)

(58) Field of Classification Search
CPC .. G05B 2219/25168; G05B 2219/2625; A01G 25/16
See application file for complete search history.

(56) References Cited

U.S. PATENT DOCUMENTS

| | | | |
|---|---|---|---|
| 5,621,669 A | 4/1997 | Bjornsson |
| 5,714,931 A | 2/1998 | Petite |
| 5,740,031 A | 4/1998 | Gagnon |
| 5,926,531 A | 7/1999 | Petite |
| 6,028,522 A | 2/2000 | Petite |
| 6,061,603 A | 5/2000 | Papadopoulos |
| 6,079,433 A | 6/2000 | Saarem |
| 6,098,898 A | 8/2000 | Storch |
| 6,218,953 B1 | 4/2001 | Petite |
| 6,233,327 B1 | 5/2001 | Petite |
| 6,430,268 B1 | 8/2002 | Petite |
| 6,437,692 B1 | 8/2002 | Petite |
| 6,529,589 B1 | 3/2003 | Nelson |
| 6,553,336 B1 | 4/2003 | Johnson |
| 6,600,971 B1 | 7/2003 | Smith |
| 6,618,578 B1 | 9/2003 | Petite |
| 6,628,764 B1 | 9/2003 | Petite |
| 6,671,586 B2 | 12/2003 | Davis |
| 6,708,084 B2 | 3/2004 | Battistutto |
| 6,747,557 B1 | 6/2004 | Petite |
| 6,782,310 B2 | 8/2004 | Bailey |
| 6,784,807 B2 | 8/2004 | Petite |
| 6,792,323 B2 | 9/2004 | Krzyzanowski |
| 6,823,239 B2 | 11/2004 | Sieminski |
| 6,836,737 B2 | 12/2004 | Petite |
| 6,853,883 B2 | 2/2005 | Kreikemeier |
| 6,862,498 B2 | 3/2005 | Davis |
| 6,874,707 B2 | 4/2005 | Skinner |
| 6,891,838 B1 | 5/2005 | Petite |
| 6,892,114 B1 | 5/2005 | Addink |
| 6,895,987 B2 | 5/2005 | Addink |
| 6,898,467 B1 | 5/2005 | Smith |
| 6,914,533 B2 | 7/2005 | Petite |
| 6,914,893 B2 | 7/2005 | Petite |
| 6,938,834 B2 | 9/2005 | Harris |
| 6,947,810 B2 | 9/2005 | Skinner |
| 6,950,728 B1 | 9/2005 | Addink |
| 6,963,808 B1 | 11/2005 | Addink |
| 6,978,794 B2 | 12/2005 | Dukes |
| 6,997,642 B2 | 2/2006 | Bishop |
| 7,003,357 B1 | 2/2006 | Kreikemeier |
| 7,010,395 B1 | 3/2006 | Goldberg |
| 7,010,396 B2 | 3/2006 | Ware |
| 7,012,394 B2 | 3/2006 | Moore |
| 7,019,667 B2 | 3/2006 | Petite |
| 7,024,256 B2 | 4/2006 | Krzyzanowski |
| 7,053,767 B2 | 5/2006 | Petite |
| 7,058,478 B2 | 6/2006 | Alexanian |
| 7,063,270 B2 | 6/2006 | Bowers |
| 7,069,115 B1 | 6/2006 | Woytowitz |
| 7,079,810 B2 | 7/2006 | Petite |
| 7,103,511 B2 | 9/2006 | Petite |
| 7,123,993 B1 | 10/2006 | Freeman |
| 7,133,749 B2 | 11/2006 | Goldberg |
| 7,137,550 B1 | 11/2006 | Petite |
| 7,146,254 B1 | 12/2006 | Howard |
| 7,172,366 B1 | 2/2007 | Bishop |
| 7,181,319 B1 | 2/2007 | Woytowtiz |
| 7,182,272 B1 | 2/2007 | Marian |
| 7,184,848 B2 | 2/2007 | Krzyzanowski |
| 7,184,861 B2 | 2/2007 | Petite |
| 7,209,840 B2 | 4/2007 | Petite |
| 7,250,860 B2 | 7/2007 | Smith |
| 7,263,073 B2 | 8/2007 | Petite |
| 7,266,428 B2 | 9/2007 | Alexanian |
| 7,295,128 B2 | 11/2007 | Petite |
| 7,305,280 B2 | 12/2007 | Marian |
| 7,328,089 B2 | 2/2008 | Curren |
| 7,330,796 B2 | 2/2008 | Addink |
| 7,339,957 B2 | 3/2008 | Hitt |
| 7,346,463 B2 | 3/2008 | Petite |
| 7,397,907 B2 | 7/2008 | Petite |
| 7,403,840 B2 | 7/2008 | Moore |
| 7,424,527 B2 | 9/2008 | Petite |
| 7,468,661 B2 | 12/2008 | Petite |
| 7,480,501 B2 | 1/2009 | Petite |
| 7,487,925 B2 | 2/2009 | Skinner |
| 7,546,181 B2 | 6/2009 | Vidovich |
| 7,567,858 B1 | 7/2009 | Dunlap |
| 7,574,284 B2 | 8/2009 | Goldberg |
| 7,584,023 B1 | 9/2009 | Palmer |
| 7,596,429 B2 | 9/2009 | Cardinal |
| 7,619,322 B2 | 11/2009 | Gardner |
| 7,643,823 B2 | 1/2010 | Shamoon |
| 7,650,425 B2 | 1/2010 | Davis |
| 7,668,532 B2 | 2/2010 | Shamoon |
| 7,668,990 B2 | 2/2010 | Krzyzanowski |
| 7,697,492 B2 | 4/2010 | Petite |
| 7,711,454 B2 | 5/2010 | Addink |
| 7,711,796 B2 | 5/2010 | Gutt |
| 7,719,432 B1 | 5/2010 | Hill |
| 7,738,999 B2 | 6/2010 | Petite |
| 7,739,378 B2 | 6/2010 | Petite |
| 7,756,086 B2 | 7/2010 | Petite |
| 7,844,368 B2 | 11/2010 | Alexanian |
| 7,844,369 B2 | 11/2010 | Nickerson |
| 7,870,080 B2 | 1/2011 | Budike, Jr. |
| 7,877,168 B1 | 1/2011 | Porter |
| 7,883,027 B2 | 2/2011 | Fekete |
| 7,899,580 B2 | 3/2011 | Cardinal |
| 7,911,341 B2 | 3/2011 | Raji |
| 7,930,069 B2 | 4/2011 | Savelle |
| 7,933,945 B2 | 4/2011 | Krzyzanowski |
| 7,953,517 B1 | 5/2011 | Porter |
| 7,962,101 B2 | 6/2011 | Vaswani |
| 7,962,244 B2 | 6/2011 | Alexanian |
| 7,978,059 B2 | 7/2011 | Petite |
| 7,996,115 B2 | 8/2011 | Nickerson |
| 8,013,732 B2 | 9/2011 | Petite |
| 8,019,482 B2 | 9/2011 | Sutardja |
| 8,024,075 B2 | 9/2011 | Fekete |
| 8,031,650 B2 | 10/2011 | Petite |
| 8,042,049 B2 | 10/2011 | Killian |
| 8,055,389 B2 | 11/2011 | Holindrake |
| 8,064,412 B2 | 11/2011 | Petite |
| 8,064,935 B2 | 11/2011 | Shamoon |
| 8,104,993 B2 | 1/2012 | Hitt |
| 8,116,889 B2 | 2/2012 | Krzyzanowski |
| 8,145,360 B2 | 3/2012 | Brundisini |
| 8,171,136 B2 | 5/2012 | Petite |
| 8,193,930 B2 | 6/2012 | Petite |
| 8,196,064 B2 | 6/2012 | Krzyzanowski |
| 8,209,061 B2 | 6/2012 | Palmer |
| 8,212,667 B2 | 7/2012 | Petite |
| 8,214,496 B2 | 7/2012 | Gutt |
| 8,219,254 B2 | 7/2012 | O'Connor |
| 8,219,935 B2 | 7/2012 | Hunts |
| 8,223,010 B2 | 7/2012 | Petite |
| 8,224,493 B2 | 7/2012 | Walker |
| 8,225,810 B2 | 7/2012 | Blanchard |
| 8,244,404 B2 | 8/2012 | Nickerson |
| 8,265,797 B2 | 9/2012 | Nickerson |

(56) References Cited

U.S. PATENT DOCUMENTS

| | | |
|---|---|---|
| 8,301,309 B1 | 10/2012 | Woytoxitz |
| 8,326,440 B2 | 12/2012 | Christfort |
| 8,335,304 B2 | 12/2012 | Petite |
| 8,335,842 B2 | 12/2012 | Raji |
| 8,374,726 B2 | 2/2013 | Holindrake |
| 8,379,564 B2 | 2/2013 | Petite |
| 8,396,606 B2 | 3/2013 | Forbes, Jr. |
| 8,401,705 B2 | 3/2013 | Alexanian |
| 8,410,931 B2 | 4/2013 | Petite |
| 8,412,382 B2 | 4/2013 | Imes |
| 8,417,390 B2 | 4/2013 | Nickerson |
| 8,433,448 B2 | 4/2013 | Walker |
| 8,437,879 B2 | 5/2013 | Anderson |
| 8,446,884 B2 | 5/2013 | Petite |
| 8,447,843 B2 | 5/2013 | Johnson |
| 8,457,798 B2 | 6/2013 | Hackett |
| 8,478,871 B2 | 7/2013 | Gutt |
| 8,494,683 B2 | 7/2013 | Piper |
| 8,516,087 B2 | 8/2013 | Wilson |
| 8,527,549 B2 | 9/2013 | Cidon |
| 8,528,834 B2 | 9/2013 | Skinner |
| 8,538,592 B2 | 9/2013 | Alexanian |
| 8,548,632 B1 | 10/2013 | Porter |
| 8,565,904 B2 | 10/2013 | Kantor |
| 8,600,569 B2 | 12/2013 | Woytowitz |
| 8,606,415 B1 | 12/2013 | Woytowitz |
| 8,620,480 B2 | 12/2013 | Alexanian |
| 8,620,481 B2 | 12/2013 | Holindrake |
| 8,630,743 B2 | 1/2014 | Marsters |
| 8,635,350 B2 | 1/2014 | Gutt |
| 8,649,907 B2 | 2/2014 | Ersavas |
| 8,650,069 B2 | 2/2014 | Mason, Sr. |
| 8,660,705 B2 | 2/2014 | Woytowitz |
| 8,700,222 B1 | 4/2014 | Woytowitz |
| 8,712,592 B2 | 4/2014 | Carlson |
| 8,738,188 B2 | 5/2014 | Nickerson |
| 8,738,189 B2 | 5/2014 | Alexanian |
| 8,739,830 B2 | 6/2014 | Bradbury |
| 8,751,052 B1 | 6/2014 | Campbell |
| 8,793,024 B1 | 7/2014 | Woytowitz |
| 8,812,007 B2 | 8/2014 | Hitt |
| 8,839,135 B2 | 9/2014 | Vander Griend |
| 8,849,461 B2 | 9/2014 | Ersavas |
| 8,862,277 B1 | 10/2014 | Campbell |
| 8,880,204 B2 | 11/2014 | Frei |
| 8,890,505 B2 | 11/2014 | Forbes, Jr. |
| 8,924,587 B2 | 12/2014 | Petite |
| 8,924,588 B2 | 12/2014 | Petite |
| 8,924,891 B2 | 12/2014 | Hunts |
| 8,930,032 B2 | 1/2015 | Shupe |
| 8,948,921 B2 | 2/2015 | Halahan |
| 8,977,400 B1 | 3/2015 | Porter |
| 8,996,183 B2 | 3/2015 | Forbes, Jr. |
| 9,032,998 B2 | 5/2015 | O'Brien |
| 9,043,036 B2 | 5/2015 | Fekete |
| 9,069,337 B2 | 6/2015 | Forbes, Jr. |
| 9,130,402 B2 | 9/2015 | Forbes, Jr. |
| 9,131,642 B2 | 9/2015 | Groeneveld |
| 9,149,013 B2 | 10/2015 | Andrews |
| 9,183,163 B2 | 11/2015 | Frei |
| 9,192,110 B2 | 11/2015 | Standerfer |
| 9,201,815 B2 | 12/2015 | Frei |
| 9,208,676 B2 | 12/2015 | Fadell |
| 9,241,451 B2 | 1/2016 | Ersavas |
| 9,288,102 B2 | 3/2016 | Sobhy |
| 9,301,460 B2 | 4/2016 | Runge |
| 9,348,338 B2 | 5/2016 | Nickerson |
| 9,425,978 B2 | 8/2016 | Frei |
| 9,602,655 B2 | 3/2017 | Shamoon |
| 9,678,485 B2 | 6/2017 | Malaugh |
| 9,703,275 B2 | 7/2017 | Ersavas |
| 9,704,122 B2 | 7/2017 | Jung |
| 9,733,274 B2 | 8/2017 | Pietrowicz |
| 9,756,797 B2 | 9/2017 | Sarver |
| 9,763,393 B2 | 9/2017 | Parsons |
| 9,766,609 B2 | 9/2017 | Kah, Jr. |
| 9,781,887 B2 | 10/2017 | Woytowitz |
| 9,800,463 B2 | 10/2017 | Imes |
| 9,814,190 B1 | 11/2017 | Stange |
| 9,829,869 B2 | 11/2017 | Ersavas |
| 9,832,939 B2 | 12/2017 | Russell |
| 9,872,445 B2 | 1/2018 | Cline |
| 10,362,739 B2 | 7/2019 | Ersavas |
| 10,716,269 B2 | 7/2020 | Ersavas |
| 11,064,664 B2 | 7/2021 | Ersavas |
| 11,163,274 B2 | 11/2021 | Ersavas |
| 11,178,829 B2 | 11/2021 | Cline |
| 11,277,714 B2 | 3/2022 | Griggs |
| 11,281,240 B1 | 3/2022 | Eyring |
| 11,510,373 B2 | 11/2022 | Blejer |
| 2001/0002210 A1 | 5/2001 | Petite |
| 2001/0024163 A1 | 9/2001 | Petite |
| 2002/0012323 A1 | 1/2002 | Petite |
| 2002/0013679 A1 | 1/2002 | Petite |
| 2002/0019712 A1 | 2/2002 | Petite |
| 2002/0019725 A1 | 2/2002 | Petite |
| 2002/0027504 A1 | 3/2002 | Davis |
| 2002/0031101 A1 | 3/2002 | Petite |
| 2002/0109608 A1 | 8/2002 | Petite |
| 2002/0125998 A1 | 9/2002 | Petite |
| 2002/0169643 A1 | 11/2002 | Petite |
| 2003/0036810 A1 | 2/2003 | Petite |
| 2003/0036822 A1 | 2/2003 | Davis |
| 2003/0067889 A1 | 4/2003 | Petite |
| 2003/0078029 A1 | 4/2003 | Petite |
| 2003/0093159 A1 | 5/2003 | Sieminski |
| 2003/0093484 A1 | 5/2003 | Petite |
| 2003/0179102 A1 | 9/2003 | Barnes |
| 2004/0039489 A1 | 2/2004 | Moore |
| 2004/0053639 A1 | 3/2004 | Petite |
| 2004/0088083 A1 | 5/2004 | Davis |
| 2004/0100394 A1 | 5/2004 | Hitt |
| 2004/0183687 A1 | 9/2004 | Petite |
| 2005/0030199 A1 | 2/2005 | Petite |
| 2005/0043059 A1 | 2/2005 | Petite |
| 2005/0043860 A1 | 2/2005 | Petite |
| 2005/0190055 A1 | 9/2005 | Petite |
| 2005/0195768 A1 | 9/2005 | Petite |
| 2005/0195775 A1 | 9/2005 | Petite |
| 2005/0201397 A1 | 9/2005 | Petite |
| 2005/0216580 A1 | 9/2005 | Raji |
| 2005/0243867 A1 | 11/2005 | Petite |
| 2006/0161309 A1 | 7/2006 | Moore |
| 2006/0181406 A1 | 8/2006 | Petite |
| 2006/0282467 A1 | 12/2006 | Peterson |
| 2007/0016334 A1 | 1/2007 | Smith |
| 2007/0088462 A1 | 4/2007 | Peleg |
| 2007/0135973 A1 | 6/2007 | Petite |
| 2007/0140274 A1 | 6/2007 | Battistutto |
| 2007/0191991 A1 | 8/2007 | Addink |
| 2007/0208521 A1 | 9/2007 | Petite |
| 2007/0239317 A1 | 10/2007 | Bogolea |
| 2007/0286210 A1 | 12/2007 | Gutt |
| 2007/0286369 A1 | 12/2007 | Gutt |
| 2007/0293990 A1 | 12/2007 | Alexanain |
| 2008/0027586 A1 | 1/2008 | Hern |
| 2008/0051036 A1 | 2/2008 | Vaswani |
| 2008/0097653 A1 | 4/2008 | Kaprielian |
| 2008/0119948 A1 | 5/2008 | O'Connor |
| 2008/0136620 A1 | 6/2008 | Lee |
| 2008/0147205 A1 | 6/2008 | Ollis |
| 2008/0157995 A1 | 7/2008 | Crist |
| 2008/0180240 A1 | 7/2008 | Raji |
| 2008/0183842 A1 | 7/2008 | Raji |
| 2008/0199359 A1 | 8/2008 | Davis |
| 2009/0006617 A1 | 1/2009 | Petite |
| 2009/0007706 A1 | 1/2009 | Hitt |
| 2009/0068947 A1 | 3/2009 | Petite |
| 2009/0094097 A1 | 4/2009 | Gardenswartz |
| 2009/0096605 A1 | 4/2009 | Petite |
| 2009/0099701 A1 | 4/2009 | Li |
| 2009/0145974 A1 | 6/2009 | Fekete |
| 2009/0150001 A1 | 6/2009 | Fekete |
| 2009/0150002 A1 | 6/2009 | Fekete |

(56) References Cited

U.S. PATENT DOCUMENTS

| | | |
|---|---|---|
| 2009/0168678 A1 | 7/2009 | Han |
| 2009/0177330 A1 | 7/2009 | Carl |
| 2009/0204265 A1 | 8/2009 | Hackett |
| 2009/0215424 A1 | 8/2009 | Petite |
| 2009/0216345 A1 | 8/2009 | Christfort |
| 2009/0217189 A1 | 8/2009 | Martin |
| 2009/0217194 A1 | 8/2009 | Martin |
| 2009/0223128 A1 | 9/2009 | Kuschak |
| 2009/0243840 A1 | 10/2009 | Petite |
| 2009/0276102 A1 | 11/2009 | Smith |
| 2009/0277506 A1 | 11/2009 | Bradbury |
| 2009/0281672 A1 | 11/2009 | Pourzia |
| 2009/0302870 A1 | 12/2009 | Paterson |
| 2009/0326723 A1 | 12/2009 | Moore |
| 2009/0328176 A1 | 12/2009 | Martin |
| 2010/0038440 A1 | 2/2010 | Ersavas |
| 2010/0082744 A1 | 4/2010 | Raji |
| 2010/0095111 A1 | 4/2010 | Gutt |
| 2010/0095369 A1 | 4/2010 | Gutt |
| 2010/0109685 A1 | 5/2010 | Morton |
| 2010/0147389 A1 | 6/2010 | Blanchard |
| 2010/0152909 A1 | 6/2010 | Hitt |
| 2010/0179701 A1 | 7/2010 | Gilbert |
| 2010/0194582 A1 | 8/2010 | Petite |
| 2010/0198712 A1 | 8/2010 | Benisti |
| 2010/0222932 A1 | 9/2010 | O'Connor |
| 2010/0250054 A1 | 9/2010 | Petite |
| 2010/0251807 A1 | 10/2010 | Morton |
| 2010/0256827 A1 | 10/2010 | Bragg |
| 2010/0265909 A1 | 10/2010 | Petite |
| 2010/0289411 A1 | 11/2010 | Smits |
| 2010/0312881 A1 | 12/2010 | Davis |
| 2010/0324987 A1 | 12/2010 | Benisti |
| 2010/0325005 A1 | 12/2010 | Benisti |
| 2011/0035059 A1 | 2/2011 | Ersavas |
| 2011/0043230 A1 | 2/2011 | Morton |
| 2011/0093123 A1 | 4/2011 | Alexanian |
| 2011/0111700 A1 | 5/2011 | Hackett |
| 2011/0190947 A1 | 8/2011 | Savelle |
| 2011/0190948 A1 | 8/2011 | Fekete |
| 2011/0212700 A1 | 9/2011 | Petite |
| 2011/0238228 A1 | 9/2011 | Woytowitz |
| 2011/0264324 A1 | 10/2011 | Petite |
| 2011/0270448 A1 | 11/2011 | Kantor |
| 2011/0301767 A1 | 12/2011 | Alexanian |
| 2011/0309953 A1 | 12/2011 | Petite |
| 2011/0310929 A1 | 12/2011 | Petite |
| 2011/0320050 A1 | 12/2011 | Petite |
| 2012/0041606 A1 | 2/2012 | Standerfer |
| 2012/0072036 A1 | 3/2012 | Piper |
| 2012/0072037 A1 | 3/2012 | Alexanian |
| 2012/0075092 A1 | 3/2012 | Petite |
| 2012/0078425 A1 | 3/2012 | Gardenswartz |
| 2012/0084115 A1 | 4/2012 | Cline |
| 2012/0092154 A1 | 4/2012 | Petite |
| 2012/0095604 A1 | 4/2012 | Alexanian |
| 2012/0109387 A1 | 5/2012 | Martin |
| 2012/0191261 A1 | 7/2012 | Nickerson |
| 2012/0203383 A1 | 8/2012 | Holindrake |
| 2012/0214532 A1 | 8/2012 | Petite |
| 2012/0221154 A1 | 8/2012 | Runge |
| 2012/0221718 A1 | 8/2012 | Imes |
| 2012/0239807 A1 | 9/2012 | Davis |
| 2012/0239808 A1 | 9/2012 | Davis |
| 2012/0253529 A1 | 10/2012 | Carlson |
| 2012/0266095 A1 | 10/2012 | Killian |
| 2012/0273704 A1 | 11/2012 | O'Connor |
| 2012/0290139 A1 | 11/2012 | Brundisini |
| 2012/0290140 A1 | 11/2012 | Groeneveld |
| 2012/0303168 A1 | 11/2012 | Halahan |
| 2013/0048746 A1 | 2/2013 | Littrell |
| 2013/0085619 A1 | 4/2013 | Howard |
| 2013/0110293 A1 | 5/2013 | Illig |
| 2013/0116837 A1 | 5/2013 | Malaugh |
| 2013/0131874 A1 | 5/2013 | Shupe |
| 2013/0162390 A1 | 6/2013 | Ersavas |
| 2013/0190934 A1 | 7/2013 | Holindrake |
| 2013/0207771 A1 | 8/2013 | Ersavas |
| 2013/0226357 A1 | 8/2013 | Ersavas |
| 2013/0274932 A1 | 10/2013 | Curren |
| 2013/0310992 A1 | 11/2013 | Larsen |
| 2013/0318231 A1 | 11/2013 | Raji |
| 2014/0005810 A1 | 1/2014 | Frei |
| 2014/0005843 A1 | 1/2014 | Thomas |
| 2014/0005851 A1 | 1/2014 | Frei |
| 2014/0006506 A1 | 1/2014 | Frei |
| 2014/0018965 A1 | 1/2014 | Pearson |
| 2014/0039696 A1 | 2/2014 | Andrews |
| 2014/0081471 A1 | 3/2014 | Woytowitz |
| 2014/0088770 A1 | 3/2014 | Masters |
| 2014/0129039 A1 | 5/2014 | Olive-Chahinian |
| 2014/0143397 A1 | 5/2014 | Gutt |
| 2014/0172180 A1 | 6/2014 | Woytowitz |
| 2014/0222223 A1 | 8/2014 | Horton |
| 2014/0229024 A1 | 8/2014 | Wang |
| 2014/0236868 A1 | 8/2014 | Cook |
| 2014/0245160 A1 | 8/2014 | Bauer |
| 2016/0057949 A1* | 3/2016 | Williams ............ A01G 25/167 700/275 |
| 2016/0135389 A1 | 5/2016 | Ersavas |
| 2017/0081028 A1 | 3/2017 | Jones |
| 2021/0360884 A1 | 11/2021 | Woytowitz |
| 2022/0012823 A1 | 1/2022 | Klein |

FOREIGN PATENT DOCUMENTS

| | | |
|---|---|---|
| ES | 2209614 A1 | 6/2004 |
| WO | 1999039567 | 8/1999 |
| WO | 0235193 A2 | 5/2002 |
| WO | 2007104152 A2 | 9/2007 |
| WO | 2009132425 A1 | 11/2009 |
| WO | 2010019109 | 2/2010 |

OTHER PUBLICATIONS

U.S. Appl. No. 13/844,304, filed Mar. 15, 2013, Ersavas.

'PureSense on-line help', https://www.pserm.com/IrrigationManagerHelp/PureSense_Irrigation_Manager.htm, Mar. 24, 2010.

Akyildiz et al., "Wireless sensor networks: a survey," Computer Networks 38 (2002) 393-422.

Intel, "Instrumenting the World: An Introduction to Wireless Sensor Networks," Version 1, Feb. 2004.

Li, "Study on Precision Agriculture Monitoring Framework Based on WSN," Anti-counterfeiting, Security, and Identification, 2nd International Conference, 2008, 182-185.

Nokia, "Machine-to-Machine," White Paper (2004).

PCT; App. No. PCT/TR2009/000103; International Report on Patentability dated Feb. 24, 2011.

PCT; App. No. PCT/TR2009/000103; International Search Report dated Feb. 1, 2010.

PCT; App. No. PCT/TR2009/000103; Written Opinion dated Feb. 12, 2011.

USPTO; U.S. Appl. No. 13/844,304; Office Action dated Oct. 16, 2015.

USPTO; U.S. Appl. No. 13/151,269; Office Action dated Jan. 18, 2012.

USPTO; U.S. Appl. No. 13/532,557; Notice of Allowance dated Apr. 4, 2017.

USPTO; U.S. Appl. No. 13/532,557; Notice of Allowance dated Jul. 31, 2017.

USPTO; U.S. Appl. No. 13/532,557; Office Action dated Sep. 9, 2016.

USPTO; U.S. Appl. No. 13/532,557; Office Action dated Jan. 2, 2015.

USPTO; U.S. Appl. No. 13/532,557; Office Action dated Oct. 15, 2015.

USPTO; U.S. Appl. No. 13/844,304; Notice of Allowance dated Mar. 6, 2017.

(56) References Cited

OTHER PUBLICATIONS

USPTO; U.S. Appl. No. 13/844,304; Office Action dated Oct. 3, 2016.
USPTO; U.S. Appl. No. 13/844,304; Office Action dated Dec. 30, 2014.
USPTO; U.S. Appl. No. 15/616,736; Notice of Allowance dated Jun. 24, 2021.
USPTO; U.S. Appl. No. 15/616,736; Office Action dated Feb. 1, 2021.
USPTO; U.S. Appl. No. 15/616,736; Office Action dated Feb. 20, 2020.
USPTO: U.S. Appl. No. 15/616,736; Office Action dated May 29, 2019.
Zigbee, 'Zigbee Resource Guide—Spring 2008,' 2008, pp. 28-31, Fourier Systems Ltd., New Albany, IN.
Zigbee; 'Zigbee Resource Guide—Spring 2008;' 2008; pp. 1-32; Fourier Systems Ltd.; New Albany, IN.

* cited by examiner

Login

Main: Dashboard

Menu: Data->Crop Health Monitor

Menu: Data->Degree Days Calculation

Menu: Data->Repair Readings

Menu: Data->Notepad

Menu: Data->Maps

Figure 11: Control Process Flow

| Irrigation Monitor Portlet |||||
|---|---|---|---|---|
| Soil Status ||||||
| Soil Status | Station | Water Bank || Est. Next Irrig. |
| ● | [1] Del Rey | 85% || 3.2 days (Fri, April 23) |
| ● | [2] El Dorado | 90% || 8.5 days (Tue, May 31) |
| ● | [3] ZoneA | 65% || 3 day (Mon, Apr. 22) |
| ● | [4] ZoneB | 45% || 1 day (Tue, Apr. 31) |
| Irrigation Status |||||
| Status | Valve/Switch | Last Irrigation | Duration | Amount |
| ON | [1] Del Rey | 2011-06-11 9:30am | 110 mm | 1200 gal |
| ON | [2] El Dorado | 2011-06-11 9:40am | 100 mm | 1000 gal |
| OFF | [3] ZoneA | 2011-06-07 7:00pm | 130 mm | 1300 gal |
| OFF | [4] ZoneB | 2011-06-10 9:30am | 210 mm | 2100 gal |

FIG. 46

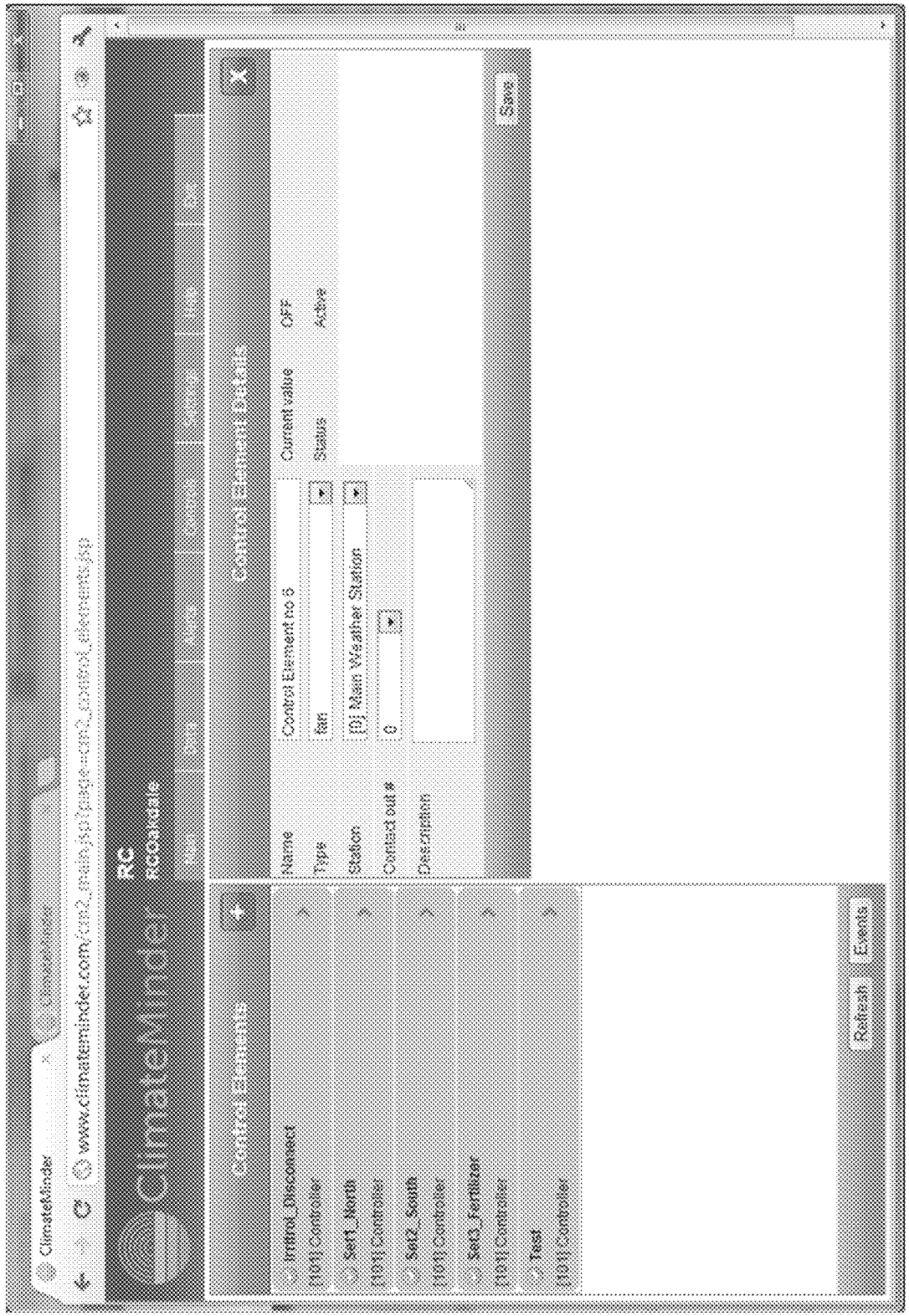
FIG. 47: Control Element Definition Page

FIG. 48: Control Element Details Page (showing log of control events on this particular control element)

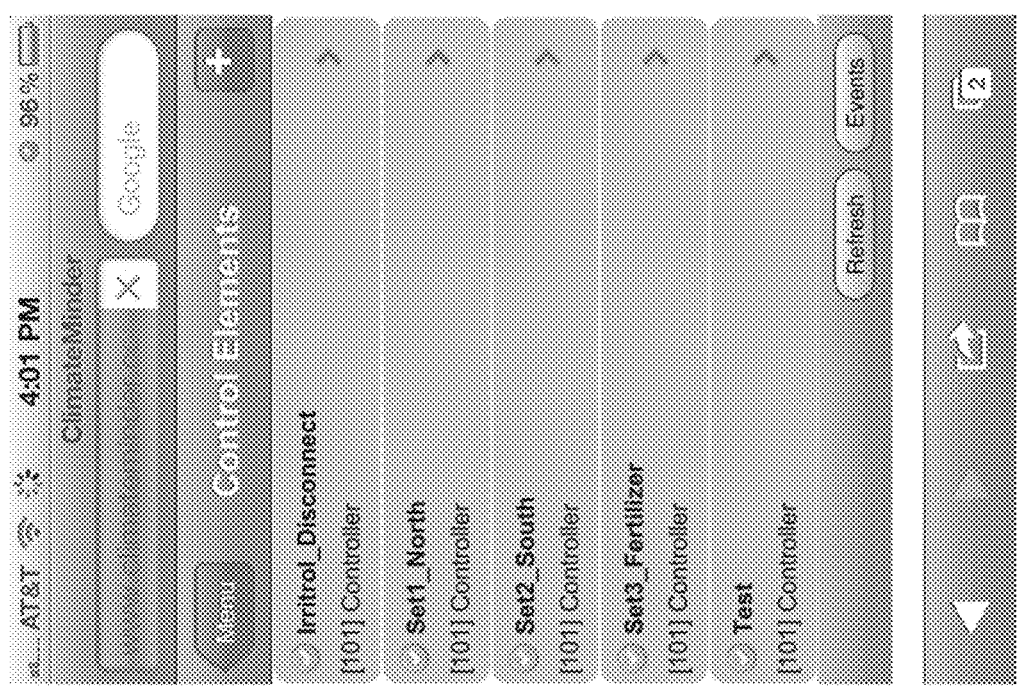
FIG. 49A : Control Element Page (Seen on a Mobile Device)
FIG. 49B : Control Element Page (Seen on a Mobile Device)

FIG. 50: Control Events Page

FIG. 51: Control Conditions Details Page

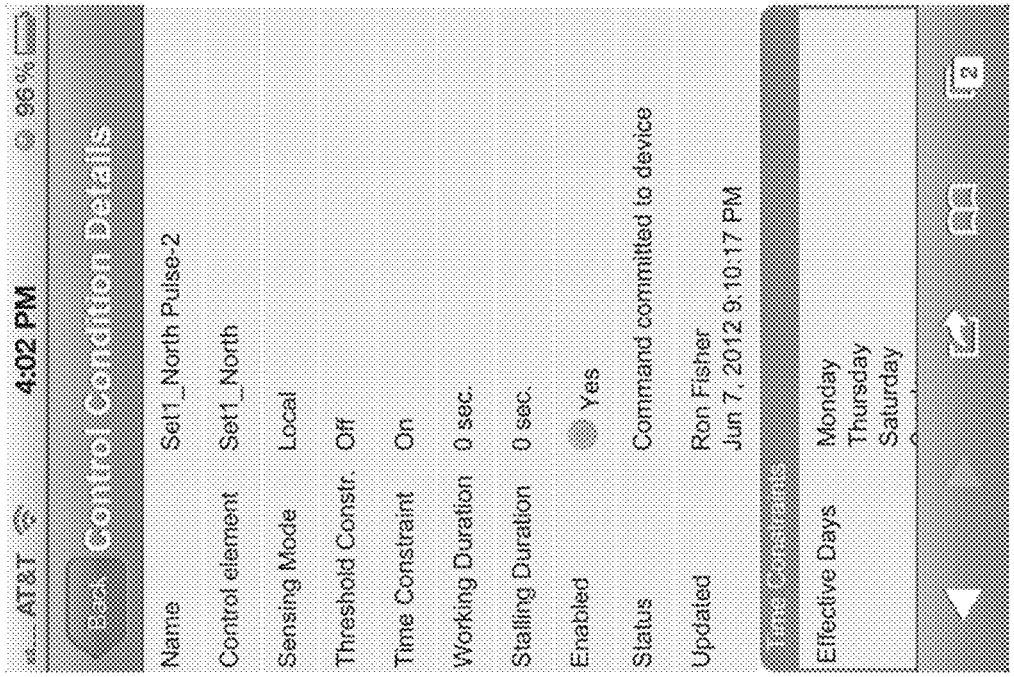
FIG. 52B: Control Conditions Page
(Seen on a Mobile Device)
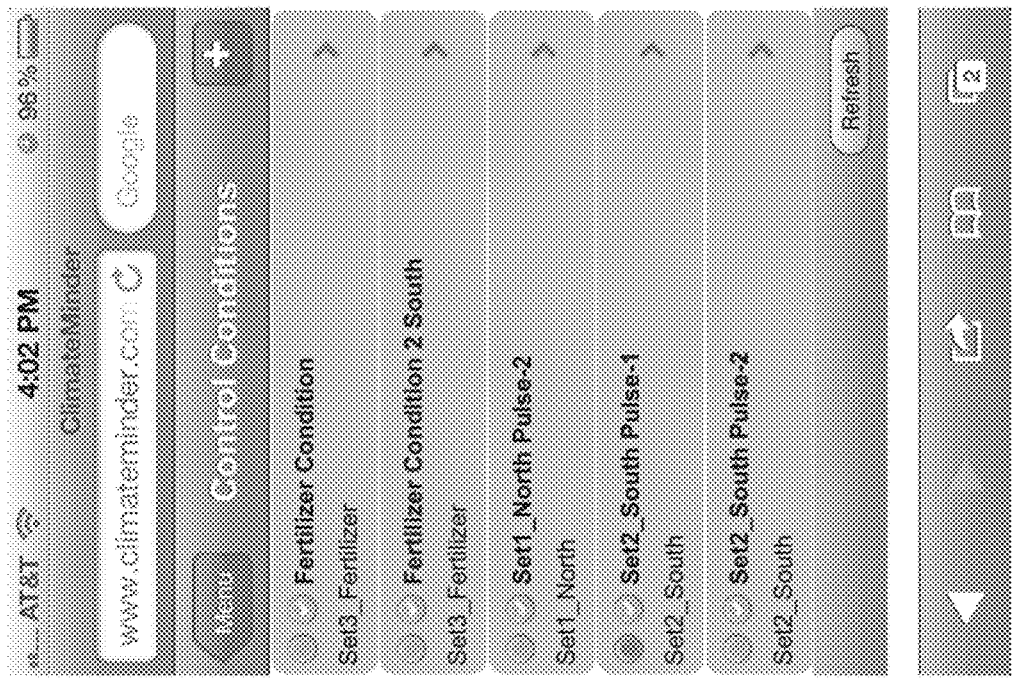
FIG. 52A: Control Conditions Page
(Seen on a Mobile Device)

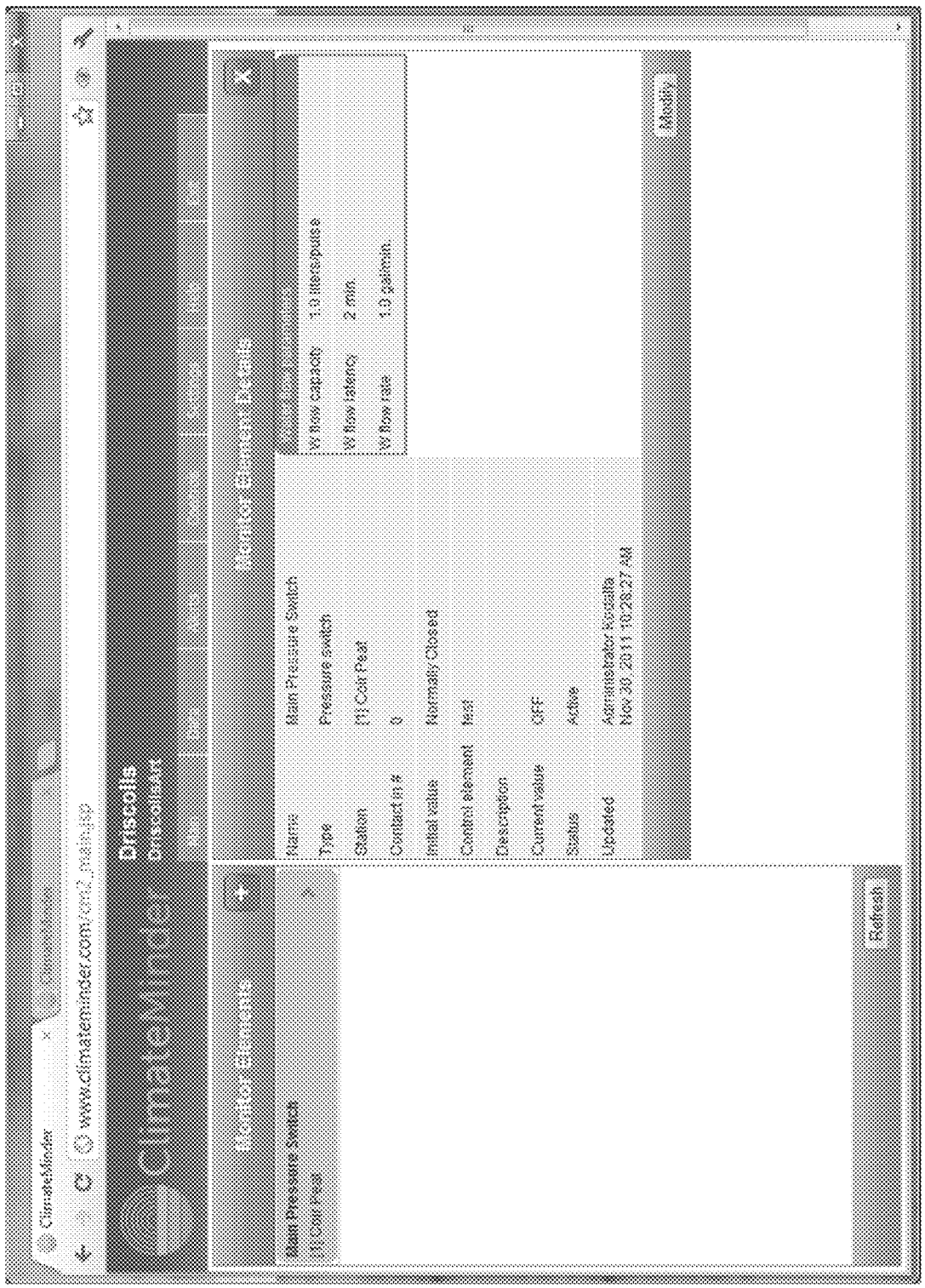
FIG. 53: Monitoring Element Details Page

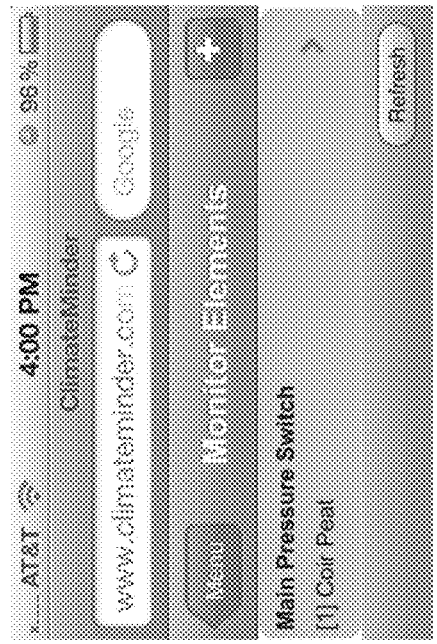
FIG. 54A: Monitoring Element Details Page
(Seen on a Mobile Device)
FIG. 54B: Monitoring Element Details Page
(Seen on a Mobile Device)

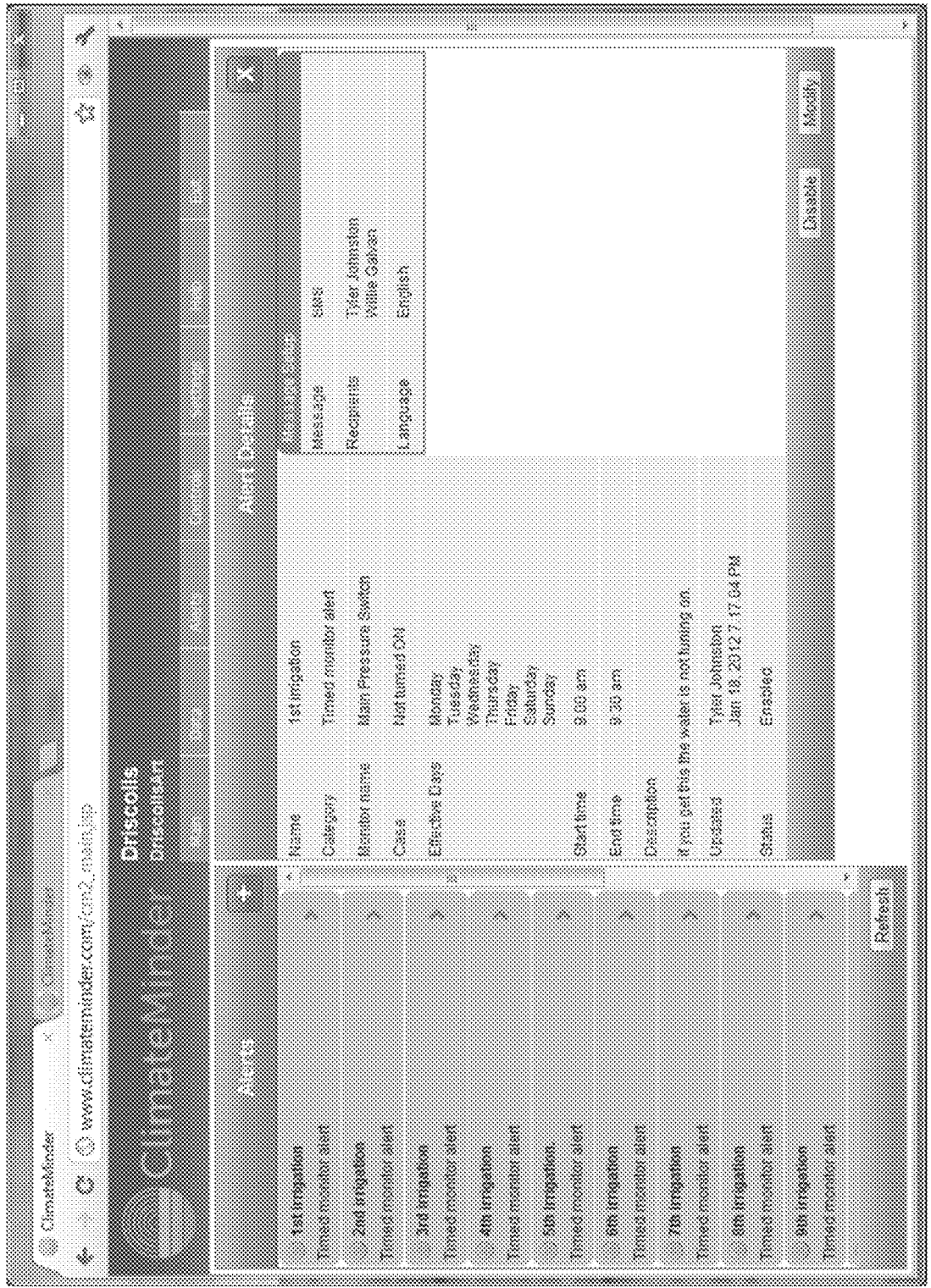
FIG. 55: Irrigation Alerts Details Page

FIG. 56A: Irrigation Alerts Details Page
(Seen on a Mobile Device)

FIG. 56B: Irrigation Alerts Details Page
(Seen on a Mobile Device)

FIG. 57: Dashboard with a Map View

FIG. 62 — 6200

| Current Weather Status | | 78 | 24 | 6 | NNE | 65 | 0.18 |
|---|---|---|---|---|---|---|---|
| Acme Field | North Blk | 78 | 24 | 6 | NNE | 65 | 0.18 |
| Acme Field | South Blk | 77 | 23 | 2 | NE | 66 | 0.17 |
| Acme Field | SS Blk | | | | | | |
| Acme Field | East Blk | | | | | | |
| Gandolf Ranch | Blk A2 | | | | | | |
| Gandolf Ranch | Blk A3 | | | | | | |
| Gandolf Ranch | Blk A4 | | | | | | |
| Rigley Field | Blk 1 | | | | | | |
| Rigley Field | Blk 2 | | | | | | |
| Rigley Field | Blk 3 | | | | | | |
| Rigley Field | Blk 4 | | | | | | |
| Rigley Field | Blk 5 | | | | | | |

FIG. 63 — 6300

| Flow Meter Readings | | | 1657 | 22,363 | 22,365 | 330,759 |
|---|---|---|---|---|---|---|
| Acme Field | North Blk | | 1657 | 22,363 | 22,365 | 330,759 |
| Acme Field | South Blk | | | | | |
| Acme Field | SS Blk | | | | | |
| Acme Field | East Blk | | | | | |
| Gandolf Ranch | Blk A2 | | | | | |
| Gandolf Ranch | Blk A3 | | | | | |
| Gandolf Ranch | Blk A4 | | | | | |
| Rigley Field | Blk 1 | | | | | |
| Rigley Field | Blk 2 | | | | | |
| Rigley Field | Blk 3 | | | | | |
| Rigley Field | Blk 4 | | | | | |
| Rigley Field | Blk 5 | | | | | |

METHODS AND SYSTEMS FOR IRRIGATION AND CLIMATE CONTROL

CROSS REFERENCE TO RELATED APPLICATIONS

This application is a continuation of U.S. patent application Ser. No. 15/616,736 filed Jun. 7, 2017 and entitled METHODS AND SYSTEMS FOR IRRIGATION AND CLIMATE CONTROL, which is a continuation of U.S. patent application Ser. No. 13/844,304 filed Mar. 15, 2013 and entitled METHODS AND SYSTEMS FOR IRRIGATION AND CLIMATE CONTROL, which is a continuation-in-part of U.S. patent application Ser. No. 13/532,557 filed Jun. 25, 2012 and entitled METHODS AND SYSTEMS FOR IRRIGATION AND CLIMATE CONTROL, which application claims priority from U.S. Provisional Patent Application No. 61/500,392 filed on Jun. 23, 2011 and entitled METHODS AND SYSTEMS FOR IRRIGATION AND CLIMATE CONTROL, all of which are hereby incorporated by reference.

BACKGROUND

The present application relates generally to methods and systems for monitoring and controlling irrigation and climate conditions in landscapes (such as, e.g., municipal parks, gardens, and sports fields) and agricultural environments (such as, e.g., open agricultural fields, greenhouses, and other sites growing crops).

BRIEF SUMMARY

A web-based remote monitoring and control system is provided in accordance with one or more embodiments for monitoring environmental, soil, or climate conditions and/or controlling irrigation or climate control systems at an agricultural or landscape site. In some embodiments, at least one control and/or sensor node or other control and/or sensor device, controller or element monitors environmental, soil, or climate conditions and/or controls one or more irrigation or climate control systems at the site. The remote monitoring and control system communicates with the node/s over a communications network to receive data from and control operation of the node/s. The system can be accessed by personal computers, mobile devices, and other client devices operated by end-users. These devices communicate over a communications network with the system. The system transmits data to and receives remote control commands or queries from end-users.

Users can remotely control irrigation or climate control systems at one or more agricultural or landscape sites for which the users have authorization or access to do so. The system provides a user interface displaying the information for one or more sites by customizable windows (portlets on a dashboard) in one page (a dashboard) or at multiple respective pages. The system provides quick access to charts, reports, maps and gives the end user flexibility with various add/remove/edit options.

Various embodiments of the invention are provided in the following detailed description. As will be realized, the invention is capable of other and different embodiments, and its several details may be capable of modifications in various respects, all without departing from the invention. Accordingly, the drawings and description are to be regarded as illustrative in nature and not in a restrictive or limiting sense, with the scope of the application being indicated in the claims.

BRIEF DESCRIPTION OF THE DRAWINGS

FIGS. 13-57 are exemplary screenshots illustrating various aspects of the remote monitoring and control system user interface in accordance with various embodiments.

FIGS. 59-63 are exemplary screenshots illustrating various aspects of the remote monitoring and control system user interface relating to the display of information for multiple sites in accordance with various embodiments.

DETAILED DESCRIPTION

In accordance with one or more embodiments, a web-based remote monitoring and control system is provided for monitoring environmental, soil, or climate conditions and controlling irrigation or climate control systems at an agricultural or landscape site. In some embodiments, the system includes one or more devices or nodes at each site for monitoring environmental, soil, or climate conditions and/or for controlling one or more irrigation or climate control systems at the site. In some embodiments, the system includes a wireless sensor network at each site including a plurality of sensor and/or control nodes for monitoring environmental, soil, or climate conditions and and/or controlling one or more irrigation or climate control systems at the site. The remote monitoring and control system can be accessed by users operating client devices such as personal computers and mobile devices over a communications network. Users can use the system for receiving data from and transmitting remote control commands or queries to the system. The web-based remote monitoring and control system communicates with the local nodes, devices and/or local wireless network over a communications network. The system receives data from and controls operation of the nodes.

A web-based remote monitoring and control system user interface in accordance with one or more embodiments can include one or more of the following features:

Main Dashboard (containing summary information in portlets or windows)
  Quick access to the current site status (forecast, temperature, humidity, degree days etc.)
  Charts
  Crop health monitors
  Readings
  Events (e.g. control events)
  Alerts
  Pump status monitoring
  Farm management and information (e.g. budget and yield status)
  Soil nutrient status
  Irrigation status/activity (show flow status, show valve status)
  Notes
  Maps (shows irrigation zones, soil status with color indicators—e.g. blue for wet, red for dry and green for normal)
  Station/sensor status
More detailed information in respective pages, which can be accessed through the dashboard
  Data charts
  Crop health monitors
  Readings
  Event
  Alerts
  Pump status monitoring
  Farm management and information (e.g., budget and yield status)
  Soil nutrient status
  Irrigation status
  Reports
  Maps
  Degree Days
  Control Elements & Conditions
  Monitoring Elements & Irrigation Alerts
Switchable screen configuration:
  Mobile user interface
  Classic personal computer screen user interface It is understood that this is not intended to be an exhaustive listing of all possible windows and/or features and information displayable to users, as such will be implementation dependent.

Figure 1:
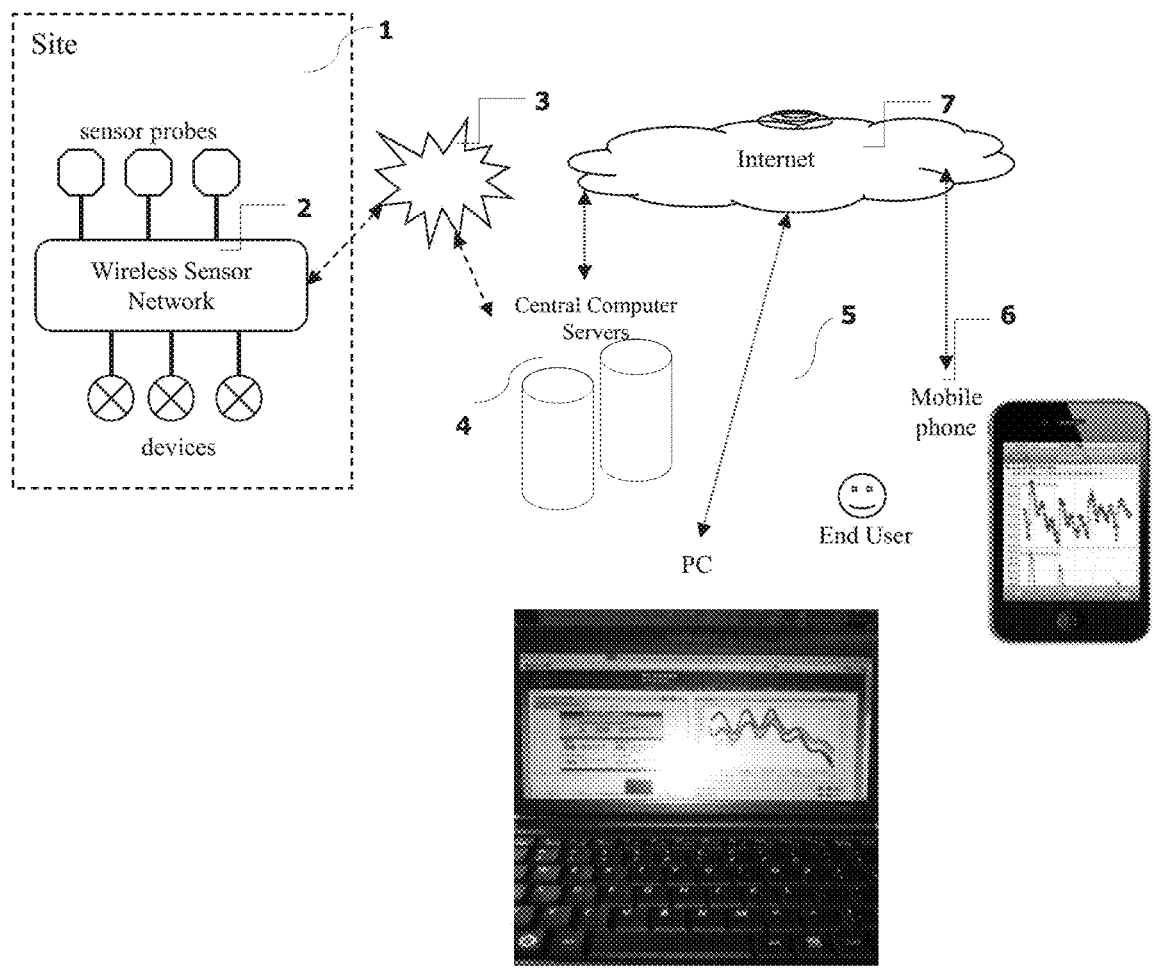
FIG. 1 is a schematic diagram illustrating a web-based remote monitoring and control system in accordance with one or more embodiments.
Figure 58:
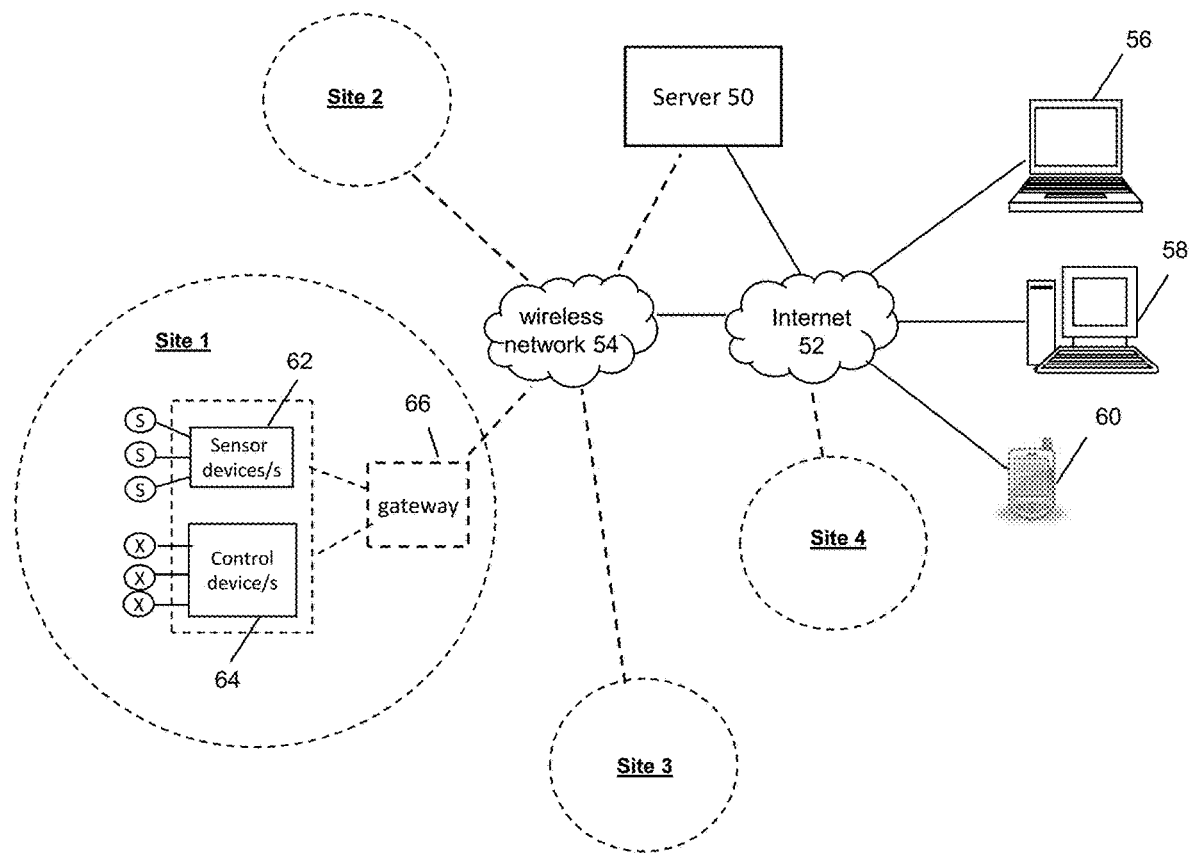
FIG. 58 is an exemplary system diagram of a web-based remote monitoring and/or control system in accordance with one or more embodiments.

FIG. 1 illustrates the architecture of an exemplary web-based remote climate monitoring and control system for an irrigation/climate control site (e.g., greenhouse, open field, or landscape) 1 in accordance with one or more embodiments. The system can be accessed by users using various client devices such as, e.g., a mobile device 6 or personal computer 5. In the illustrated embodiment, the system includes a wireless sensor network 2 having a plurality of sensor and/or control nodes installed in the site. The sensor network 2 includes sensor nodes, which form an ad-hoc (i.e., dynamic) wireless sensor network and monitor climate, environmental, and soil conditions, and to collect measurements. The sensor nodes send these measurements to a central computer server 4 through a communications network 3 such as a cellular network (e.g., GPRS, Edge, UMTS etc.) or a wireless wideband network (e.g., WiMAX). In other embodiments, the communications network includes a wireless wideband network, such as a satellite communications network. Users can communicate with the central server system 4 through a network such as the Internet 7 or a combination of networks, not only to gather the site information but also to configure the user interface according to the user settings stored on the server. FIG. 58 illustrates another embodiment of an exemplary web-based monitoring and/or control system.

In some embodiments, the wireless sensor network includes one or more general nodes or devices, such as one or more sensor devices and/or control devices, controllers or elements. At least one node is coupled to a sensor and receives sensor data. At least one node is coupled to and controls at least a portion of the irrigation or climate system, e.g., at least one node is coupled to an irrigation valve controlling the flow of water therethrough. In some cases, a given node is a control only node or the node is a sensor only node. In other cases, a given node is both a sensor and control node. It is understood that the number of nodes at a given site depends on the needs of the irrigation site, e.g., a given site may have 1-n nodes or devices, each having sensor and/or control functionality. Thus, in a general sense, the various methods and systems described herein are applicable to a variety of irrigation and/or climate monitoring and/or control systems, such that authorized users are provided remote access to information from the system/s and/or to remotely control the system/s via interaction with a configurable user interface provided by a server in communication with the local system/s. Typically, the server is coupled to a wide area network accessible by the remote users, e.g., coupled to the Internet. The server stores user information, user login and authorization information and system information for many irrigation and/or climate monitoring and/or control systems located at various sites. The server manages access to such sites allowing users only to get access to those systems and sites that the particular user is so authorized, and is not provided access to those systems and sites that the user particular user is not so authorized.

Figure 2:
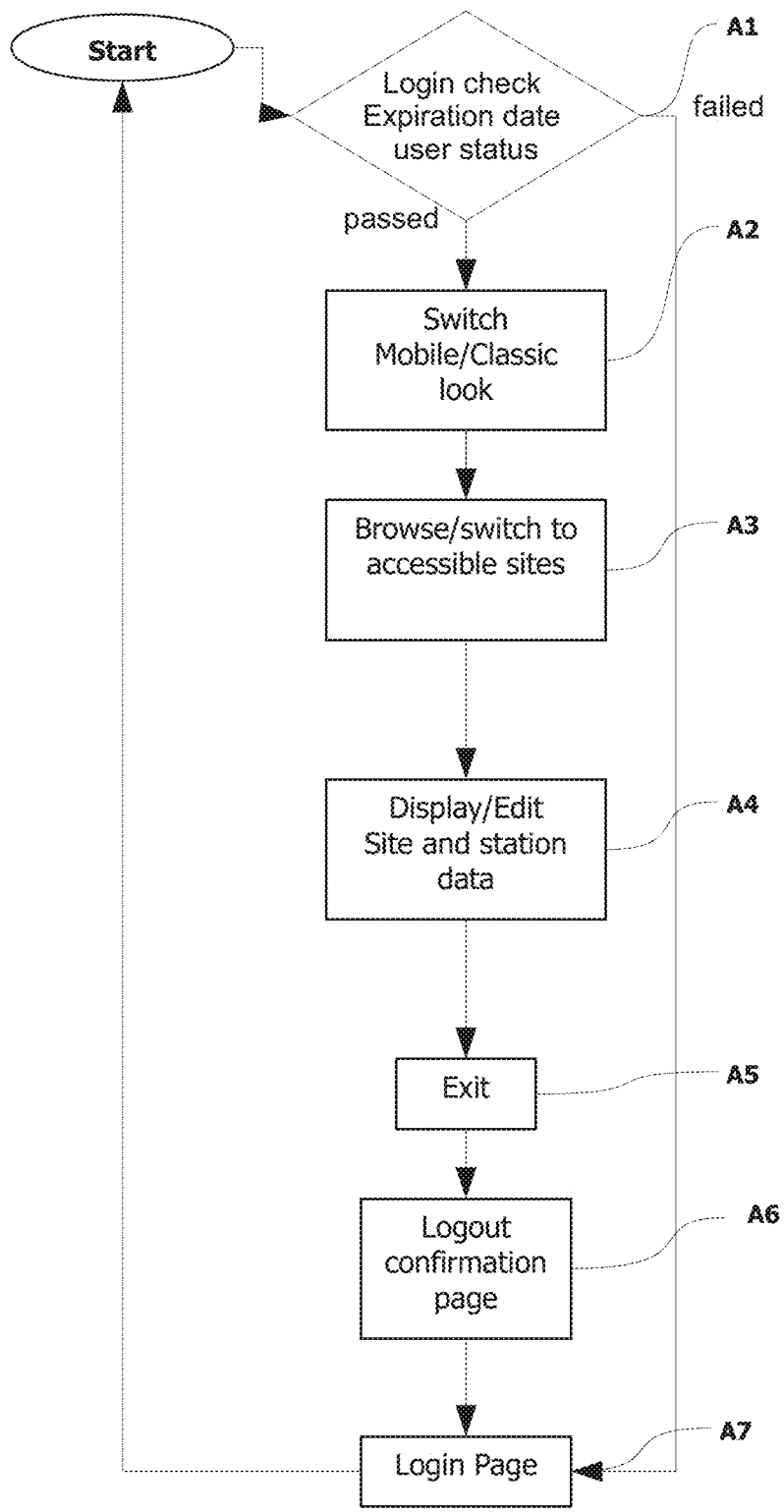
FIG. 2 is a flowchart illustrating an exemplary user login process flow in accordance with one or more embodiments.

FIG. 2 illustrates an exemplary end-user login flow to the web-based monitoring system. When the end user enters the username and password at the login page, a login check is performed on the server side, comparing with the information on the central database server as shown in step (A1). Login check can include: username and password match check, and user status check (active, inactive, blocked, expired). If the user is valid, the end-user can enter the system and display the accessible sites for that user by switching between sites as shown in step (A3). It is noted that in some embodiments, specifically referred to with references to FIGS. 58-63, users authorized to access multiple sites may not be required to switch between authorized sites (or otherwise log out of one site and log in to another site). The end-user can also switch between mobile and classic look of the pages as shown in step (A2). Users can display/change site/user data through main dashboard or at the respective pages as shown in step (A4). They can exit any time (A5), and after the logout confirmation page (A6) return to the login page (A7).

Figure 3:
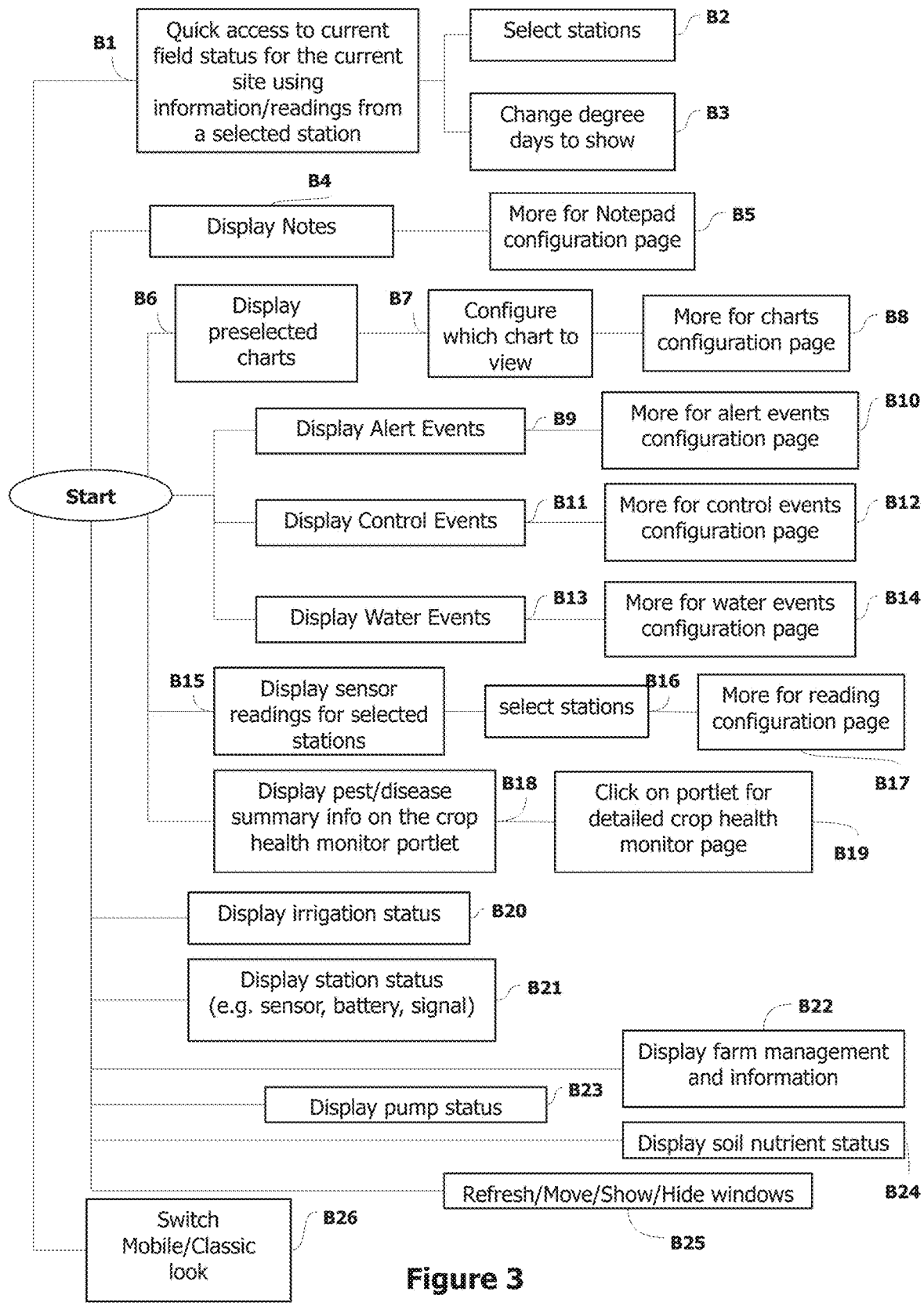
FIG. 3 is a flowchart illustrating an exemplary customizable dashboard page display/edit process flow in accordance with one or more embodiments.
Figure 6:
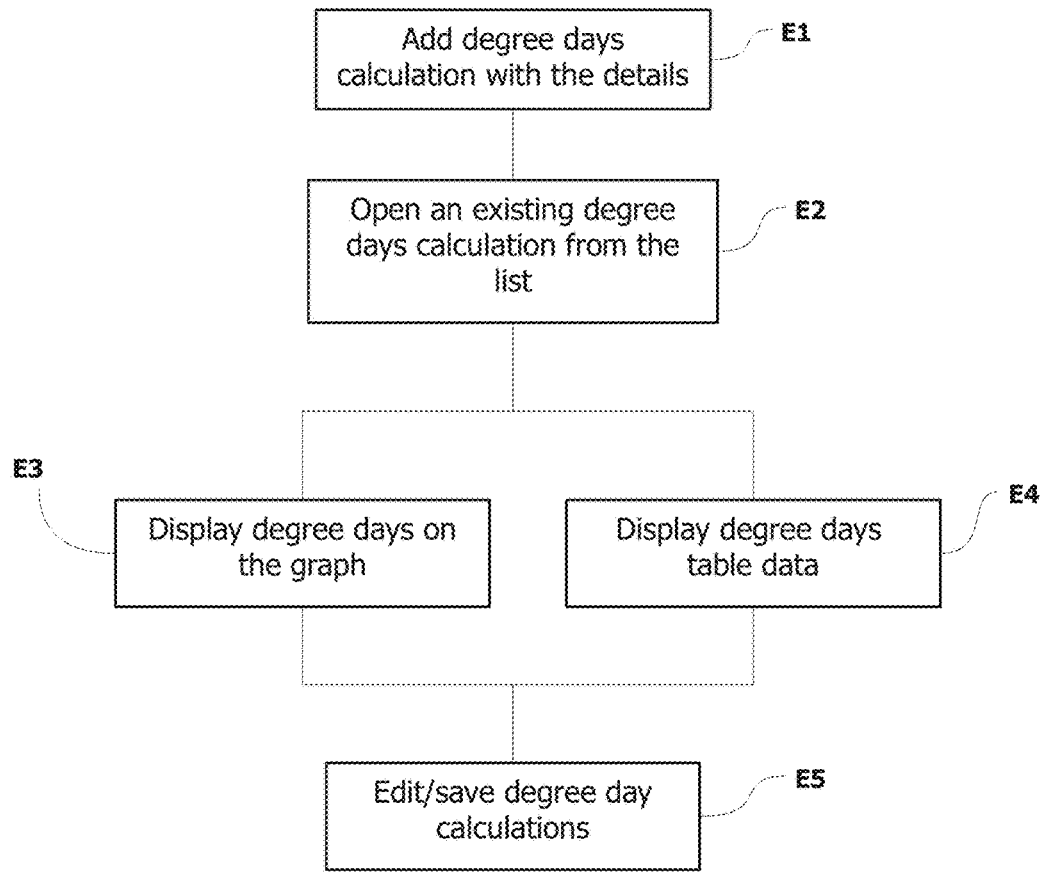
FIG. 6 is a flowchart illustrating an exemplary degree days calculation process flow in accordance with one or more embodiments.
Figure 13:
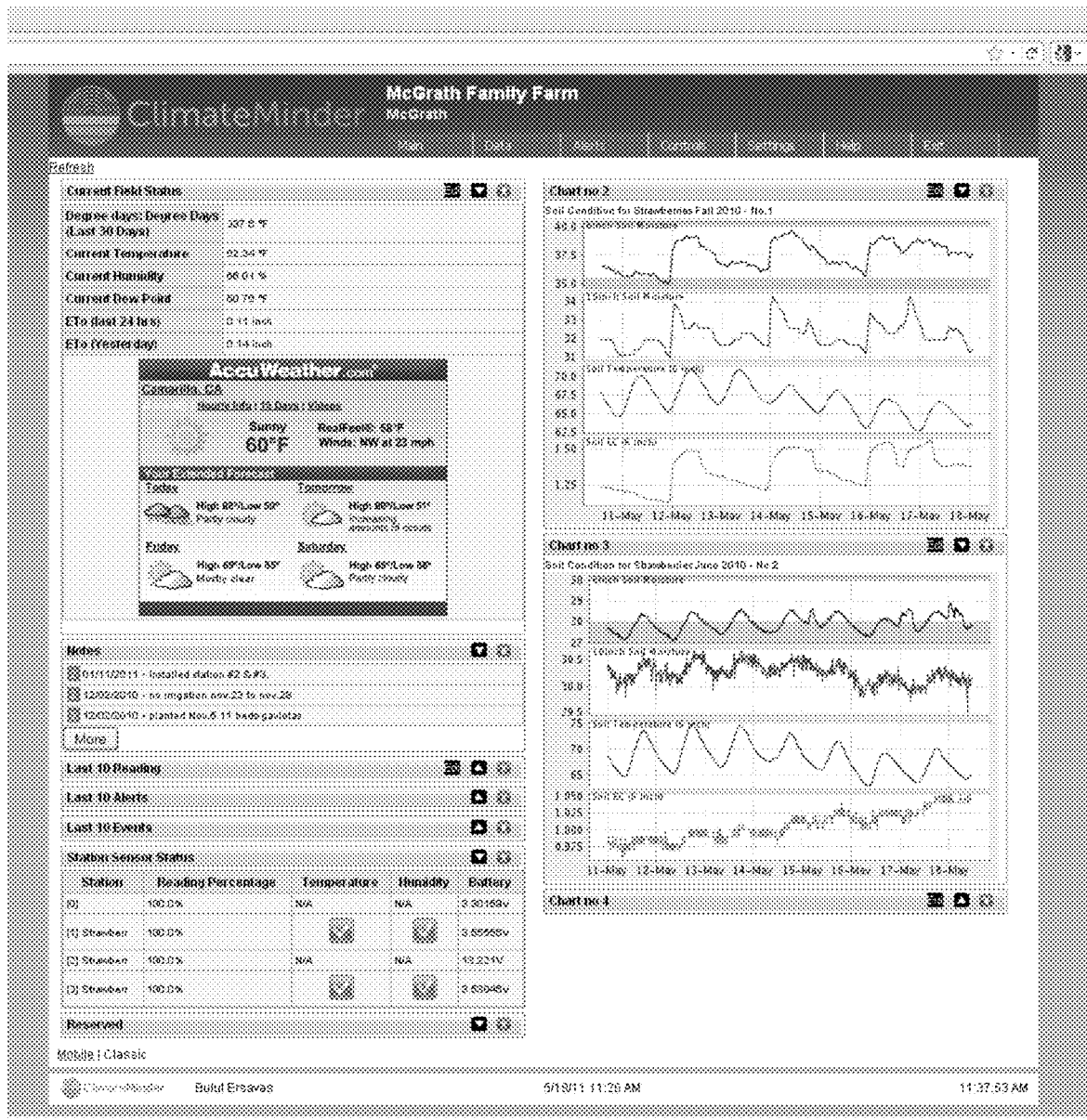
Figure 14:
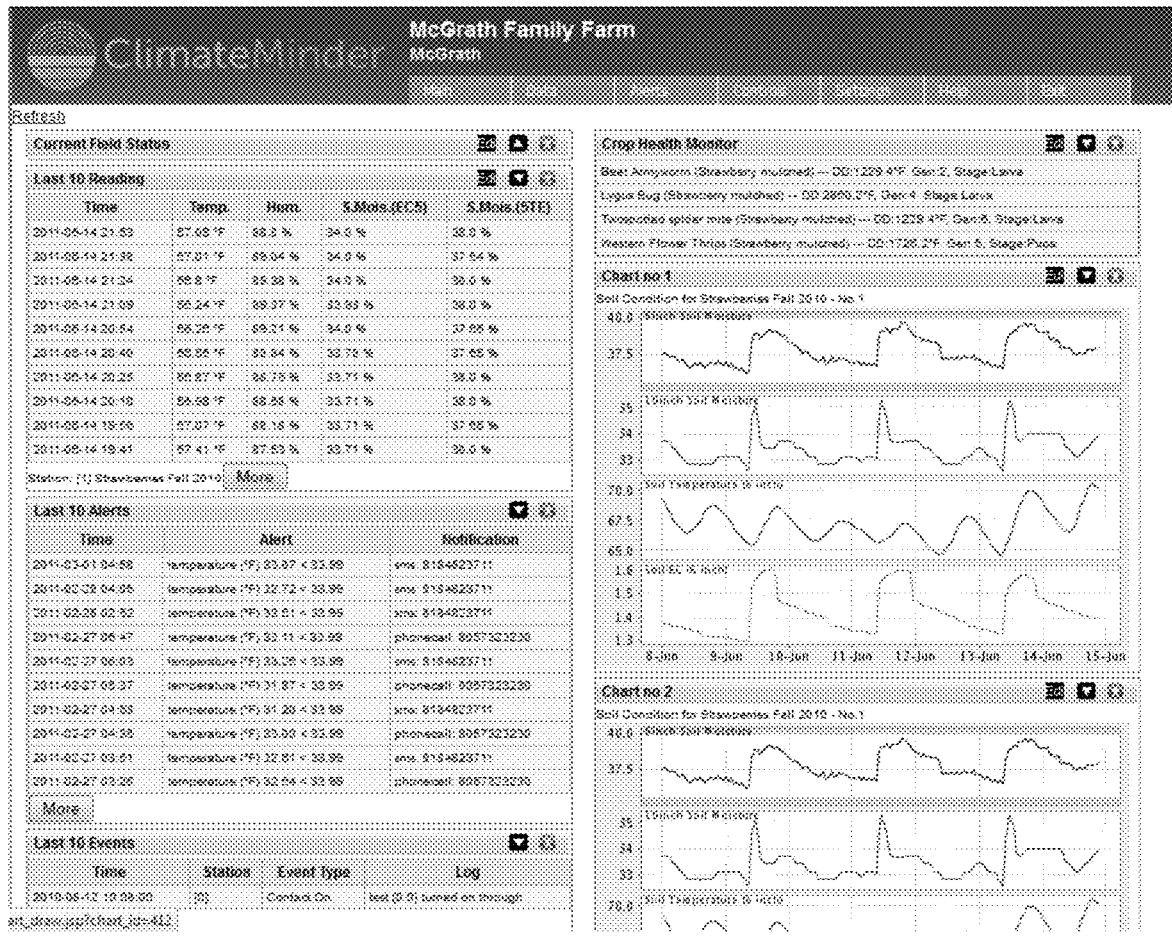
Figure 15:
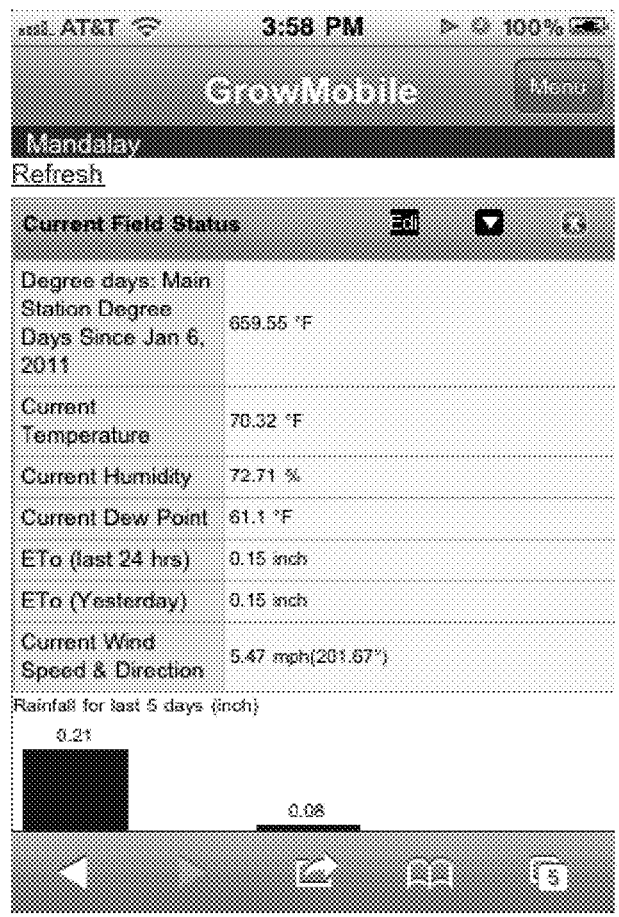
Figure 16:
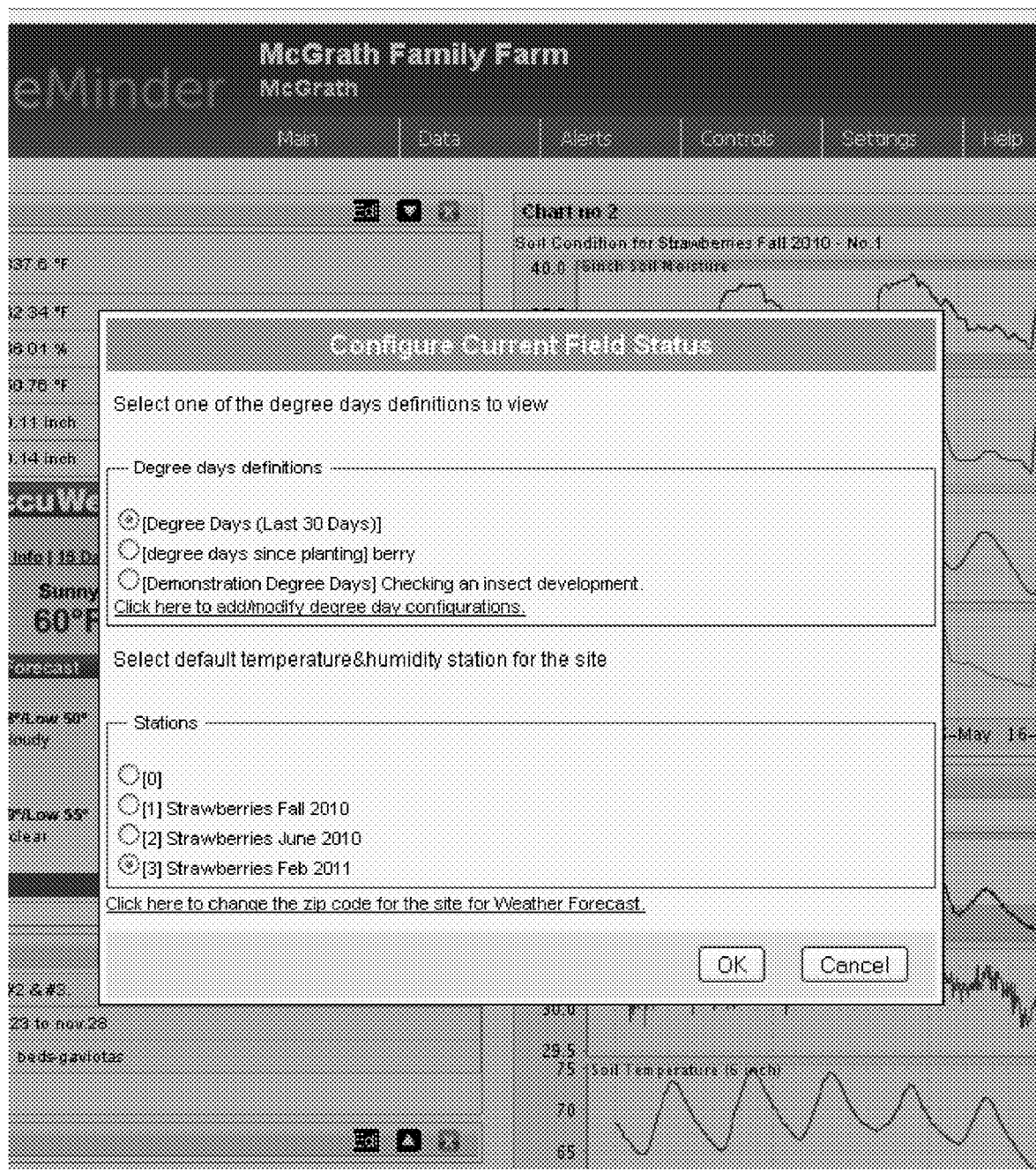

FIG. 3 illustrates an exemplary main dashboard page process flow for all users. This customized page includes user added charts, readings, events, alerts, field and sensor status windows. The current field status window (portlet)

gives the user quick access to the most important data from the site such as temperature, humidity, degree days, dew point, and ET (Evapotranspiration) values along with the live forecast info for that site by its zip code as shown in step (B1), FIG. 13, and mobile screen view FIG. 15 are exemplary dashboard screen shots. Users can display this portlet for the selected stations and degree days definitions as shown in steps (B2 and B3) and exemplary FIG. 16. Clicking on the degree days configuration link makes it very easy to access the details and will take the user to the degree days calculation page. All portlets can be minimized. Current field status portlet is minimized in FIG. 14. FIG. 6 describes the details for degree days calculation.

Figure 9:
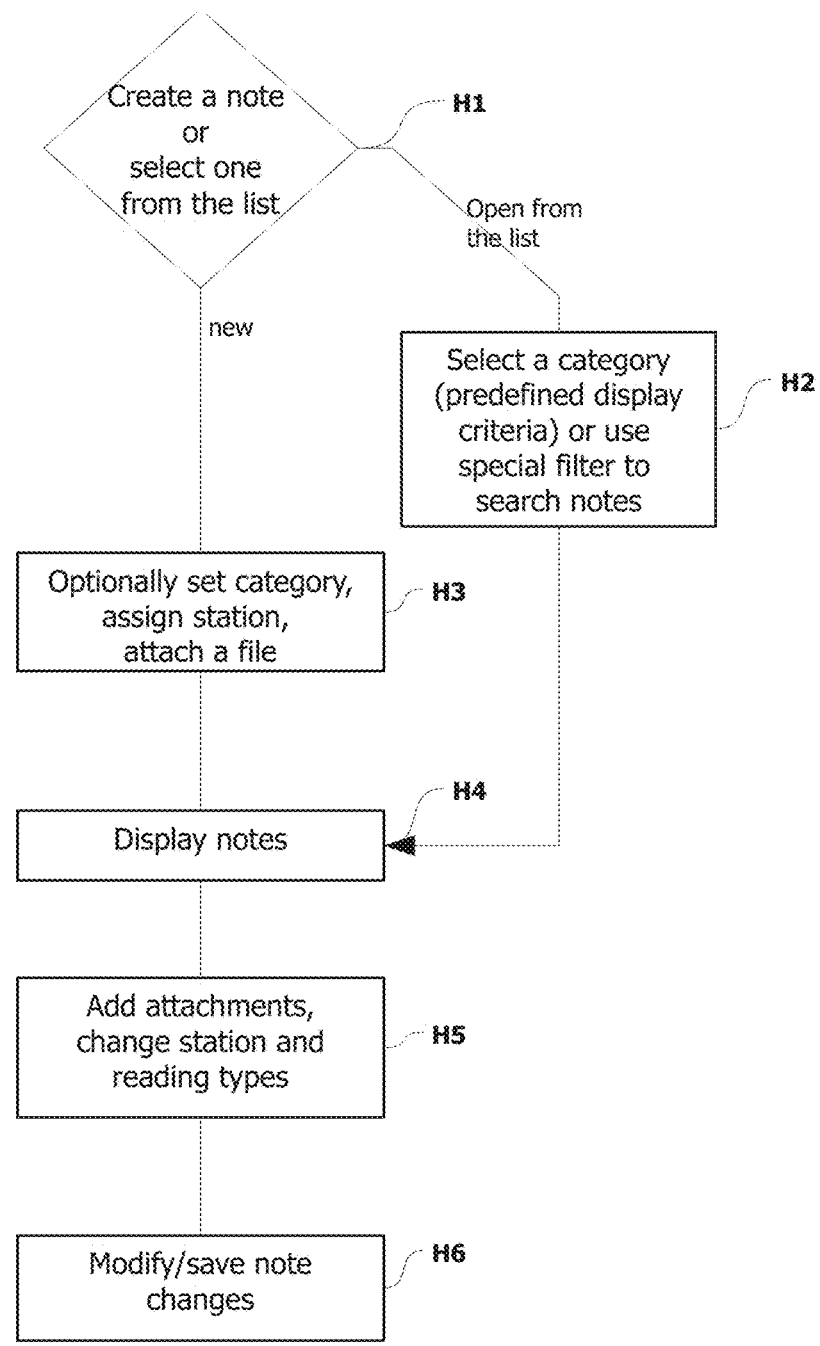
FIG. 9 is a flowchart illustrating an exemplary notepad usage process flow in accordance with one or more embodiments.
Figure 41:
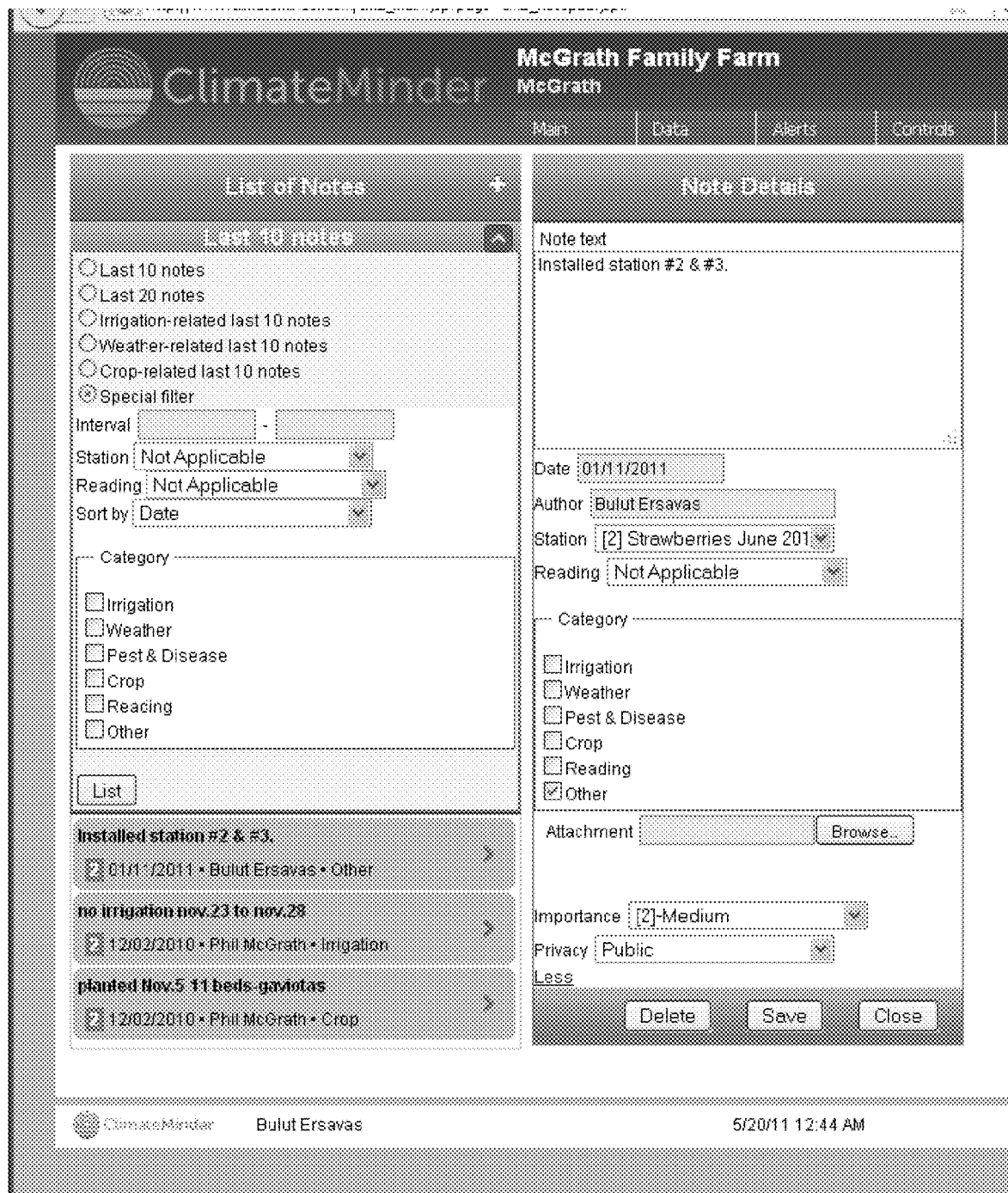

A Notes window shows the last edited notes by the users or the administrators for that site. Users can add or delete notes on the main page (dashboard) as shown in step (B4) and FIG. 13. Clicking on "More" button makes it very easy to access the note details and takes the user to the notepad as shown in step (B5) and exemplary FIG. 41. FIG. 9 describes the details for note creation and usage.

Figure 4:
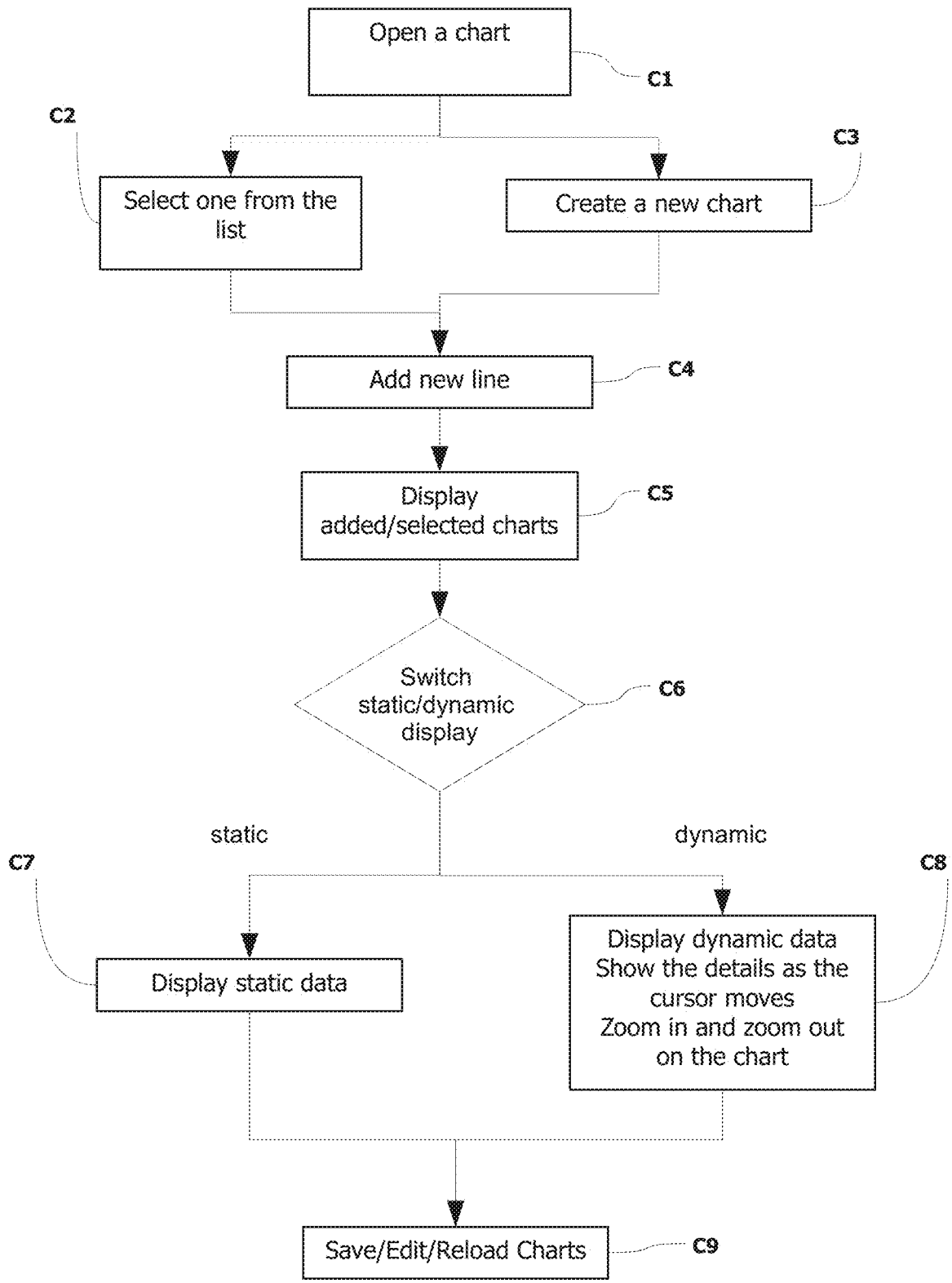
FIG. 4 is a flowchart illustrating an exemplary chart create/edit/display process flow in accordance with one or more embodiments.
Figure 17:
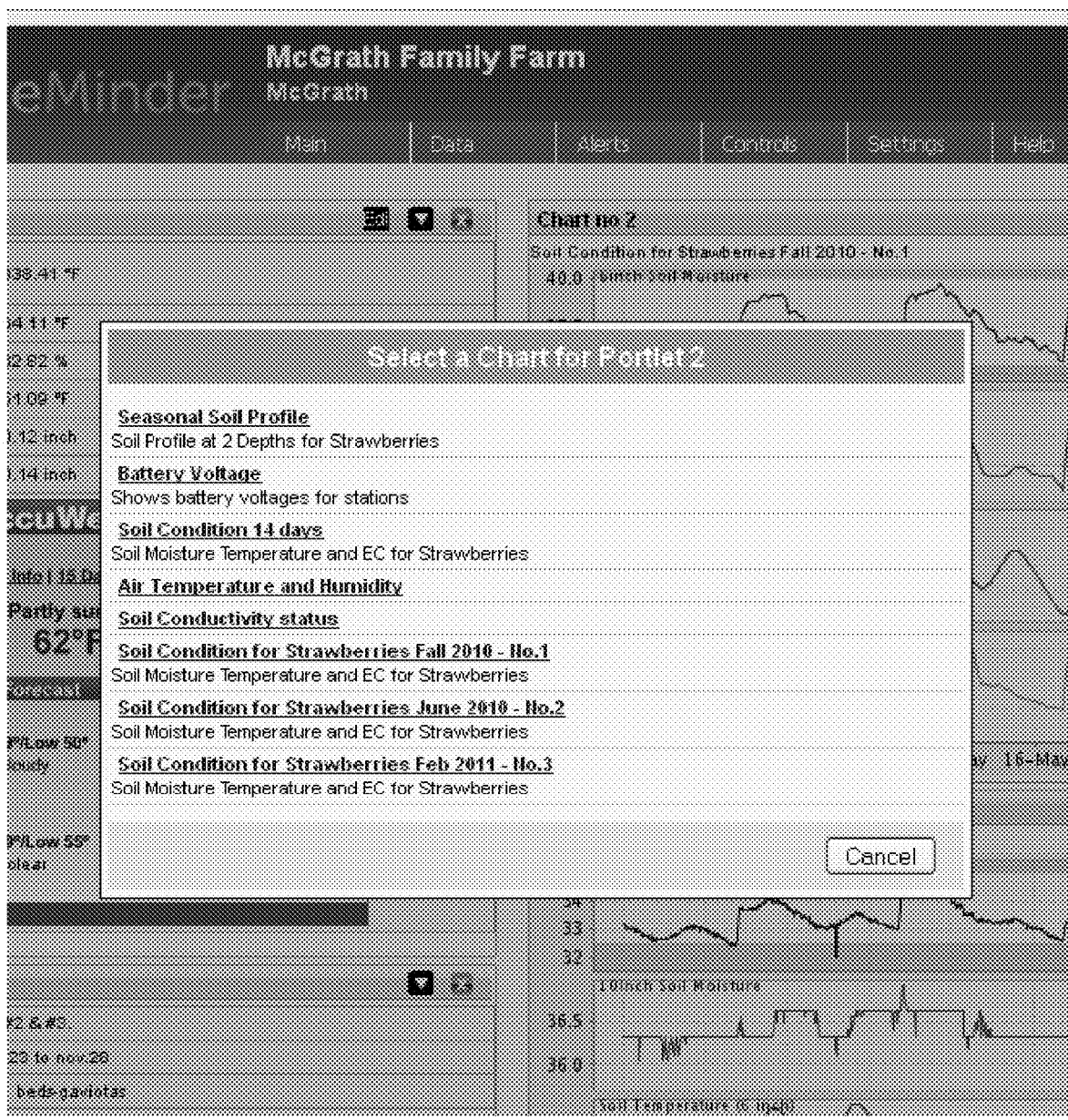

Users can add as many charts to the main page as they want as shown in step (B6) and FIG. 13 and FIG. 57. Clicking on edit lets the user add the predefined charts to the dashboard as shown in step (B7) and exemplary FIG. 17. Clicking on the charts makes it very easy to access chart details and takes the user to the charts page in static mode as shown in step (B8) and exemplary FIG. 19. FIG. 4 describes the details for charts.

Users can display last alert events, control events, and water events in respective windows as shown in steps (B9, B10, B11, B12, B13, B14) and FIG. 14. Clicking on "More" buttons takes the user to the respective event detail pages.

Last readings for selected stations can be viewed in another window as shown in step (B15) and FIG. 14. Users can change the station to be viewed on the edit menu (B16) and go to reading details page by clicking "More" button (B17).

Figure 5:
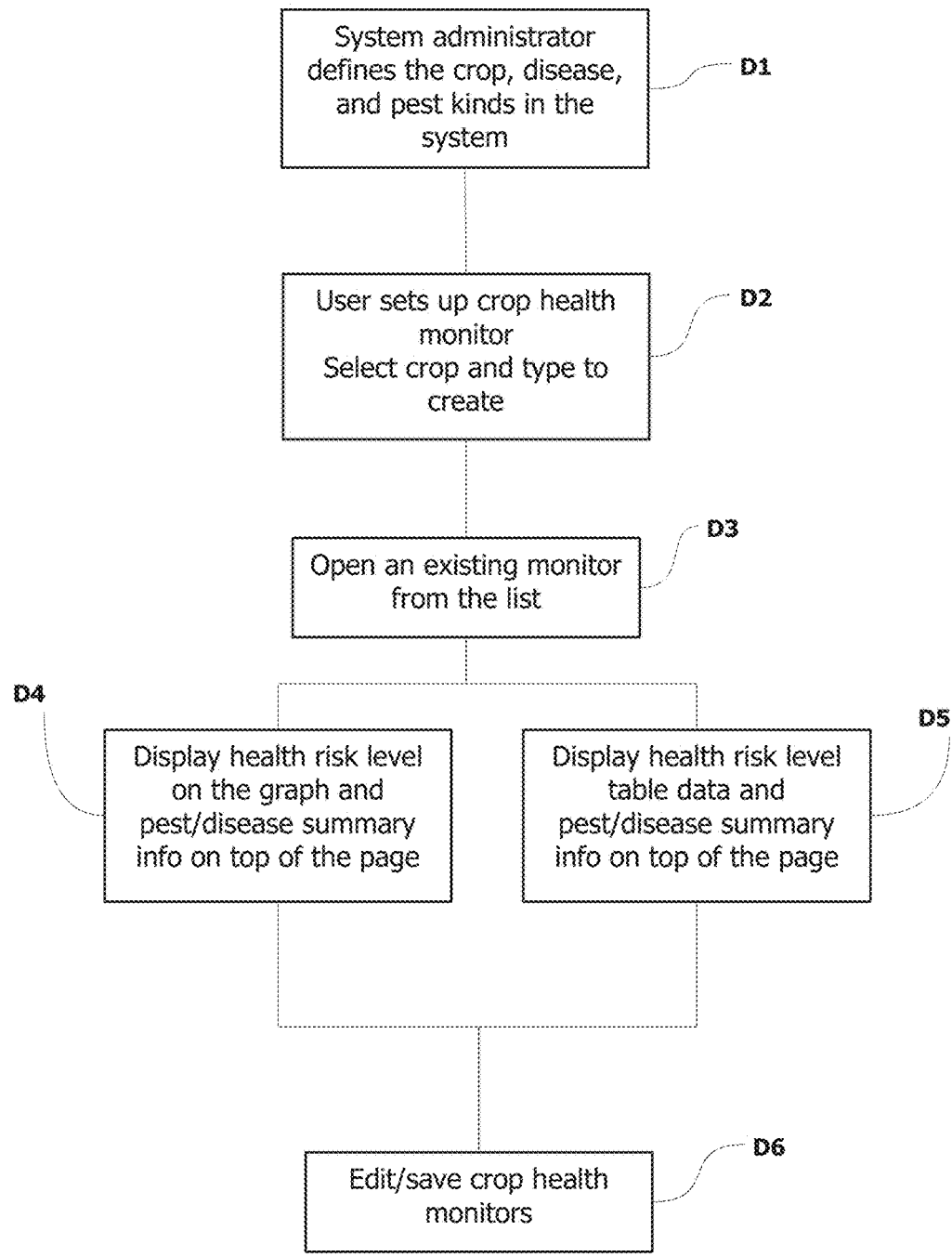
FIG. 5 is a flowchart illustrating an exemplary crop health monitor process flow in accordance with one or more embodiments.

Crop health information is important to the user to see on the main page. Predefined health monitors' summaries for pest and diseases are listed on the portlets at step (B18) and FIG. 14. Clicking on any data will open the crop health monitor configuration page at step (B19). FIG. 5 describes the details for crop health monitors.

Station status displays the reading success percentage for the stations, their battery usage, and signals. In addition to those temperature and humidity are displayed on the same table as shown in step (B21), FIG. 13 and FIG. 57. Irrigation portlet is a quick way to display the irrigation status (B20) as shown in exemplary FIG. 46. Other status portlets are farm management and information, pump status, and soil nutrient status (B22, B23, B24).

Refresh link is to refresh the windows on the dashboard instead of refreshing the entire page. All the windows can be moved to another position by clicking on the banner of the window and dragging to the new position. The windows can be minimized or closed. These are shown in step (B25).

Switching between mobile look and classic look can be done by clicking the switch link at the left bottom corner of the page as shown in step (B26).

Figure 18:
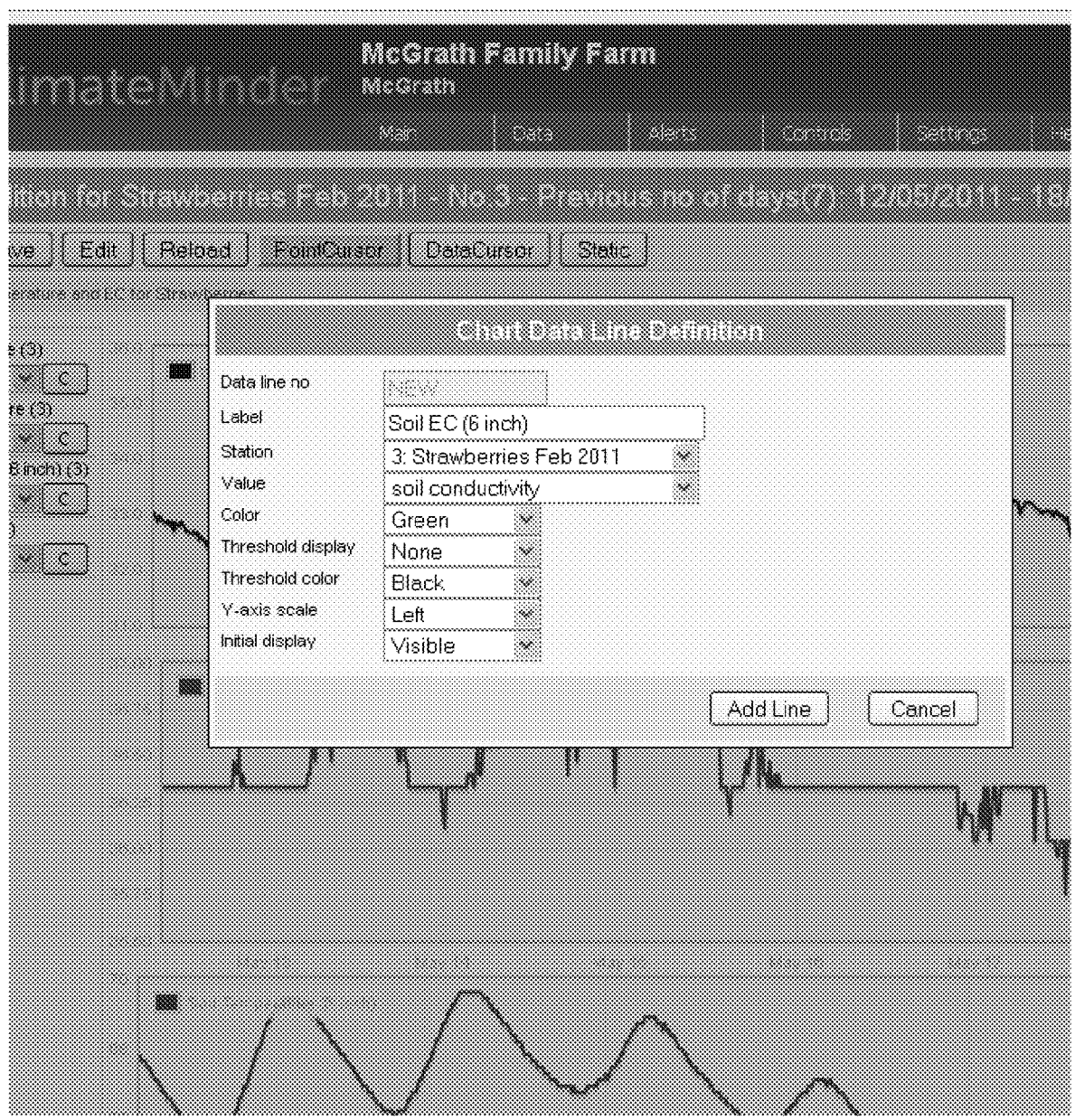

FIG. 4 illustrates the chart creation, configuration flow for the web-based remote monitoring system. From Data, charts menu, users can open the charts added before as shown in steps (C1 and C2), or add a new one as shown in step (C3). Charts can be created with preferred styles as bar, square wave, or line charts. Either during new chart addition or displaying an existing chart, users can add new lines to the charts as shown in step (C4) and the exemplary screenshot of FIG. 18. At this step, stations, what data to be read from that station should be selected from the dropdown list. Data lines can include sensor measurement, calculated values based on sensor data, predictions, disease and pest models. Data line's color, label can be changed. Threshold can be viewed either as band (colored in between) or as limit (can be drawn on the chart). Default initial display is visible, but can be changed to hidden. Lines can be removed or the configurations can be changed at any time by the users.

Figure 19:
Figure 20:
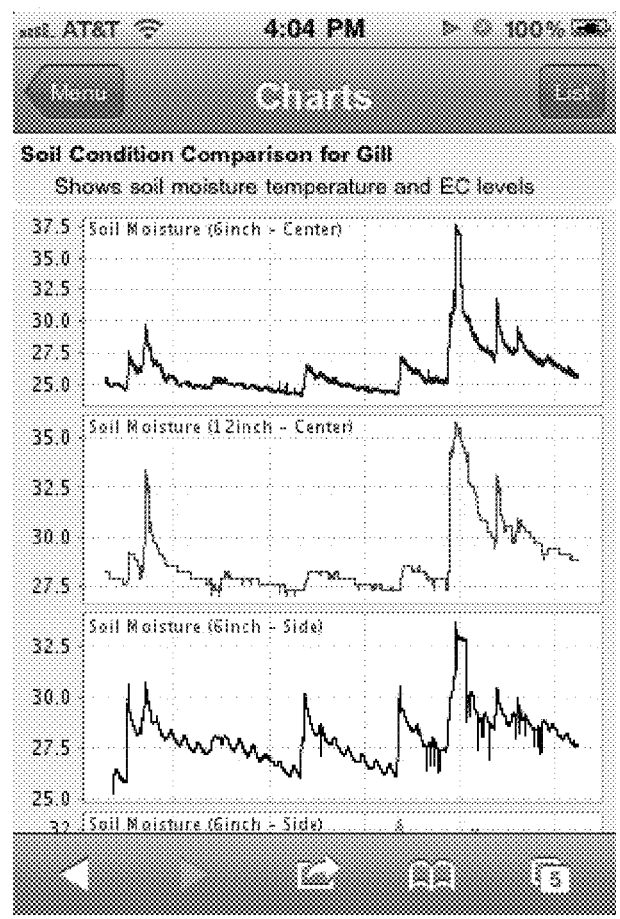
Figure 21:
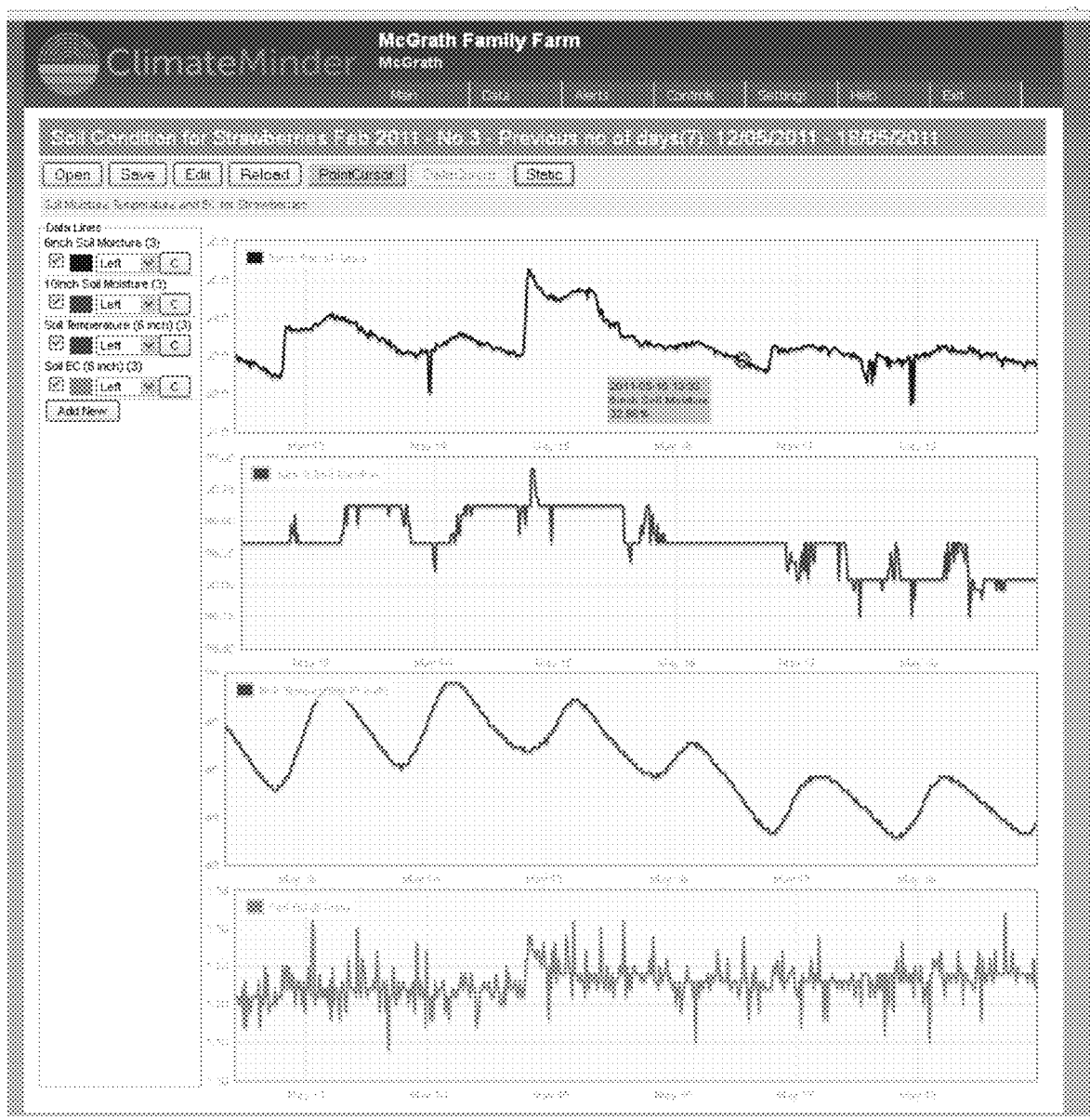
Figure 22:
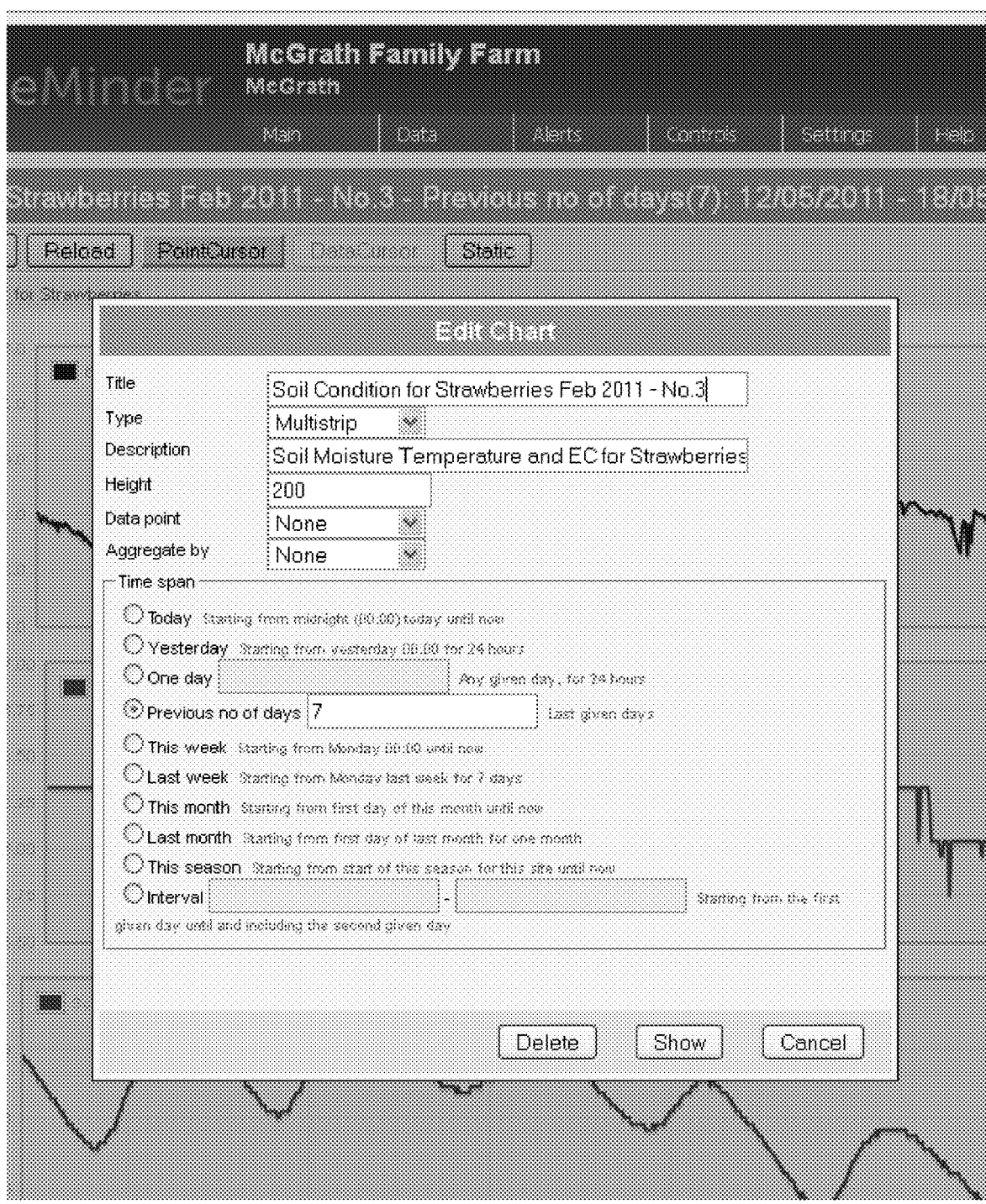

After creating a new one or selecting from the existing chart lists, charts are displayed on the screen as shown in step (C5), the exemplary screenshot of FIG. 19, and the exemplary mobile screen view of FIG. 20. The default display mode is static for all charts (C7). After opening a chart, its view mode can be changed to dynamic by clicking on "Analysis" button at step (C6) and the exemplary screenshot of FIG. 21. In the dynamic mode, the user can move the cursor and see the details as date, time and value of the points on the charts as shown in step (C8). Charts have zoom in and zoom out capabilities. Modes can be switched to static at any time. In step (C9) "Edit" button opens the configuration page for the current chart as shown in exemplary FIG. 22. Time frame can be changed at the configuration page. All changes can be saved and stored in the central database as shown in step (C9). These charts are available to be used in dashboard (classic or mobile), PDF reports, etc. Any changes can be viewed from mobile devices as well. Reloading a chart will refresh the chart with the most recent data from the central database.

Figure 23:
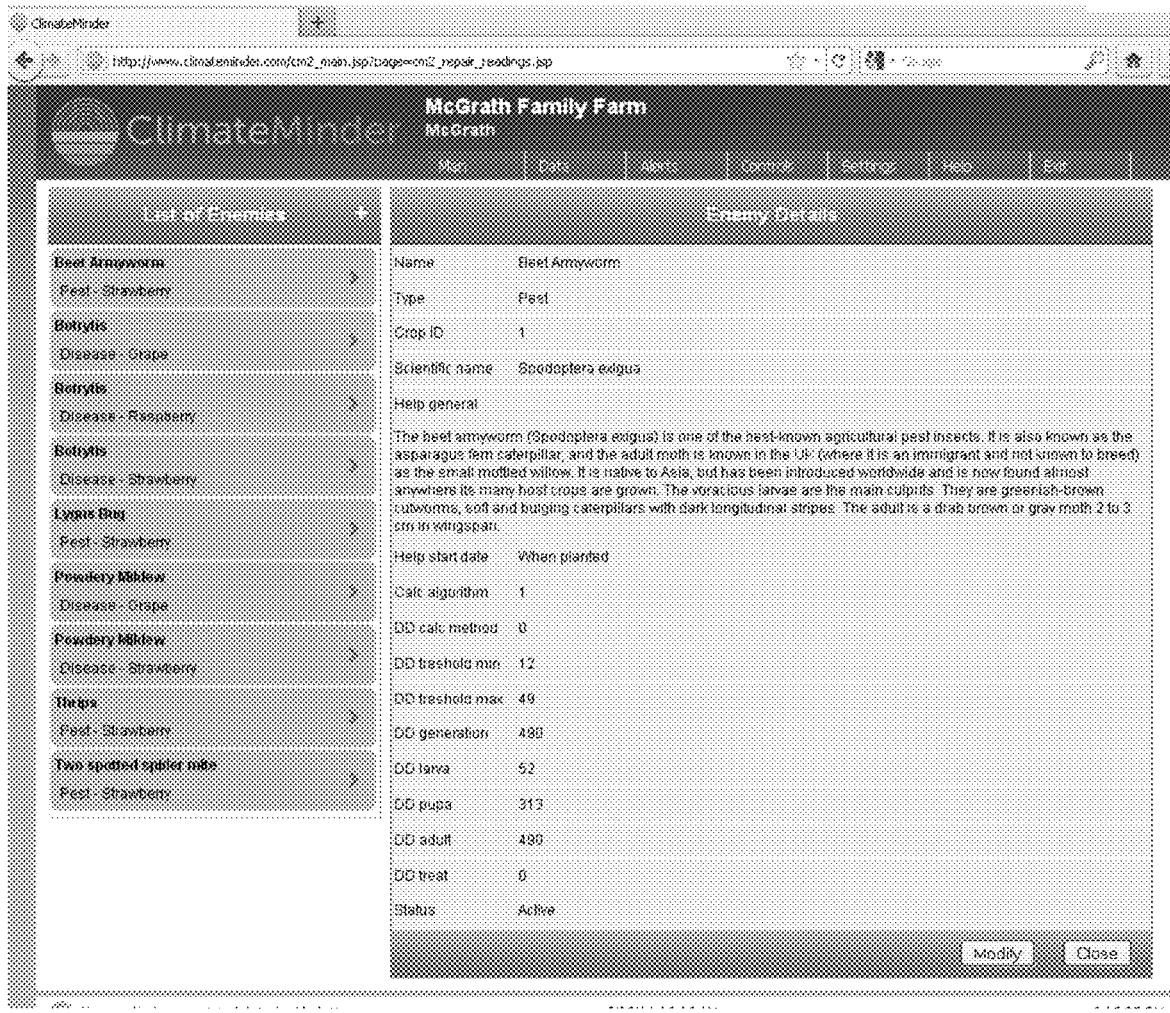
Figure 24:
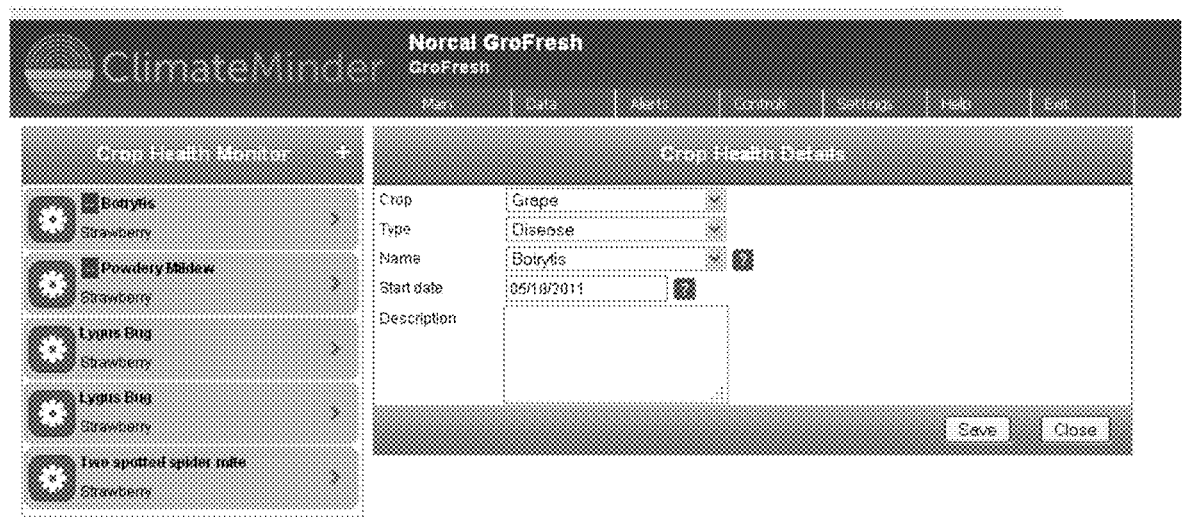
Figure 25:
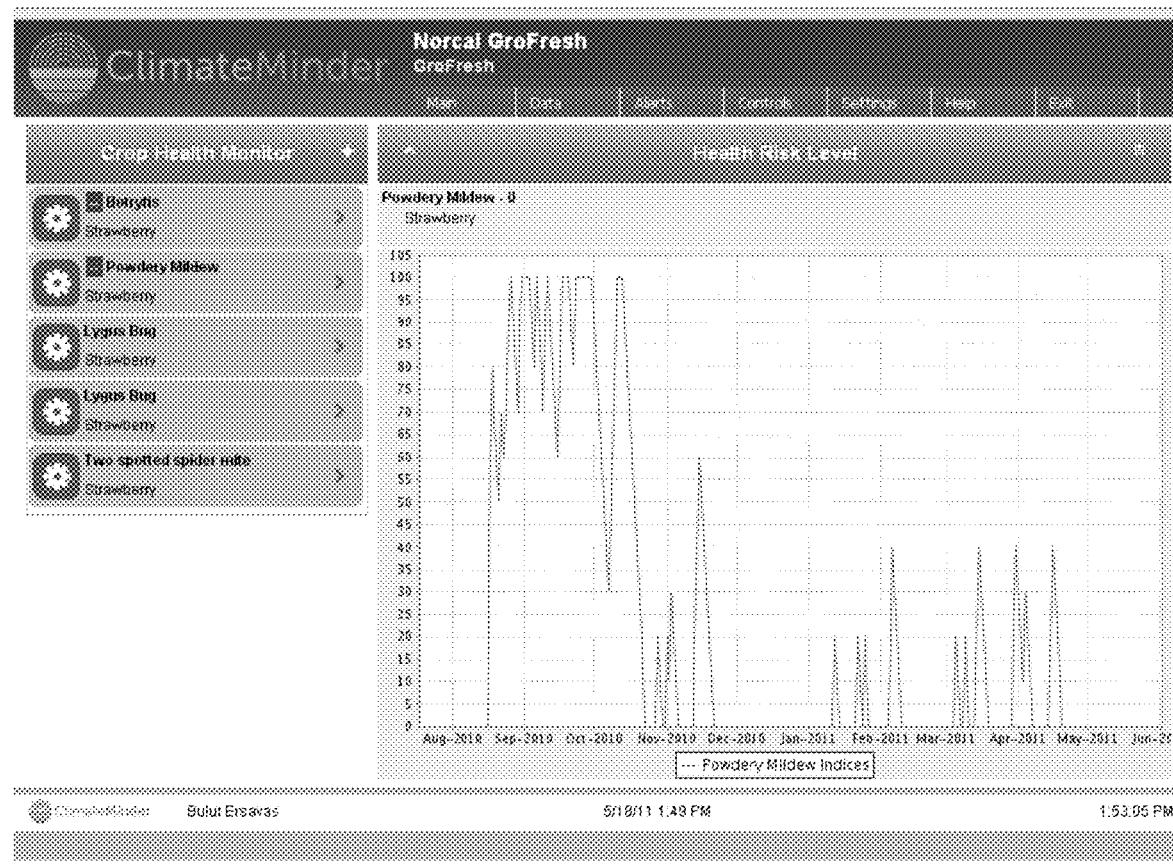
Figure 26:
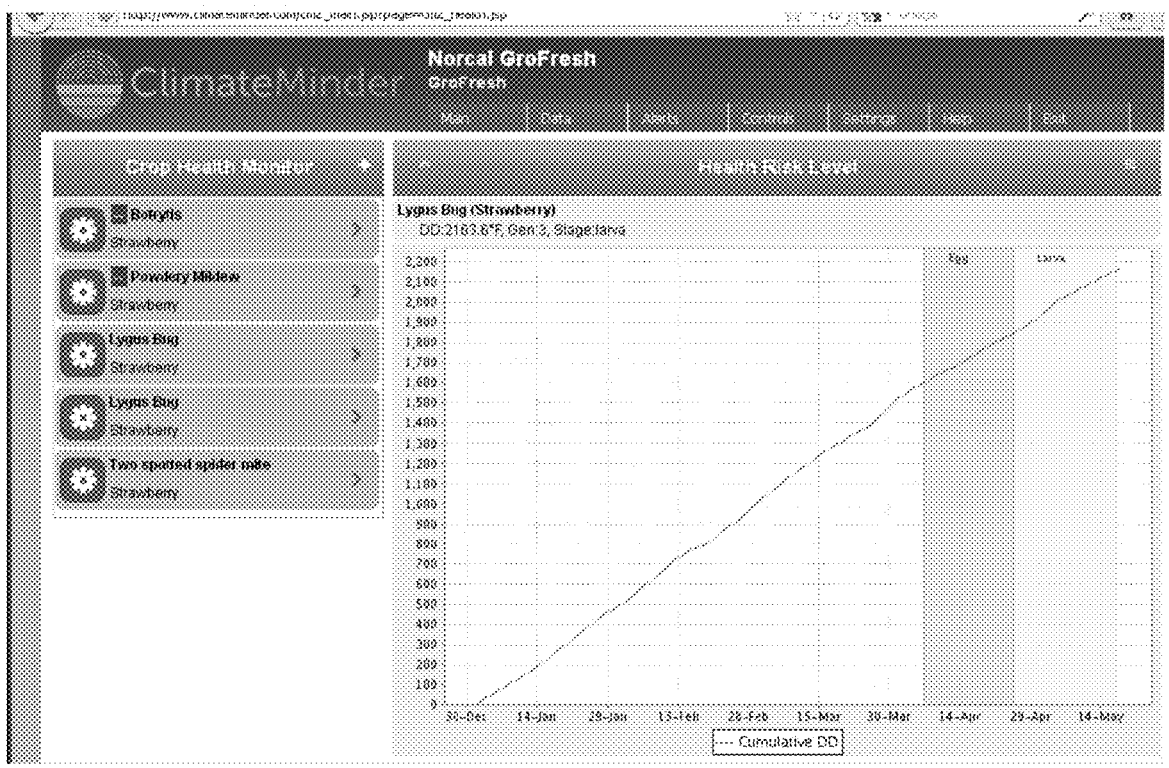
Figure 27:
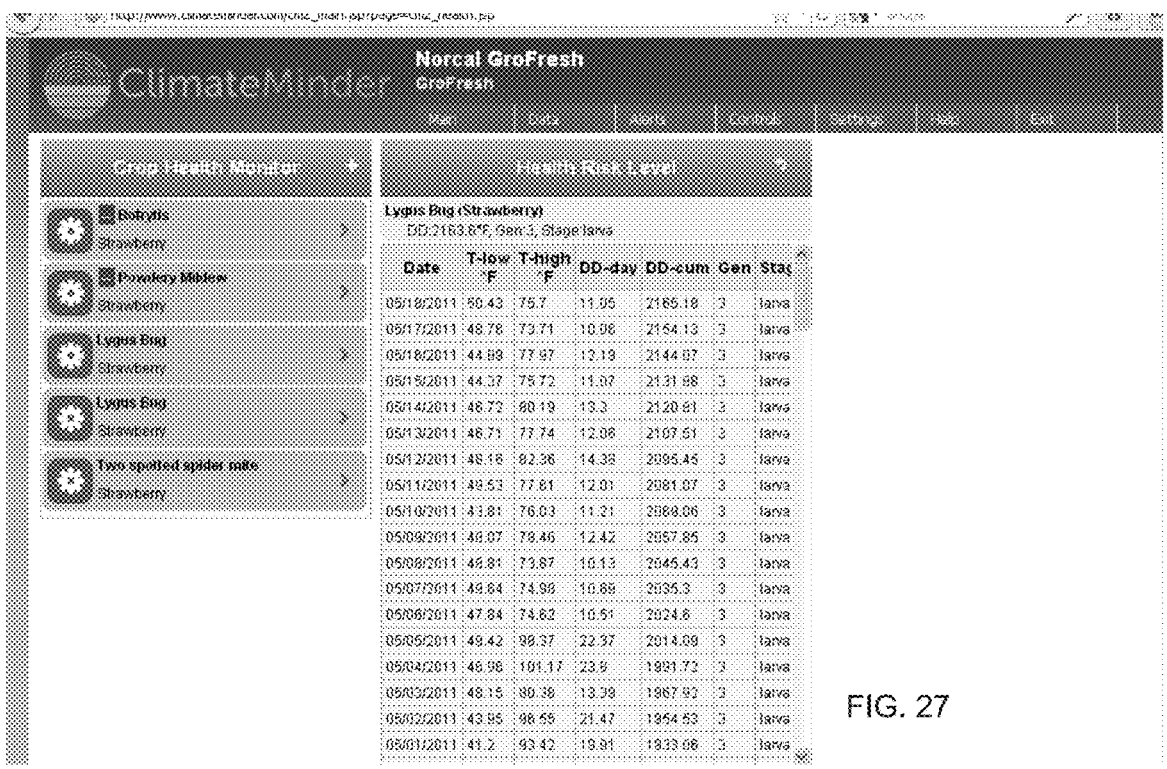
Figure 28:
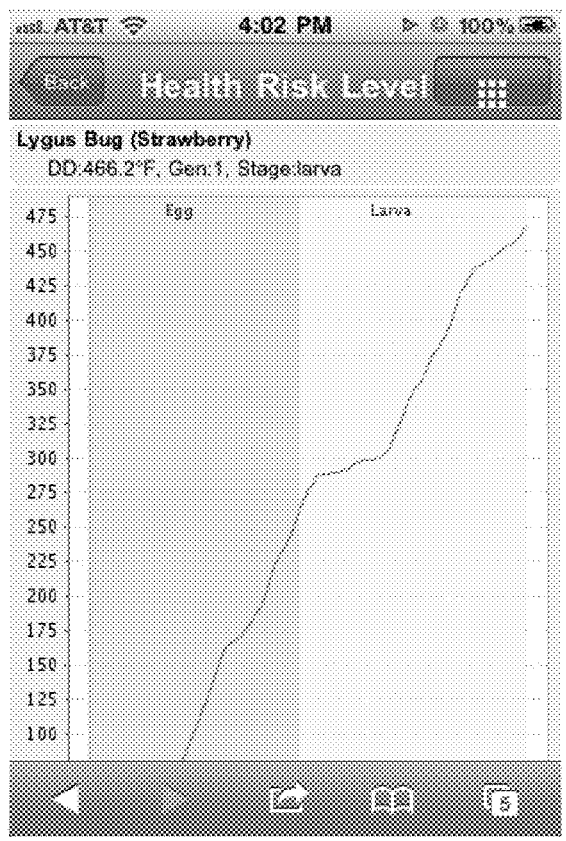
Figure 29:
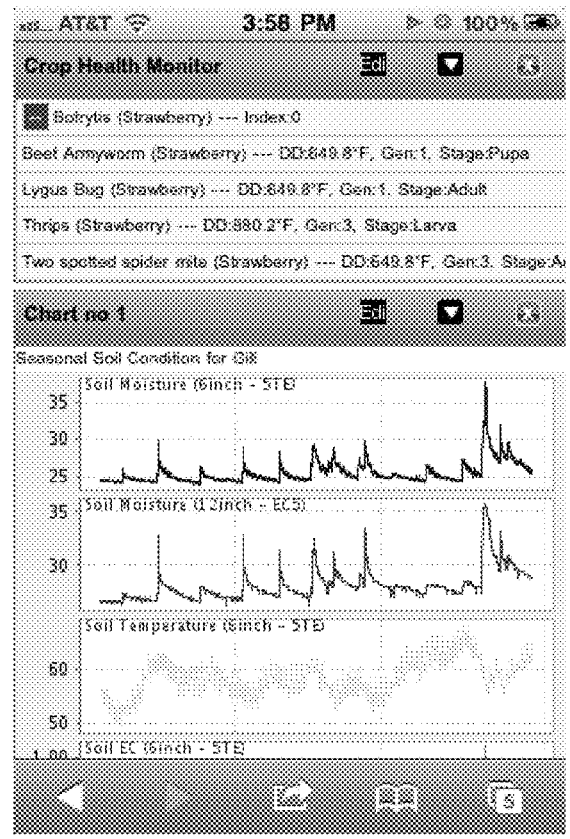

FIG. 5 illustrates the crop health monitoring for the web-based remote monitoring and control system. Crop health monitoring can be based on two types: disease and pest. Those types include disease risk indices and pest development stages based on non-proprietary models. These crop, disease, and pest kinds can be added by the system administrators at step (D1) as shown in exemplary FIG. 23. In step (D2) new crop health monitors can be created by clicking on the plus sign at the top right corner of the crop health monitor lists. Start date, name, the crop from the dropdown list and monitoring type should be defined as shown in exemplary FIG. 24. Gear icon at the beginning of the crop monitor's name takes the user to the configuration page to change the settings at step (D6). In step (D3) clicking on the name displays the monitor in any kind of chart with all different risk level zones shown in different colors as shown in step (D4), exemplary FIG. 25. In both cases (charts and table data), disease or pest summary information is displayed on top of the page as it has the same capability on the dashboard. Disease monitors have risk level (severe, high, medium) color codes next to their names as shown in FIG. 24. Pest type monitors have the charts with the last stage zones colored as shown in exemplary FIG. 26. In step (D5), users can choose to see the raw data in a table by clicking on the table sign on the top right corner of the monitor as shown in FIG. 27. FIG. 28 shows the mobile screen for a pest type crop health monitors and FIG. 29 displays the dashboard with crop health monitor on a mobile phone.

Figure 30:
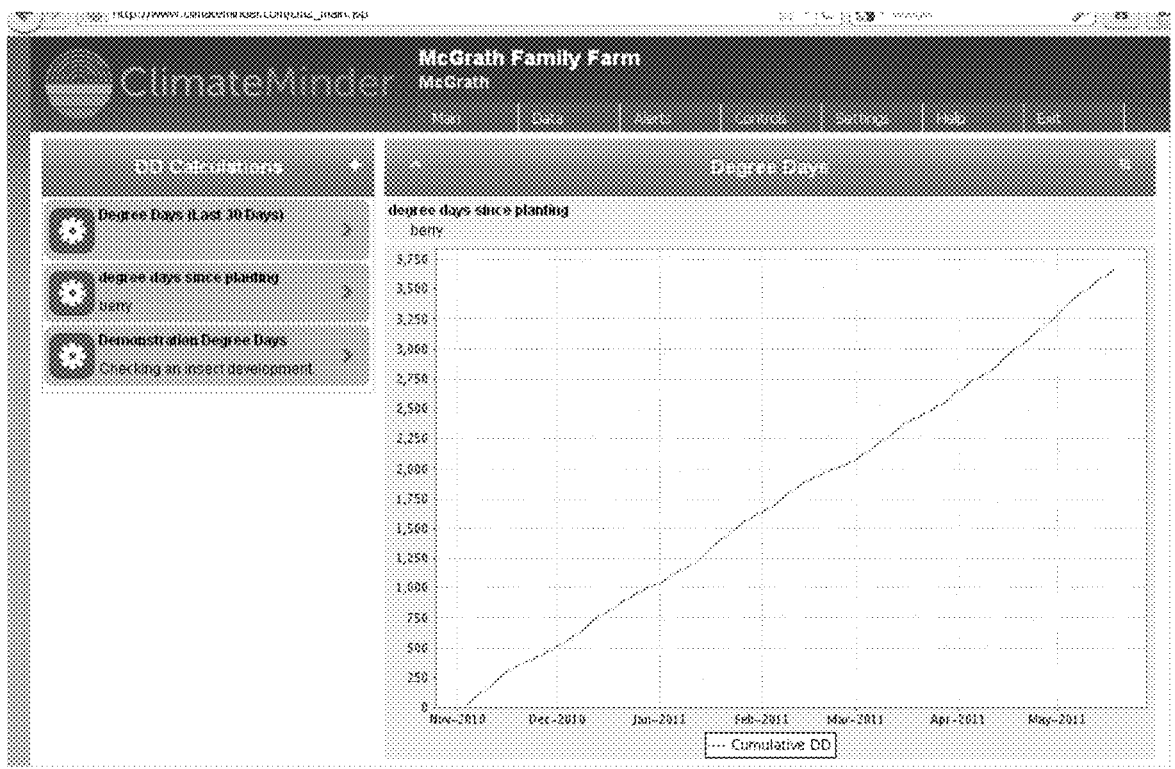
Figure 31:
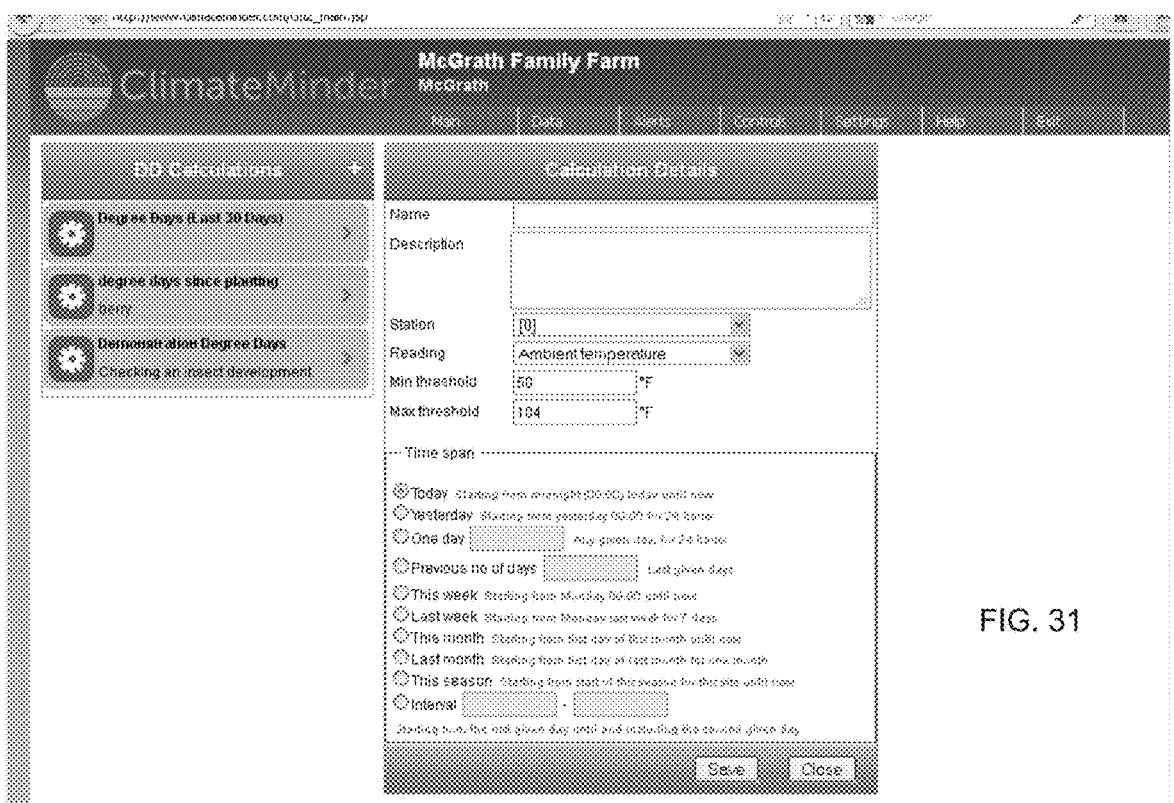
Figure 32:
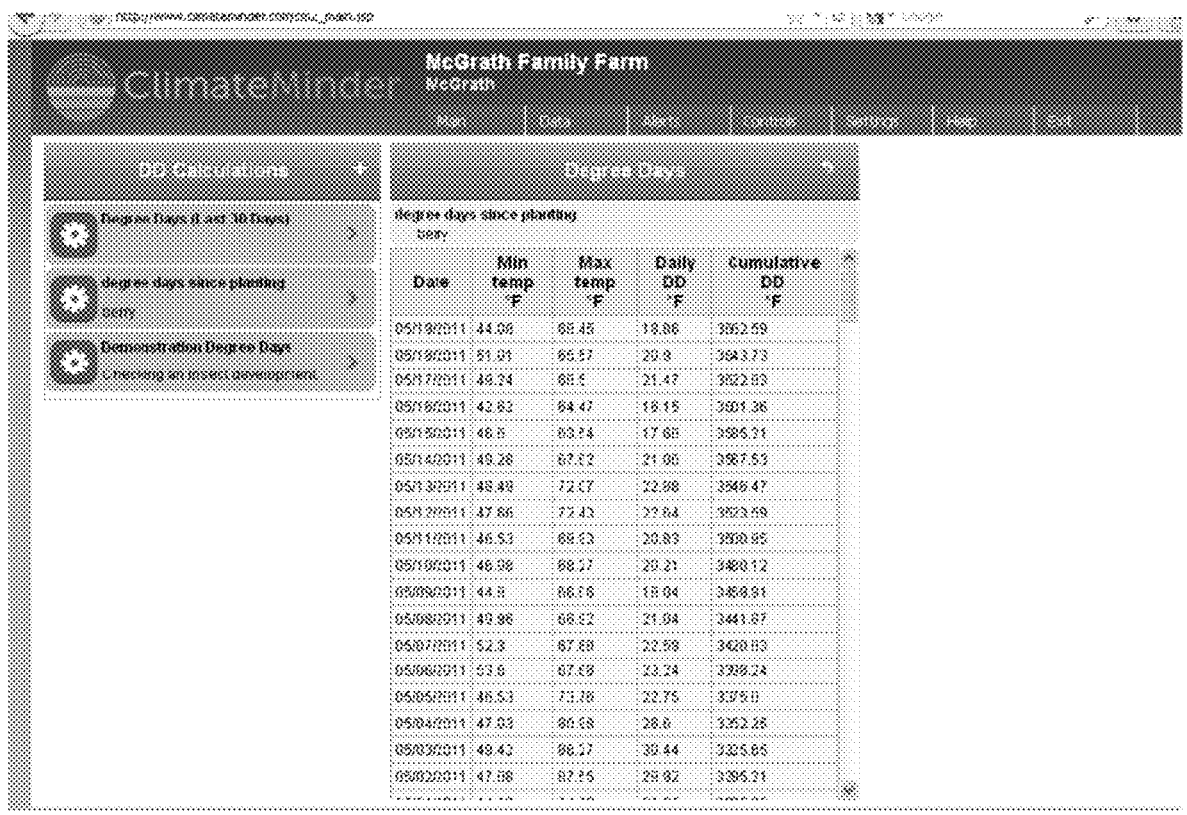
Figure 33:
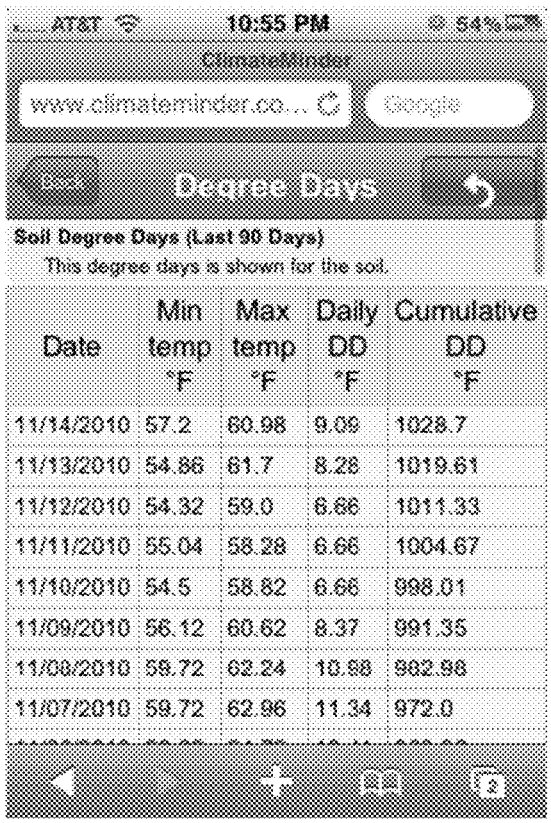

FIG. 6 illustrates the degree days calculation process flow for the web-based remote monitoring system. A degree day is a measure of heating or cooling. Totalized degree days from an appropriate starting date are used to plan the planting of crops and management of pests and pest control timing. Users can add new degree day calculations at step (E1) by clicking on the plus sign at the top right corner as shown in exemplary FIG. 31. Temperature reading and station should be defined in the process of degree day creation. Minimum and maximum thresholds, and time frame are used in the calculations. The gear icon at the beginning of the degree days calculations' name takes the user to the configuration page to change the settings at step (E5). In step (E2) clicking on the name displays the calculations in any kind of chart as shown in step (E3), exemplary FIG. 30. In step (E4), users can choose to see the raw data in a table by clicking on the table sign on the top right corner of the degree day calculation as shown in FIG. 32. FIG. 33 shows the mobile phone screen with the degree days calculation table. Users can always return to the graph by clicking on the return sign at the right top corner of the table.

Figure 7:
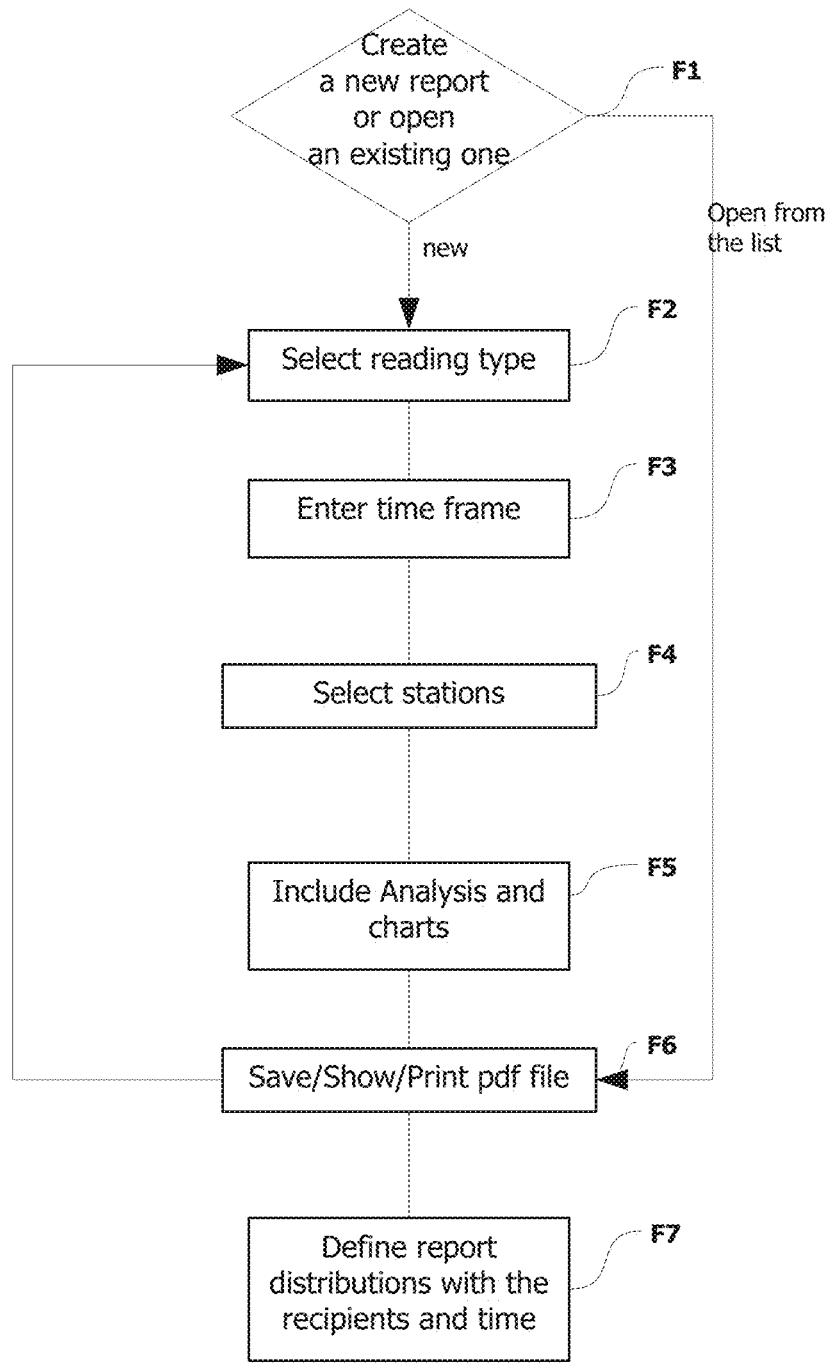
FIG. 7 is a flowchart illustrating an exemplary report creation process flow in accordance with one or more embodiments.
Figure 34:
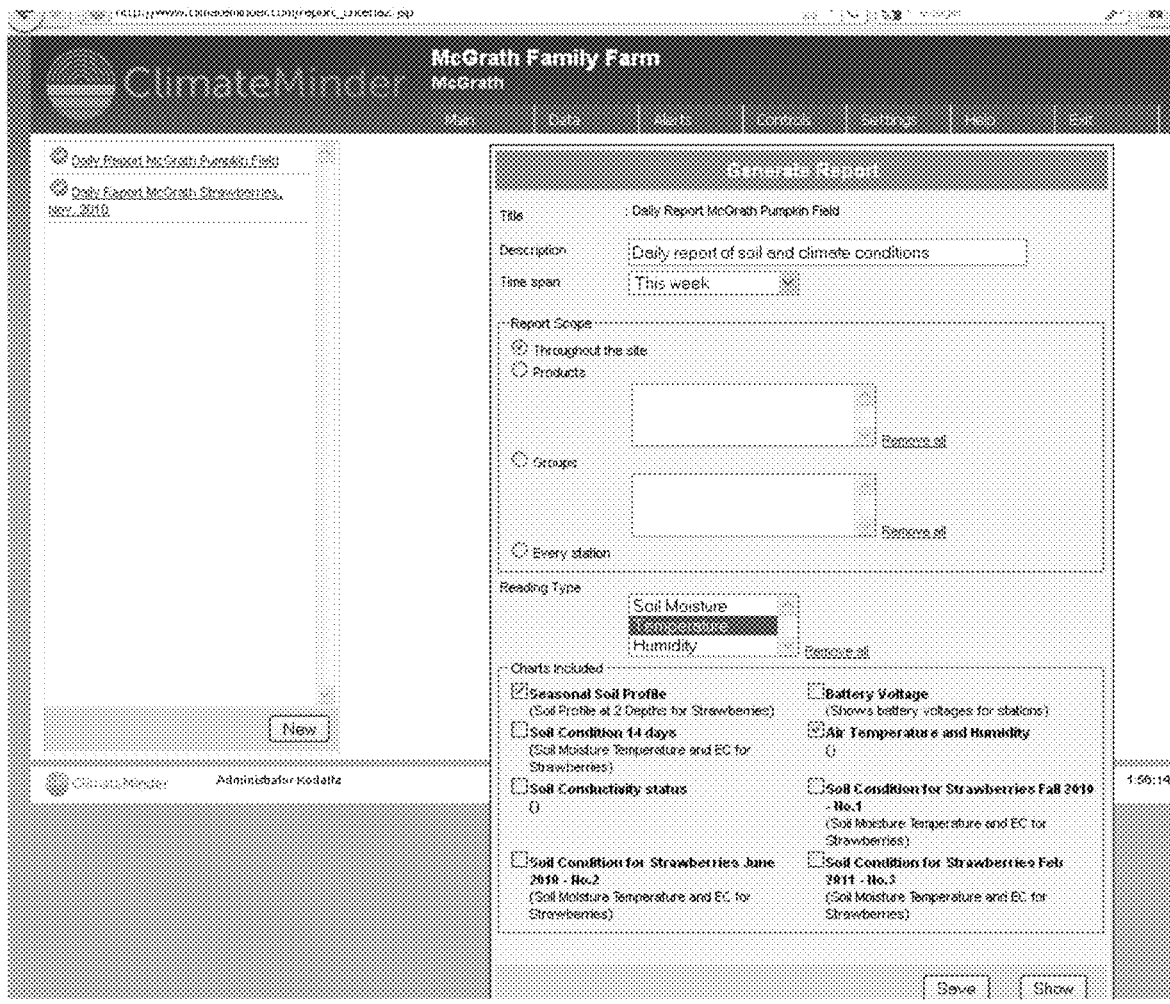
Figure 35:
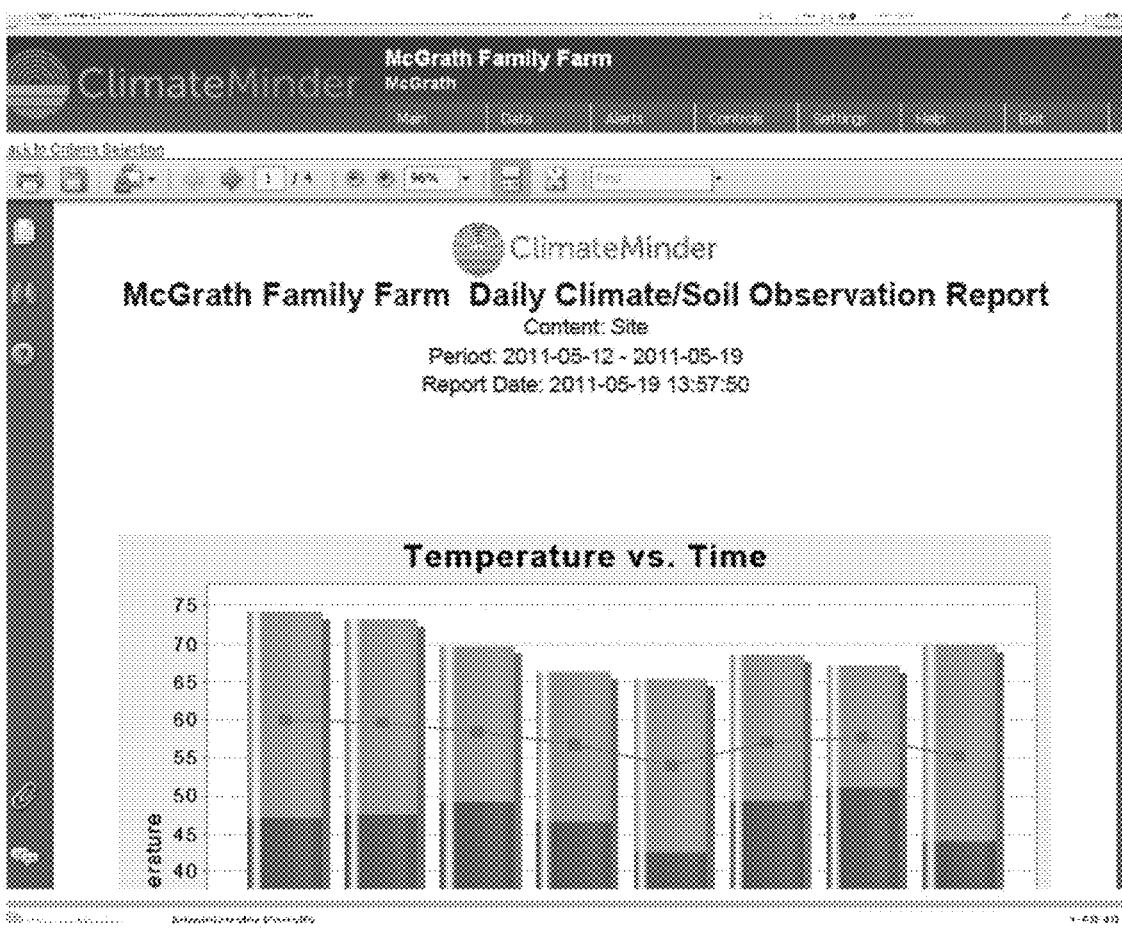
Figure 36:
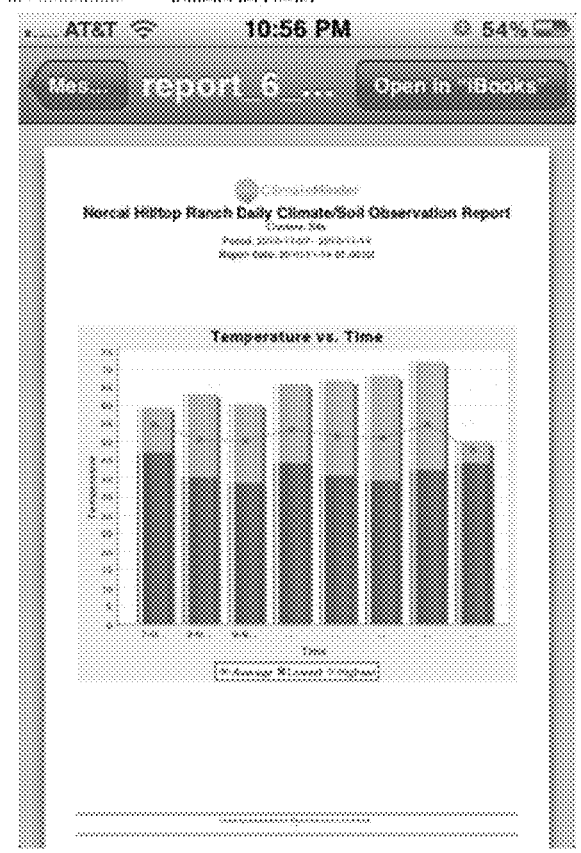
Figure 37:
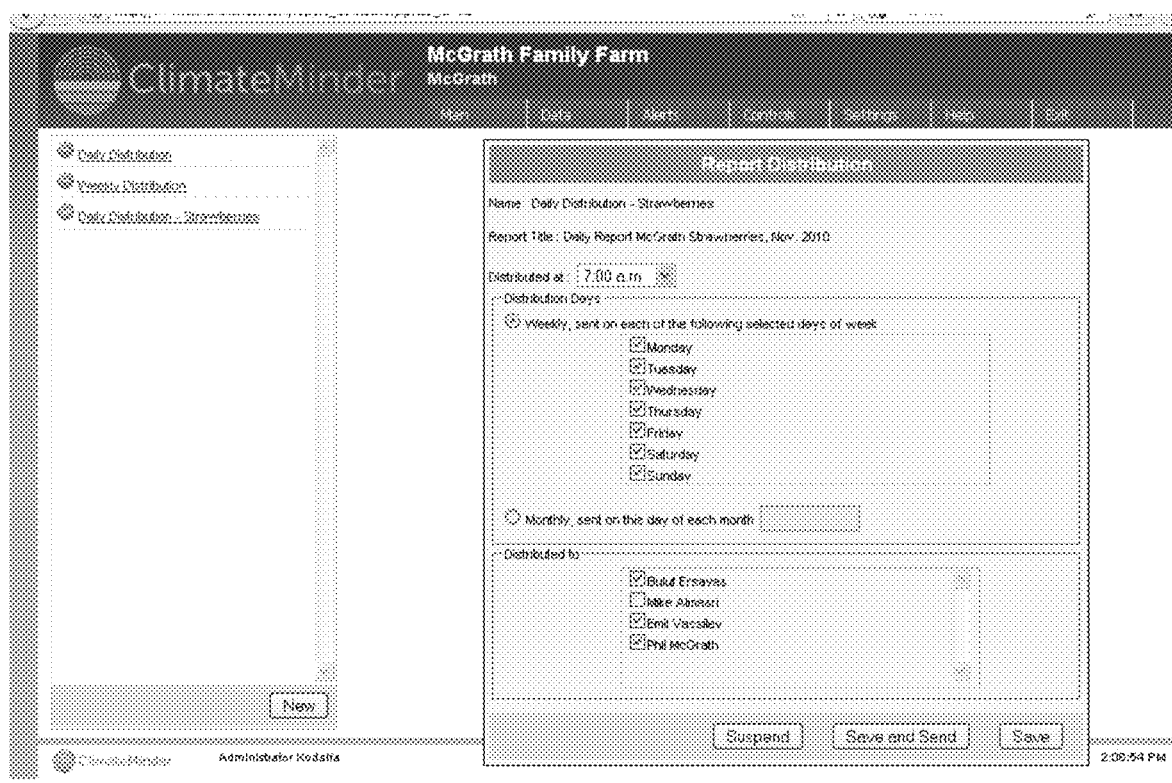

FIG. 7 illustrates the report creation process flow for the web-based remote monitoring system. At step (F1), as shown in exemplary FIG. 34, reports can be displayed from the list on left hand side of the screen or a new one can be created by clicking on the "New" button at the bottom of the report list. During the creation of a new report, reading type should be defined by selecting from the reading drop down list at step (F2). Reports will be created based on the entered time frame at step (F3). The user defines the station from which the reading will be read or reports can be created for the entire site at step (F4). Users can add their predefined charts described at FIG. 4 to the reports at step (F5). These steps are done as shown in FIG. 34. After specifying the details of the report, it can be saved, shown on the screen, printed, or exported to a PDF file at step (F6) as shown in exemplary FIG. 35 (personal computer screen) and in exemplary FIG. 36 (mobile phone screen). These reports can be distributed to more than one recipient at the specified time of the preferred days of every week or one day of every month at step (F7) as shown in exemplary FIG. 37. Reports may have multiple distributions with different recipients at different times.

Figure 8:
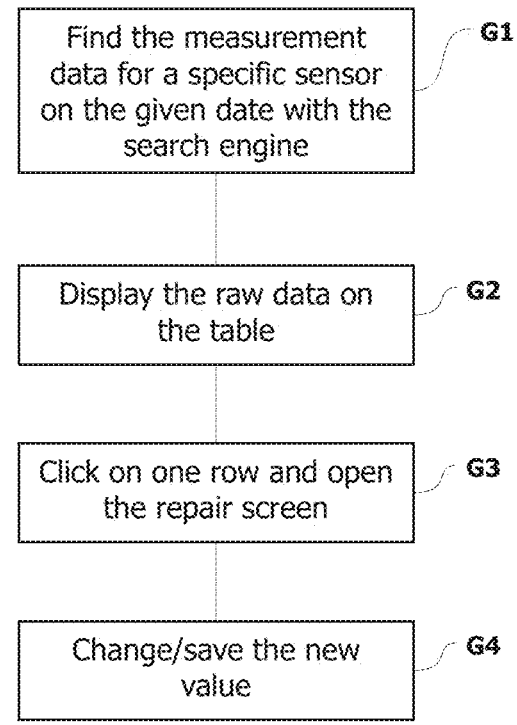
FIG. 8 is a flowchart illustrating an exemplary data repair process flow in accordance with one or more embodiments.
Figure 38:

FIG. 8 illustrates the data repair process flow for the for the web-based remote monitoring system. On the repair criteria window, user can find the measurement data for a specific sensor on the given date at step (G1) as shown in exemplary FIG. 38. When the user enters the information and hits the "Find" button, "Data" window will display the data table at step (G2). When a row is selected on the table, a third window "Data Repair" will be shown to change the selected data at step (G3). The selected row data can be changed with the previous value, next value, average value, or a new value entered by the user at step (G4) as shown in FIG. 38.

Figure 39:
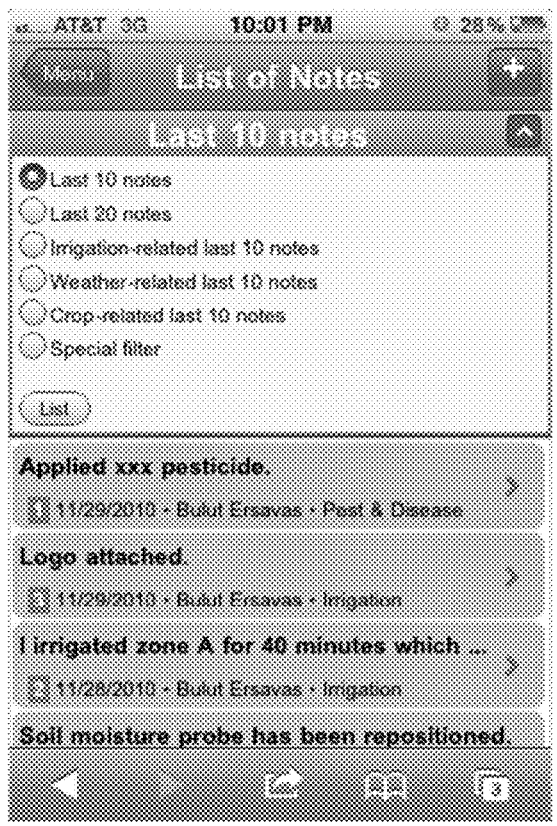
Figure 40:
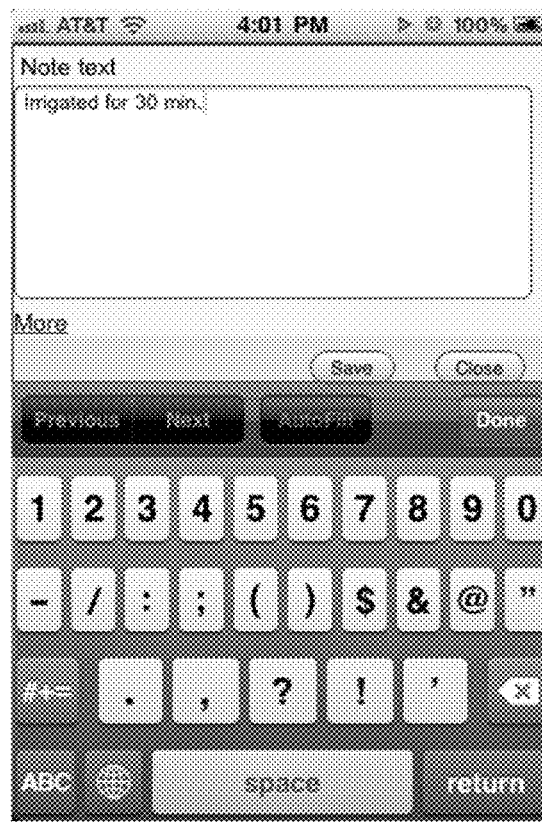

FIG. 9 illustrates the note creation process flow for the for the web-based remote monitoring system. Users can either open a note from the list by clicking on the name of the note or create a new one by clicking the plus sign on top right corner of the list window at step (H1). The note list screen can be expanded by the down arrow on the "List of Notes" window. User can select the category based notes, last specified number of nodes by clicking the radio buttons, or do an advanced search by "special filter" option at step (H2) as shown in exemplary FIG. 41. The notes can be sorted by date or importance. Clicking "List" button will change the note list shown right after the search window. During new note creation, note category can be set optionally, station is assigned, and related files may be attached at step (H3). At step (H4), note details will be shown in a new window. The default screen shows only the note text. There is a link "More" for more details. At step (H6), the station, category, reading type, date, author, importance (high, medium, low), and privacy (public, private) can be changed by clicking on "Modify" button. If needed, a screenshot, or any document can be added to the note at step (H5). User can always switch to the "only text" screen by clicking on the "Less" link. Notes can be saved or deleted by the user. User can display or edit the notes through mobile phones as shown in FIGS. 39-40.

Figure 10:
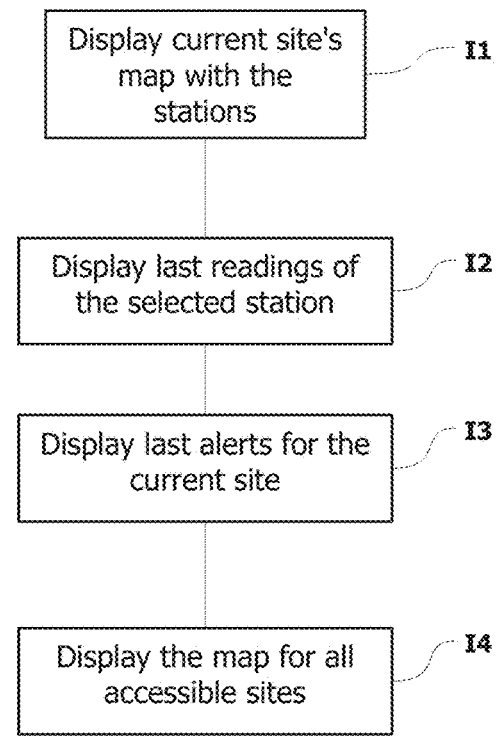
FIG. 10 is a flowchart illustrating an exemplary site or station map usage process flow in accordance with one or more embodiments.
Figure 42:
Figure 43:
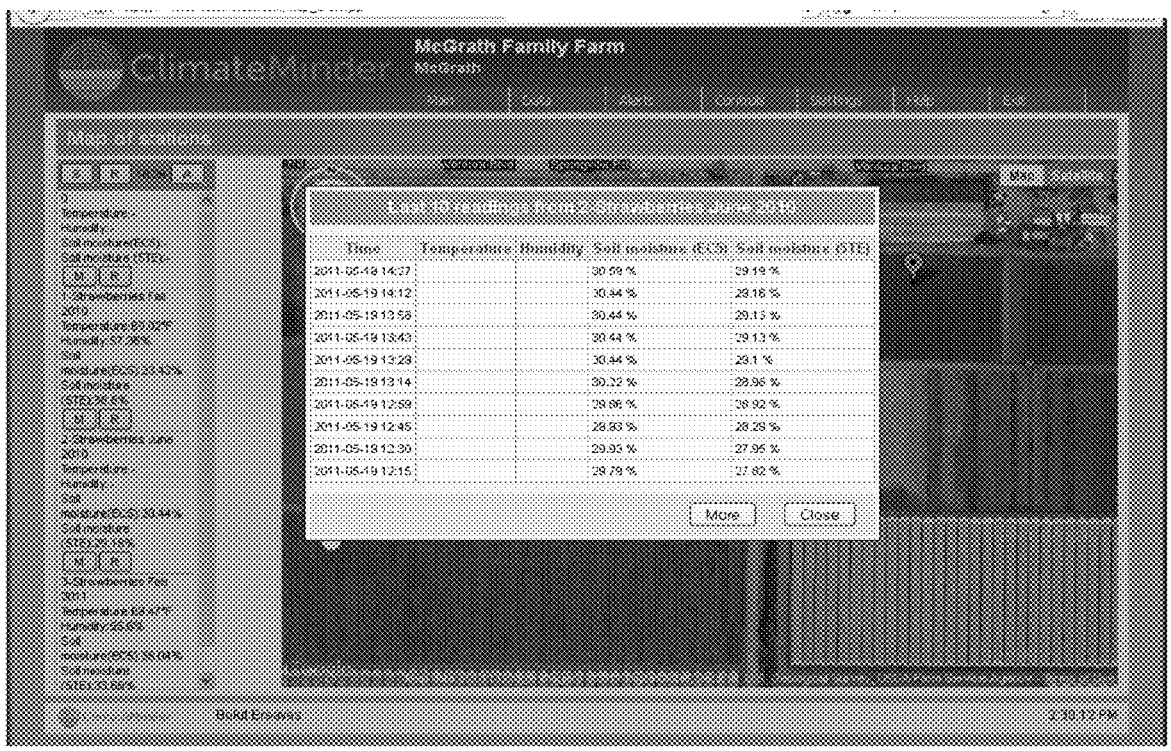
Figure 44:
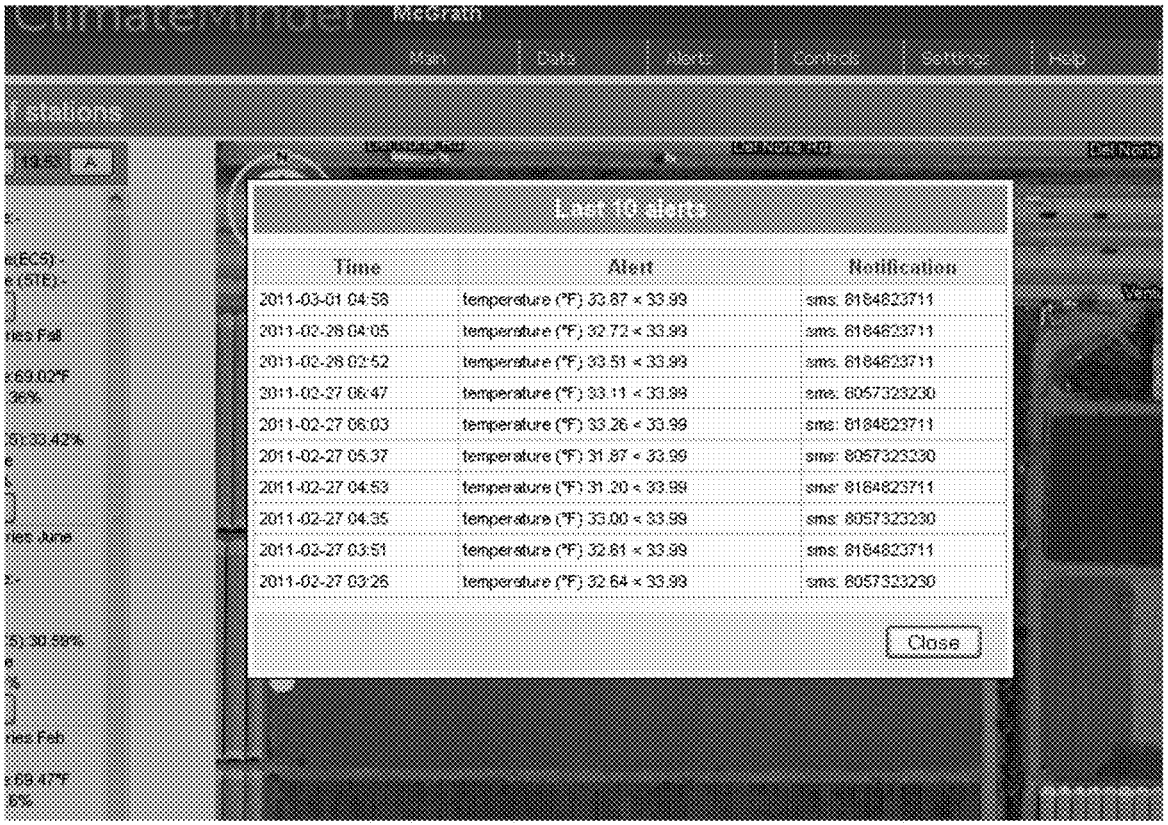
Figure 45:
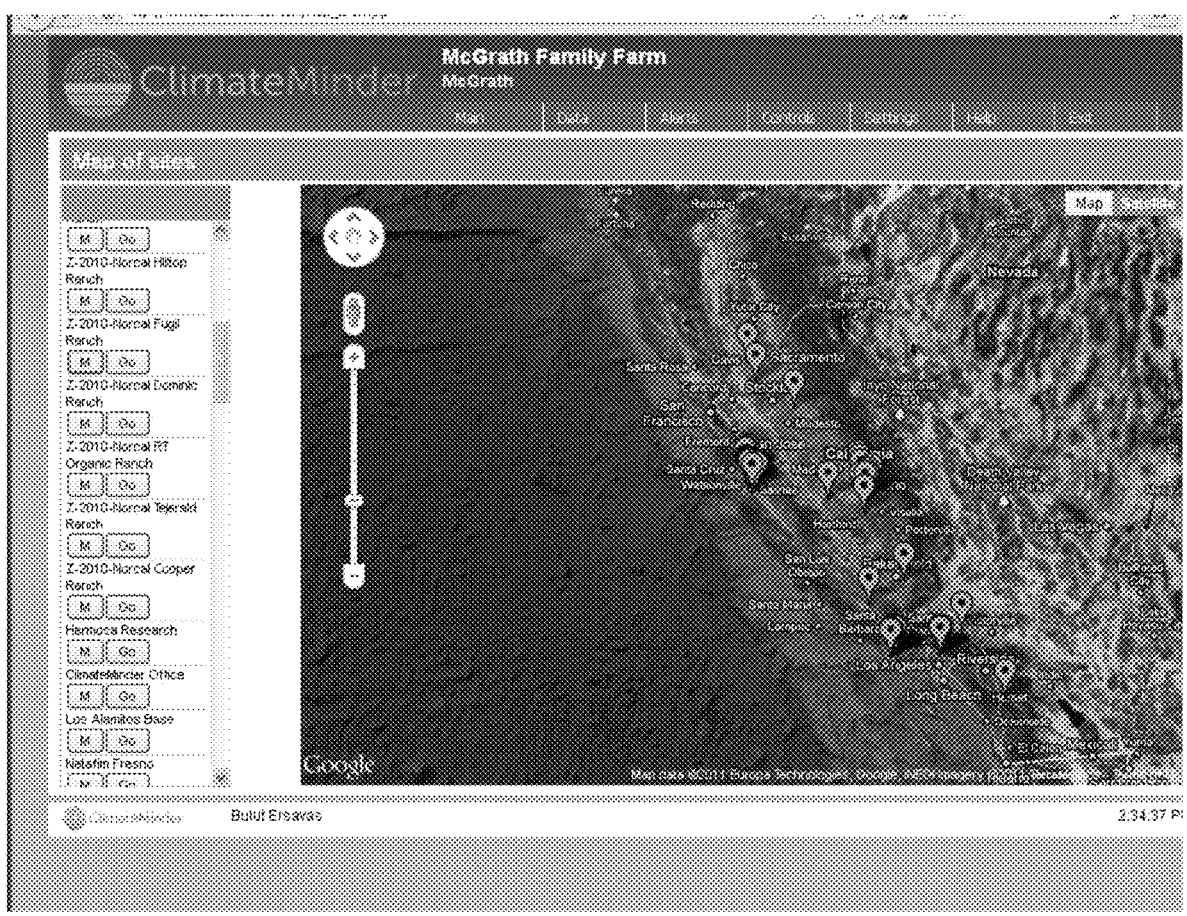

FIG. 10 illustrates the site/station map usage process flow for the for the web-based remote monitoring system. The system displays the current site map through, e.g., "Google maps" at step (I1) as shown on exemplary FIG. 42. The name of the station is shown when the cursor moves over the stations pivots. "M" button on the left hand side for the stations centers that station on the screen. At step (I2), "R" button displays the last readings from that station as shown in exemplary FIG. 43. "More" button takes the user to the detailed readings page. Top banner of the left hand side includes three buttons ("S", "R", and "A") and a digital clock. At step (I3), "A" button displays the last alerts for the current site as shown in exemplary FIG. 44. "R" refreshes the data and the alerts. At step (I4), "S" displays the map with all accessible sites for the current user as shown in FIG. 45. "M" button on the left hand side centers that site on the map, and "Go" switches the current site to the selected one as shown in FIG. 42.

Figure 11:
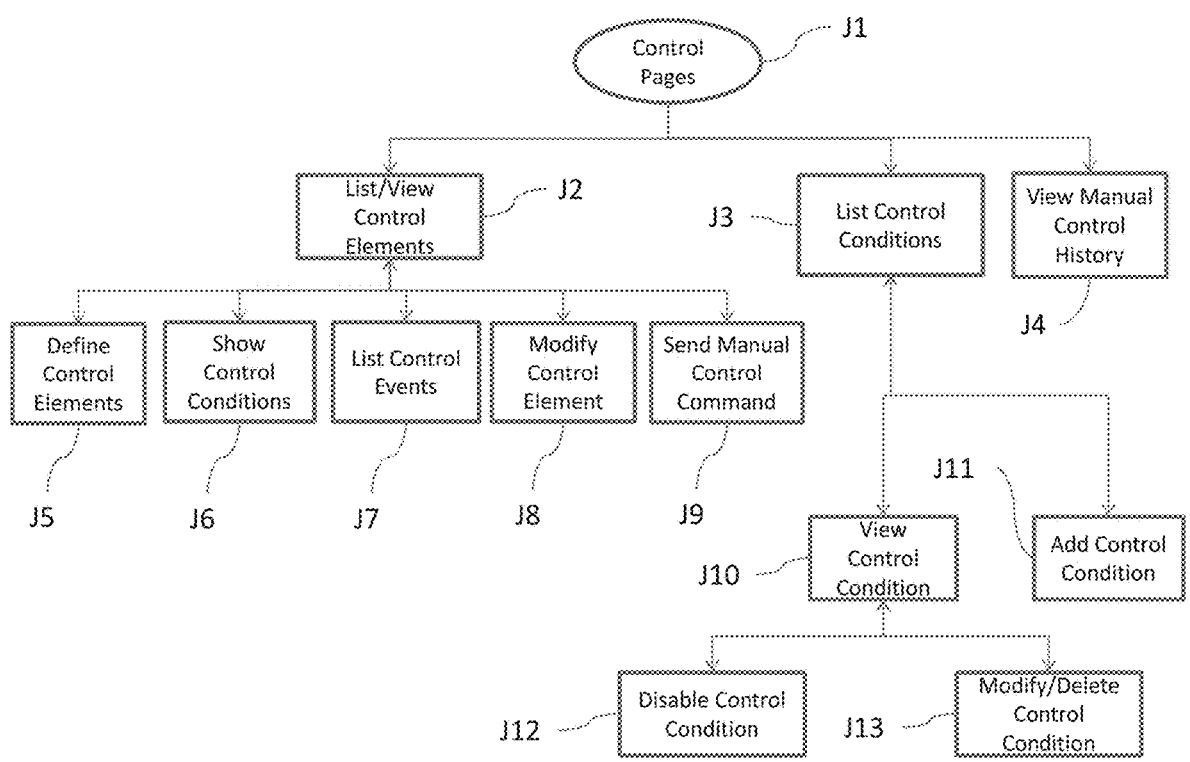
FIG. 11 is a flowchart illustrating an exemplary control process flow in accordance with one or more embodiments.
Figure 48:
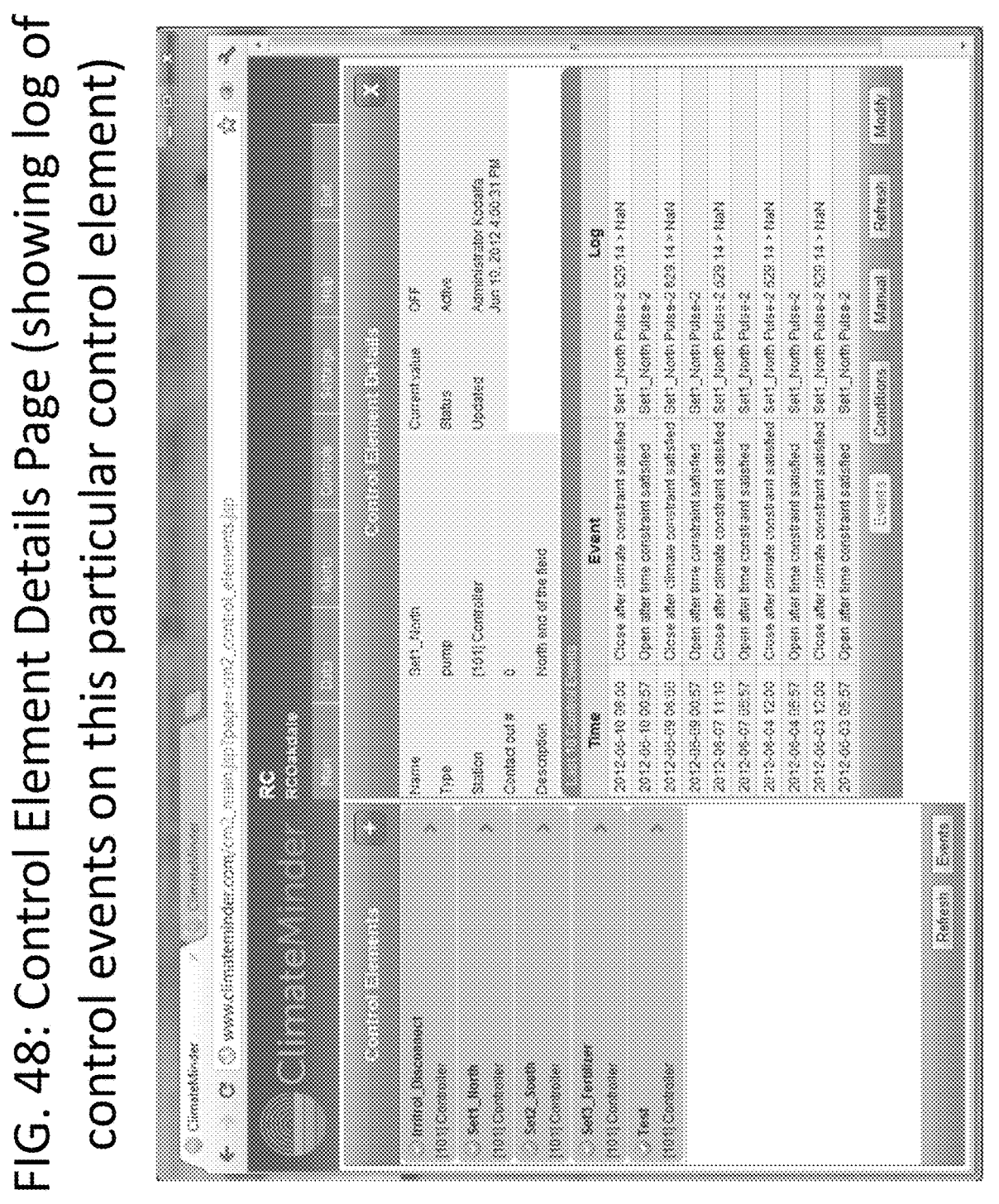

FIG. 11 illustrates the control element and condition management process flow. The system allows users to list and view control elements that define the elements which the controller physically controls (J2) as shown in exemplary FIG. 48 and FIG. 49. After a physical connection made between the controller equipment and the equipment to be controlled (e.g., irrigation valve, pump, heater, cooler, fan etc.), the user defines the control element in the software through step (J5). An exemplary control element definition page is provided in FIG. 47. For a selected control element, users can show defined control conditions (J6), list control event logs (J7) as shown in exemplary FIG. 50, modify the control element (J8) and send manual control commands to the element (J9). Through the control pages, users can also view the manual control history including the log of who turned on/off what and when (J4) and list control conditions (J3). When it comes to control conditions, users can view the details of each control condition (J10) as shown in exemplary FIG. 51 or add new ones (J11). Each control condition is stored on the central server's database as well as the related controller equipment at the site (e.g. field or greenhouse). Each condition can be disabled (J12), modified or deleted (J13). Control condition pages adapt to the device used for simplifying the browsing on a mobile device as shown in exemplary FIGS. 52A-52B.

Figure 12:
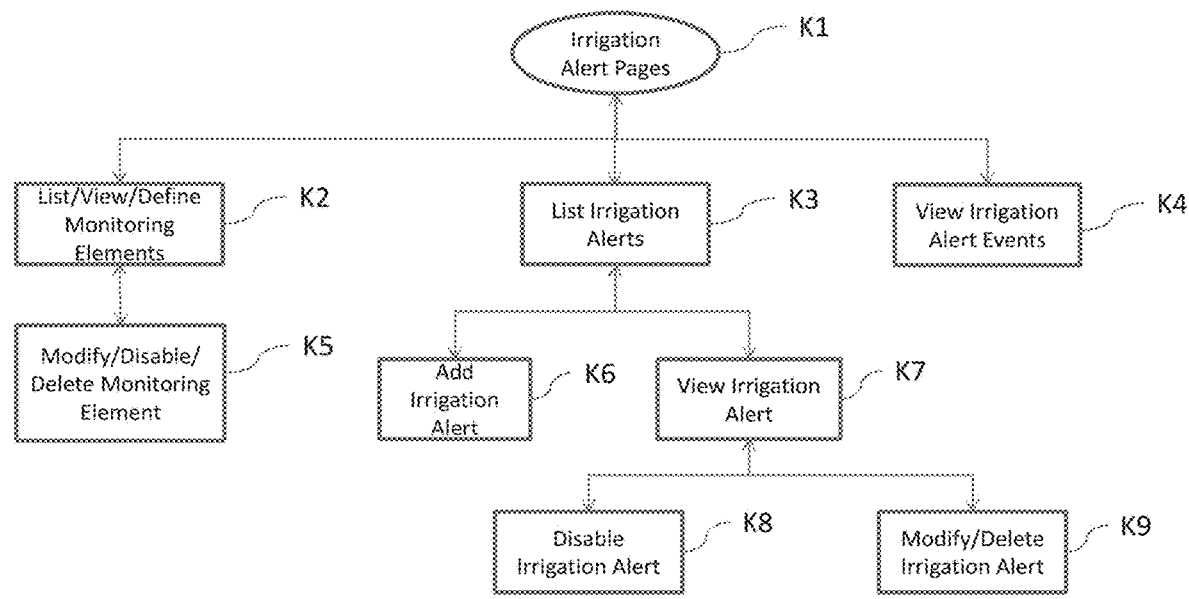
FIG. 12 is a flowchart illustrating an exemplary irrigation alert process flow in accordance with one or more embodiments.
Figures 56A, 56B:
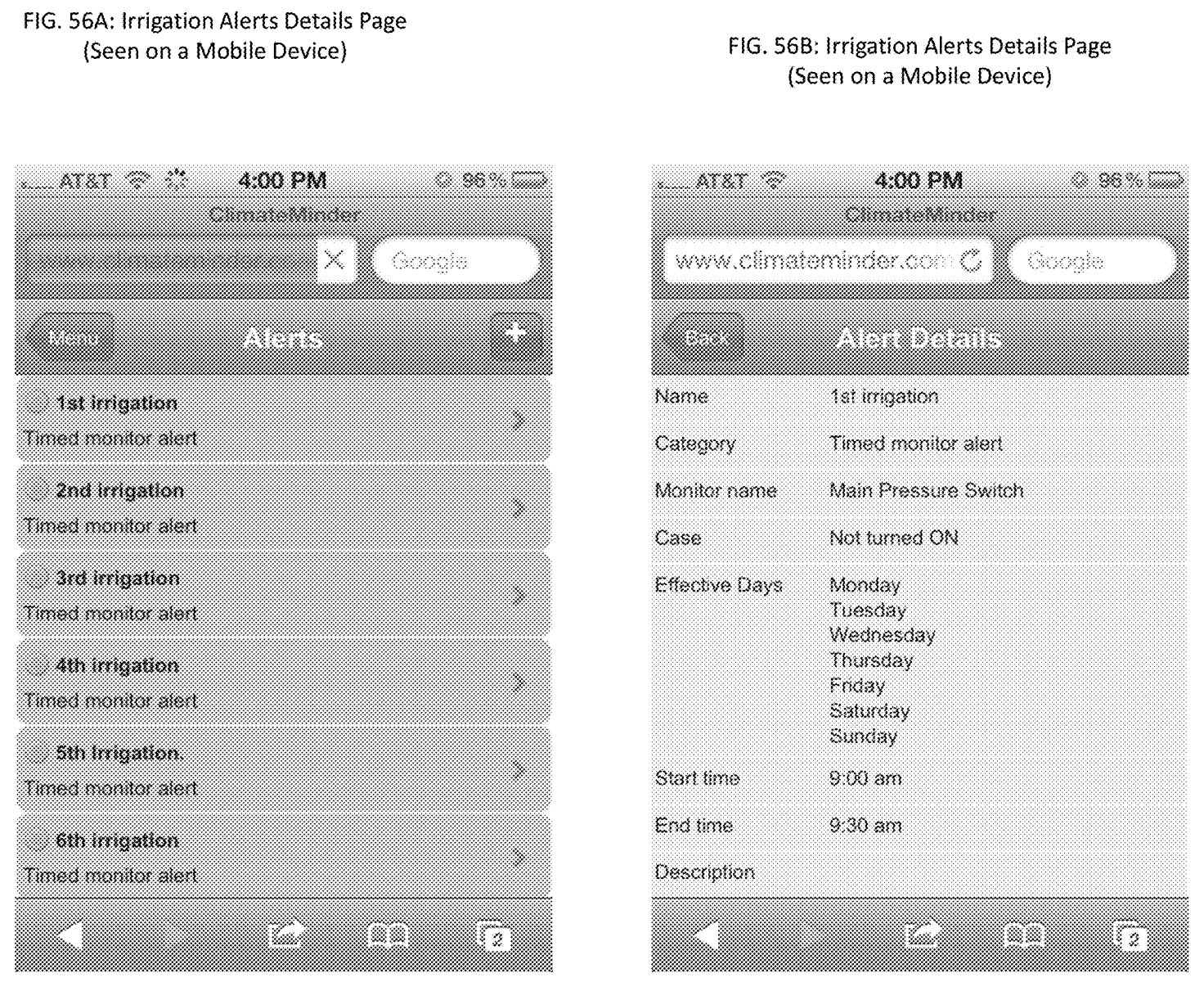

FIG. 12 illustrates the irrigation alert definition and management process flow. The first step of setting up an irrigation alert is to define monitoring elements such as pressure switches or water flow meters. The purpose of the irrigation alerts is to notify or alert users when an expected (i.e., planned) irrigation activity does or does not occur. Users can list and view details of monitoring elements (K2) as shown in exemplary FIGS. 53, 54A, and 54B. By clicking or tapping on the + sign shown on these pictures, users can define new monitoring elements. Once the monitoring element is defined and the irrigation schedule or the control condition is known, users can add irrigation alerts (K6). Listing and viewing the details of previously created irrigation alerts can be done on the same page as shown in the exemplary FIGS. 55, 56A, and 56B (K3 & K7). Irrigation alerts can be disabled (K8), modified, or deleted (K9).

In some cases, a given end-user has the authorization to monitor conditions or status and/or control irrigation or climate control systems at more than one site (e.g., an agricultural or landscape site). Exemplary systems are shown in FIGS. 1 and 58, with FIG. 58 illustrating multiple sites. That is, referring to FIG. 58, a remote server 50 provides end-users access to one or more sites 1, 2, 3, 4, etc., for which the given user is authorized. Typically, users access the server 50 from remote user devices, such as a notebook or laptop computer 56, desktop computer 58 or mobile computer device 60, such as a smartphone or tablet computer. User devices can connect to the server 50 via the Internet 52 and/or other network (e.g., local or wide area networks). The server 50 is communicationally coupled to devices at the various site via the Internet 52, wireless network 54 (e.g., a cellular or satellite network) and/or other wired or wireless network. At any given site, there may be one or more sensor devices 62 and/or control devices 64, controllers or elements. These devices are separately illustrated, however, it is understood that a device may include both sensor and control functionality. At least one node or device (e.g., device 64) is coupled to a sensor and receives sensor data. At least one node or device is coupled to and controls at least a portion of the irrigation or climate system, e.g., at least one node (e.g., control device 64) is coupled to an irrigation valve controlling the flow of water therethrough. In some cases, a given node or device is a control only device or the node or device is a sensor only device. In other cases, a given node device is both a sensor device and control node device. It is understood that the number of devices at a given site depends on the needs of the irrigation site, e.g., a given site may have 1-n devices, each having sensor and/or control functionality. Further, the server 50 may communicate with local devices at the site through a gateway 66 or other router or network adapter, or otherwise communicate directly with the devices.

Thus, in a general sense, the various methods and systems described herein are applicable to a variety of irrigation and/or climate monitoring and/or control systems, such that authorized users are provided remote access to information from the system/s and/or to remotely control the system/s via interaction with a configurable user interface provided by a server system, such as server 50 (or server 4), in communication with the local system/s. Typically, the server is coupled to a wide area network accessible by the remote users, e.g., coupled to the Internet. The server 50 stores user information, user login and authorization information and system information for many irrigation and/or climate monitoring and/or control systems located at various sites. The server 50 manages access to such sites allowing users only to get access to those systems and sites that the particular user is so authorized, and is not provided access to those systems and sites that the user particular user is not so authorized.

Figure 59:
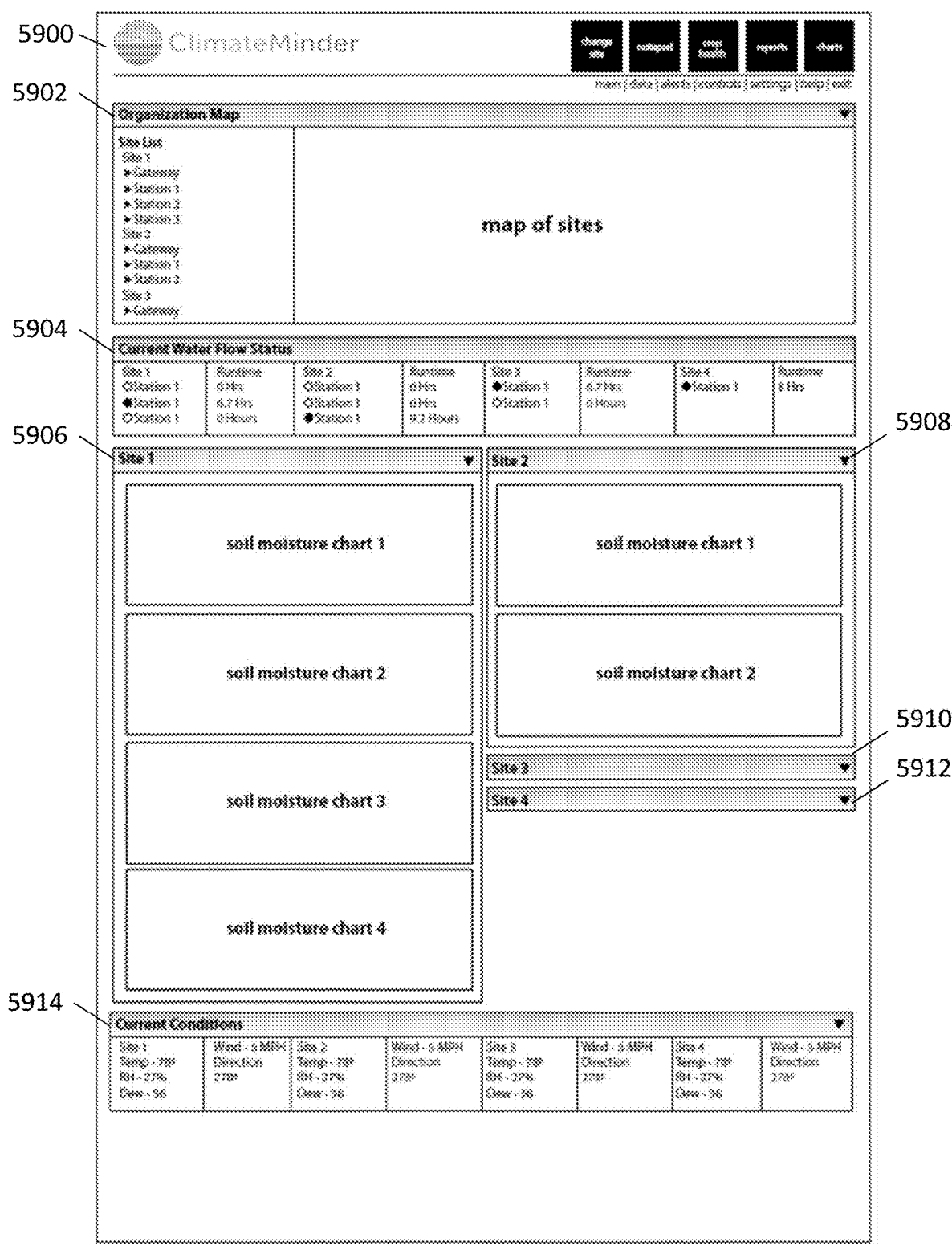

Accordingly, in some embodiments, the various user interfaces described herein may be adapted to allow for the configuration of the displayed information to display information and/or control systems relating to more than one site. In some forms, the status and/or control information or data is displayed in the user interface together to the end-user, e.g., as a dashboard. In some embodiments, data and/or control information for different sites is displayed at the same time to the end-user, and/or in the same window, and/or in adjacent windows viewable at the same time. In some embodiments, this allows the user authorized for multiple sites to monitor and control each of the sites from the same user interface without having to log out of one site at the server, and log in to another site at the server. This ability may apply to any of the embodiments described herein. By way of example, FIG. 59 illustrates a configurable user interface dashboard having configurable windows displaying status and/or control information for multiple sites for which the user is authorized. FIGS. 60-63 further illustrate various exemplary configurable windows/portlets that may be included in any of the user interfaces described herein.

Turning to FIG. 59 in more detail, the dashboard 5900 provides an organizational map window 5902 lists each site and its components or nodes/devices. There may be many configurable windows or portlets, several exemplary ones of which are described below. Window 5902 may also illustrate a map showing the various sites. For a given user with access to multiple sites, a map may be useful for many purposes. The current water flow status window 5904 indicates which stations are on and the runtime for each of the sites, as well as a map that would be used to illustrate a location of the sites. The site chart windows 5906, 5908, 5910 and 5912 provide user configurable (selected, created) charts. For example, soil moisture charts are illustrated for sites 1 and 2, whereas the charts for sites 3 and 4 are collapsed from view, but can be expanded. The current conditions window 5914 displays climate data specific to each site. As is clear, status and/or control data for multiple sites that the user has access to are displayed together to the user. Similar to the embodiments described herein, such windows may be user selected, positioned, sized, etc., such settings saved by the server system so that the user views the information for the multiples sites without requiring that the user log out of one site and log in to another site or switch between different sites.

Figure 60:
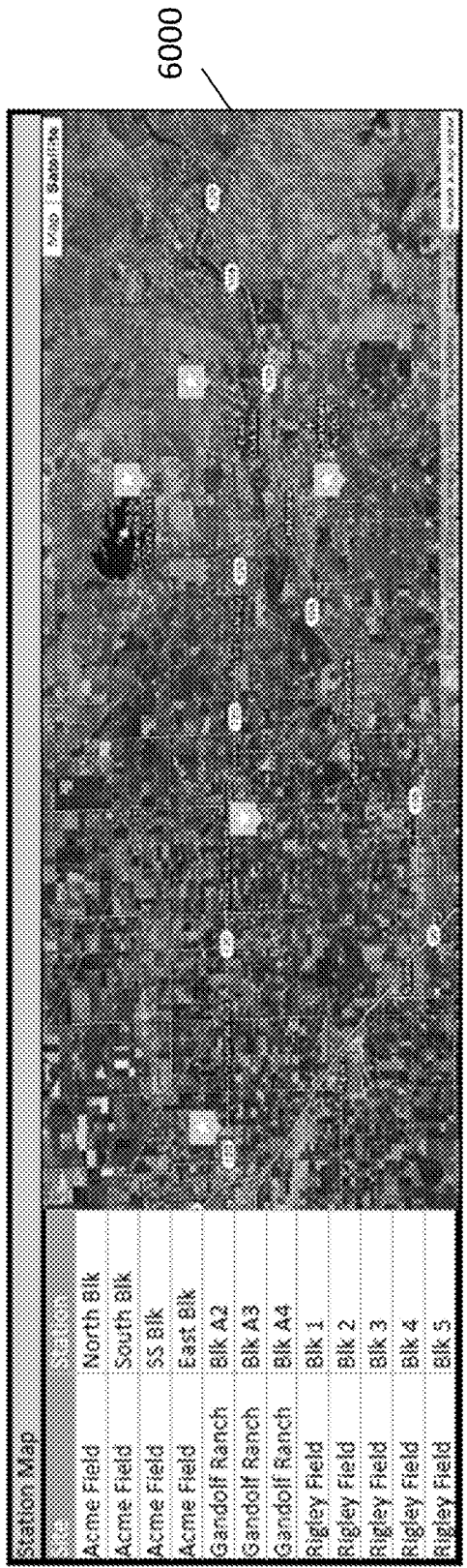
Figure 61:
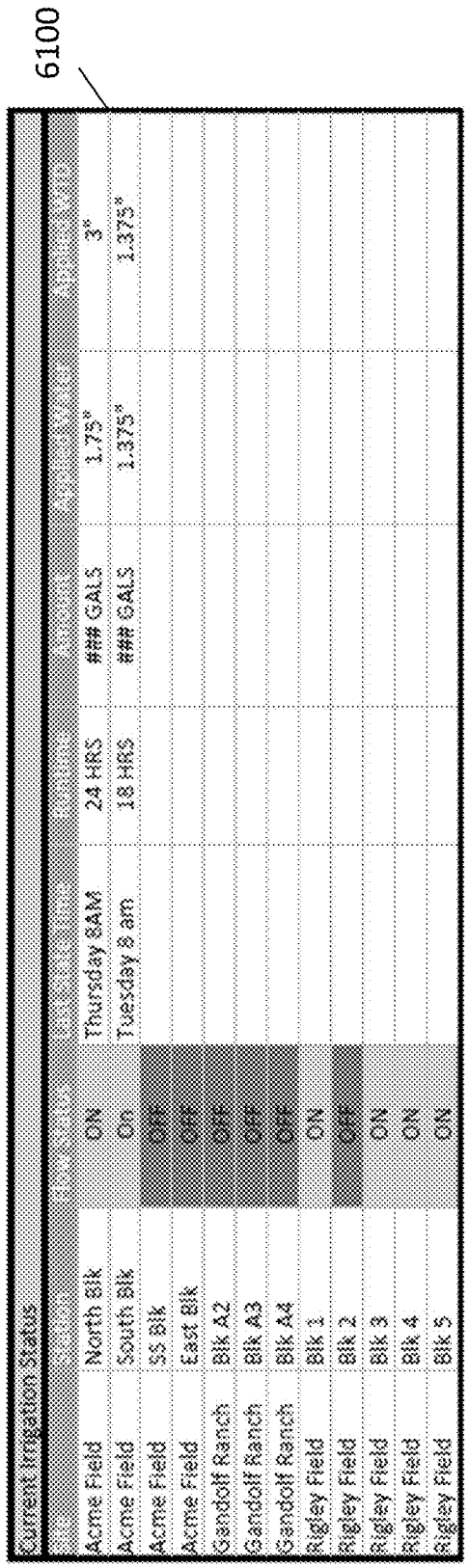

FIGS. 60-63 illustrate exemplary configurable windows or portlets displaying information from multiple sites to an authorized user. Station map window 6000 of FIG. 60 illustrates a station mapping of various stations for multiple sites, e.g., Acme Field, Gandolf Ranch and Rigley Field being different sites. Also illustrated is a map helpful for the user to visual the relative location of the different sites. For example, an icon (square with star icon) designates a given site. The user can click on an icon to expand further. For example, clicking on one site icon, may enlarge to show the location of the stations for that site. The current Irrigation status window 6100 of FIG. 61 illustrates the current status of irrigation at each site. The current weather status window 6200 of FIG. 62 illustrates the current weather conditions for the different sites. In some embodiments, the weather information, such as forecast data, may be retrieved from external sources, e.g., NOAA, and displayed as part of a window and/or dashboard. The flow meter readings window 6300 of FIG. 63 illustrates the current readings from the flow meters at the different sites for which the user has access. It is noted that not all data is illustrated in FIGS. 61-63 but would be displayed if available in use. Again, the user can view this data together for multiple sites for which the user has access without switching between sites or logging out and into another site.

It is noted that in some embodiments, one or more of the various user interfaces described herein, such as one or more of the dashboards, and/or windows are mobile capable. For example, a user can switch between web and mobile modes. In some embodiments, the user device is detected and if a mobile or tablet device is detected, the screen will adapt itself to the mobile device's screen resolution, and rearrange the windows and menus for easy access from that particular mobile device.

The remote monitoring and control processes described above may be implemented in software, hardware, firmware, or any combination thereof. The processes are preferably implemented in one or more computer programs executing on a programmable computer (which can be part of the central server system 4) including a processor, a storage medium readable by the processor (including, e.g., volatile and non-volatile memory and/or storage elements), and input and output devices. Each computer program can be a set of instructions (program code) in a code module resident in the random access memory of the computer. Until required by the computer, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. For example, the screenshots are provided by way of example only, and can be modified in various ways. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer server system may comprise one or more physical machines, or virtual machines running on one or more physical machines. In addition, the central server system may comprise a cluster of computers or numerous distributed computers that are connected by the Internet or another network.

Accordingly, the foregoing description and attached drawings are by way of example only, and are not intended to be limiting.

What is claimed is:

1. A remote monitoring and control system for landscape or agricultural environments, each of the landscape or agricultural environments having at least one irrigation device configured to monitor environmental, soil, or climate conditions and/or configured to control irrigation or climate, the remote monitoring and control system comprising:
a server computer system located remotely from the landscape or agricultural environments, said server computer system communicatively coupled to at least one irrigation device in each landscape or agricultural environment over a communications network and configured to receive data from and control operation of the at least one irrigation device, said server computer system also coupled to client devices operated by end-users over a communications network and wherein the server computer system is configured to transmit data to and receive remote control commands or queries from respective client devices as directed by the end-users for respective one or more of the at least one irrigation device;
wherein said server computer system provides a respective configurable user interface to the end-users, said user interface comprising a dashboard configured to be customized by each respective end-user to display user selected data and at least a first map, wherein settings for dashboards configured by end-users are stored and used for subsequent uses of one or more of the dashboards by the respective end-users, wherein the user selected data and the first map displayed to the respective end-user correspond to at least one site for which the respective end-user is authorized to access data such that the first map from the at least one site is displayed showing on the first map irrigation zones and status data to the end-user, wherein the status data comprises at least one of environmental, soil, and climate condition data.

2. The remote monitoring and control system of claim 1 wherein the user selected data displayed to the end-user corresponds to multiple sites for which the respective end-user is authorized to access the data such that the data from the multiple sites is displayed together to the respective end-user without requiring the respective end-user to switch between sites or log out of one site to access another site.

3. The remote monitoring and control system of claim 1 wherein said dashboard comprises one or more pages corresponding to the respective end-user and that are accessible by the respective end-user through the dashboard.

4. The remote monitoring and control system of claim 3, wherein the server computer system communicates with different types of client devices including personal computers and mobile devices, and wherein the server computer system is configured to adapt the dashboard configured by the respective end-user to the type of client device used by the respective end-user.

5. The remote monitoring and control system of claim 4, wherein the dashboard displayed on a mobile device is adapted such that sets of the information on the dashboard are rearranged in a column format avoiding a need for horizontal scrolling and a menu formatted to fit a screen of the mobile device enabling browsing and clicking on displayed links on the mobile device.

6. The remote monitoring and control system of claim 1, wherein the dashboard is configured to be configurable by the respective end-users to automatically generate and distribute reports based on data from the at least one irrigation device of the at least one site on a periodic basis, and the dashboard is configured to display multiple reports as previously customized by the respective end-users each with different titles and display content, wherein the respective reports are distributed to different ones of the end-users according to different schedules.

7. The remote monitoring and control system of claim 1, wherein the dashboard is further configured to enable the respective end-user to access a stored manual control command history through the dashboard, wherein the manual control command history comprises at least one of an identification of an individual that implemented a first manual control, and a time when the first manual control was implemented.

8. The remote monitoring and control system of claim 1, wherein the end-users are each only authorized to access a subset of one or more certain sites of multiple different sites.

9. The remote monitoring and control system of claim 1, wherein the dashboard is configured to display one or more charts for the at least one site defined by a respective one of the end-users, wherein said one or more charts, wherein the client devices comprise the mobile device, and wherein when the one or more charts are shown on the mobile device, the size of the chart matches the screen resolution of the mobile device.

10. The remote monitoring and control system of claim 1, wherein the dashboard displays irrigation status information for the at least one site including current soil moisture status, water bank fullness in percentage, estimated next irrigation, flow meter, pressure switch and/or valve status, and recommendations to the respective end-user regarding when and how much water should be applied for each irrigation zone.

11. The remote monitoring and control system of claim 1 wherein the displayed first map displays the status data such that at least two irrigation zones are shown having different colors with the different colors corresponding to different levels of soil moisture.

12. The remote monitoring and control system of claim 1 wherein the displayed first map displays information of respective stations when the respective end-user moves a cursor over a corresponding displayed station pivot.

13. The remote monitoring and control system of claim 1, wherein a second displayed map displays those multiple sites for which the respective end-user has authorized access and visually illustrates the relative location of the multiple different sites, and further displays site icons each designating one of the multiple sites.

14. The remote monitoring and control system of claim 13, wherein the dashboard is configured to display at least a sub-set of the data illustrating a current status of irrigation at each of the multiple sites designated by the displayed site icons, and the user interface is configured to enable the respective end-user to view at least the sub-set of data together for the multiple sites for which the end-user has access without switching between sites or logging out and into another site.

15. The remote monitoring and control system of claim 14, wherein the user interface is configured to detect when the respective end-user activates a displayed icon corresponding to a first site of the multiple sites and cause an enlargement of the map to show the location of the stations for the first site.

16. The remote monitoring and control system of claim 13, wherein the first map and the second map comprise overhead satellite image maps.

17. The remote monitoring and control system of claim 1, wherein the server computer system is configured to store at least some of the settings as specified by the end-users, and wherein the server computer system is configured to apply the at least some of the settings in causing subsequent displaying of the one or more dashboards to the end-users.

18. A method of remote monitoring and controlling landscape or agricultural environments, comprising:

establishing, through a server computer system, communication connections over a communications network with client devices operated by end-users, wherein the server computer system is located remotely from multiple different landscape or agricultural environments;

receiving data from and controlling operation of at least one irrigation device in each of the multiple landscape or agricultural environments;

transmitting over the communication network data to the end-users associated with one or more of the multiple landscape or agricultural environments;

receiving, over the communication network, remote control commands or queries from the client devices as directed by the end-users for respective one or more of the at least one irrigation device at one or more of the multiple landscape or agricultural environments;

providing, from the server computer system, a configurable user interface to the end-users, and displaying through the user interface a respective dashboard customized by each end-user displaying user selected data and at least a first map; and storing settings for dashboards configured by the end-users, and using the settings for subsequent uses of one or more of the dashboards by the end-users, wherein the user selected data and the first map displayed to the respective end-user correspond to at least one site for which the respective end-user is authorized to access data such that the first map from the at least one site is displayed showing on the map irrigation zones and status data to the respective end-user, wherein the status data comprises at least one of environmental, soil, and climate condition data.

19. The method of remote monitoring and controlling landscape or agricultural environments of claim 18, wherein the displaying through the user interface the respective dashboard comprises displaying together to the end-user the user selected data corresponding to multiple sites for which the respective end-user is authorized to access the data without requiring the end-user to switch between sites or log out of one site to access another site.

20. The method of remote monitoring and controlling landscape or agricultural environments of claim 18, further comprising adapting the dashboard configured by the respective end-user to a type of client device, of different types of client devices comprising personal computers and mobile devices, used by the respective end-user.

* * * * *